(12) United States Patent
Levine

(10) Patent No.: US 11,238,689 B2
(45) Date of Patent: Feb. 1, 2022

(54) SMOOTHIE VENDING MACHINE

(71) Applicant: Cole Craig Levine, Huntsville, AL (US)

(72) Inventor: Cole Craig Levine, Huntsville, AL (US)

(*) Notice: Subject to any disclaimer, the term of this patent is extended or adjusted under 35 U.S.C. 154(b) by 0 days.

(21) Appl. No.: 17/155,506

(22) Filed: Jan. 22, 2021

(65) Prior Publication Data

US 2021/0225120 A1 Jul. 22, 2021

Related U.S. Application Data

(60) Division of application No. 17/056,410, filed as application No. PCT/US2020/027591 on Apr. 10, (Continued)

(51) Int. Cl.
*G07F 13/10* (2006.01)
*G07F 11/16* (2006.01)
(Continued)

(52) U.S. Cl.
CPC .............. *G07F 11/16* (2013.01); *A23G 9/045* (2013.01); *A23G 9/22* (2013.01); *G07F 9/10* (2013.01);
(Continued)

(58) Field of Classification Search
CPC . G07F 5/18; G07F 11/10; G07F 11/16; G07F 11/165; G07F 13/00; G07F 13/04;
(Continued)

(56) References Cited

U.S. PATENT DOCUMENTS 2,667,423 A 1/1954 Simpson
3,145,741 A 8/1964 Smith
(Continued)

FOREIGN PATENT DOCUMENTS

CN 2039112 U 6/1989
CN 203163416 U 8/2013
(Continued)

OTHER PUBLICATIONS

Quinzee [retrieved on Apr. 4, 2016], Retrieved from the Internet:<URL: https://www.nicevend.com/quinzee/introduction/>.
(Continued)

*Primary Examiner* — Gene O Crawford
*Assistant Examiner* — Kelvin L Randall, Jr.
(74) *Attorney, Agent, or Firm* — Charles Knobloch

(57) ABSTRACT

A tubeless smoothie vending machine including a tubeless electro-mechanically actuated dispensing nozzle attached to each smoothie dispensing tank, a cup retrieval system to retrieve an empty cup and move the cup to each selected dispensing nozzle, a portal in the cup retrieval system to transfer the cup through the cup retrieval system, a receiving shelf to receive the filled cup, a dispenser system to drop dry food product into the beverage filled cup, and an access door to open when the beverage filled cup is ready to vend to the customer. Tubes for delivering beverage to the cup are eliminated. A consolidated smoothie vending machine having a plurality of integrated smoothie blenders, a dry food supplement delivery assembly, a straw delivery assembly, and a lid delivery assembly. In one example, the smoothie blenders are stacked. In one example, the smoothie blenders are attached to sliding shelving.

4 Claims, 40 Drawing Sheets

Related U.S. Application Data 2020, application No. 17/155,506, which is a continuation of application No. PCT/US2020/027591, filed on Apr. 10, 2020.

(60) Provisional application No. 62/964,647, filed on Jan. 22, 2020.

(51) Int. Cl.
| | |
|---|---|
| *G07F 13/06* | (2006.01) |
| *G07F 13/04* | (2006.01) |
| *G07F 17/00* | (2006.01) |
| *A23G 9/04* | (2006.01) |
| *A23G 9/22* | (2006.01) |
| *G07F 9/10* | (2006.01) |

(52) U.S. Cl.
CPC ............ *G07F 13/04* (2013.01); *G07F 13/065* (2013.01); *G07F 13/10* (2013.01); *G07F 17/0064* (2013.01)

(58) Field of Classification Search
CPC ........ G07F 13/06; G07F 13/065; G07F 13/10; G07F 17/0071
See application file for complete search history.

(56) References Cited

U.S. PATENT DOCUMENTS

| | | | |
|---|---|---|---|
| 3,236,270 A | 2/1966 | Stutz | |
| 3,297,061 A | 1/1967 | Nimee | |
| 3,393,830 A | 7/1968 | Phillips et al. | |
| 3,510,906 A | 5/1970 | Baldwin | |
| 3,530,907 A | 9/1970 | Slass | |
| 3,554,364 A * | 1/1971 | Lane | G07F 13/10 198/746 |
| 3,618,642 A * | 11/1971 | Beaulieu | B65B 43/50 141/1 |
| 3,647,472 A | 3/1972 | Speech et al. | |
| 3,876,110 A | 4/1975 | Logie | |
| 4,186,660 A * | 2/1980 | Key | B41F 15/36 101/128.1 |
| 4,437,497 A | 3/1984 | Enander | |
| 4,526,215 A | 7/1985 | Harrison et al. | |
| 4,559,979 A | 12/1985 | Koblasz et al. | |
| 4,590,975 A * | 5/1986 | Credle, Jr. | B67D 1/08 141/1 |
| 4,628,974 A * | 12/1986 | Meyer | B67D 1/0021 141/103 |
| 4,664,529 A | 5/1987 | Cavalli | |
| 4,733,381 A | 3/1988 | Farmer et al. | |
| 4,738,290 A * | 4/1988 | Ciekanski | A47J 31/401 141/82 |
| 4,780,861 A | 10/1988 | Stembridge et al. | |
| 4,927,055 A * | 5/1990 | Groover | G07F 11/08 221/133 |
| 5,032,941 A | 7/1991 | Aruga et al. | |
| 5,250,752 A * | 10/1993 | Cutright | H05K 9/0062 174/363 |
| 5,261,467 A * | 11/1993 | Yamamoto | G07F 13/10 141/174 |
| 5,296,251 A | 3/1994 | Ishida et al. | |
| 5,443,310 A | 8/1995 | DeFelice et al. | |
| 5,491,333 A | 2/1996 | Skell et al. | |
| 5,613,620 A * | 3/1997 | Center | A47F 1/10 221/1 |
| 5,625,198 A * | 4/1997 | Chigira | G05B 19/401 250/559.29 |
| 5,671,604 A * | 9/1997 | Rudick | F25D 3/105 62/374 |
| 5,685,435 A * | 11/1997 | Picioccio | G07F 13/06 209/677 |
| 5,727,609 A * | 3/1998 | Knight | B65G 47/901 141/104 |
| 5,730,316 A | 3/1998 | Falk | |
| 5,772,075 A | 6/1998 | Ash, Jr. et al. | |
| 6,053,359 A | 4/2000 | Goulet et al. | |
| 6,082,589 A | 7/2000 | Ash et al. | |
| 6,102,246 A * | 8/2000 | Goulet | B65G 47/22 221/11 |
| 6,176,090 B1 | 1/2001 | Ufema | |
| 6,273,292 B1 | 8/2001 | Milan | |
| 6,298,769 B1 * | 10/2001 | Stettes | A47J 31/40 222/129.1 |
| 6,312,026 B1 | 11/2001 | Workman | |
| 6,378,740 B1 | 4/2002 | Martin | |
| 6,431,395 B1 * | 8/2002 | San Martin | G07F 17/0071 221/131 |
| 6,525,644 B1 | 2/2003 | Stillwagon | |
| 6,607,013 B1 | 8/2003 | Leoni | |
| 6,609,821 B2 | 8/2003 | Wulf et al. | |
| 6,682,289 B1 * | 1/2004 | Credle, Jr. | G07F 11/16 221/133 |
| 6,772,675 B2 | 8/2004 | Ervin | |
| 6,863,916 B2 | 3/2005 | Henriksen et al. | |
| 6,923,010 B2 | 8/2005 | Small et al. | |
| 7,478,583 B2 | 1/2009 | Scullion et al. | |
| 7,546,854 B2 | 6/2009 | Ozanne et al. | |
| 7,651,718 B2 | 1/2010 | Singh | |
| 7,665,398 B2 | 2/2010 | Gerber | |
| 7,712,321 B2 | 5/2010 | Kadyk | |
| 7,762,181 B2 | 7/2010 | Boland et al. | |
| 8,162,176 B2 | 4/2012 | Rudick | |
| 8,167,004 B2 | 5/2012 | Lee et al. | |
| 8,196,424 B2 | 6/2012 | Kim et al. | |
| 8,251,258 B2 | 8/2012 | Rudick et al. | |
| 8,448,567 B2 | 5/2013 | Martin et al. | |
| 8,459,497 B2 | 6/2013 | Milan et al. | |
| 8,534,501 B2 | 9/2013 | Nevarez et al. | |
| 8,606,396 B2 | 12/2013 | Claesson et al. | |
| 8,865,244 B2 | 10/2014 | Sweeney et al. | |
| 9,155,330 B1 | 10/2015 | Shtivelman | |
| 9,227,830 B2 * | 1/2016 | Angus | B67D 1/0041 |
| 9,259,016 B2 | 2/2016 | Mohammed et al. | |
| 9,624,460 B2 | 4/2017 | Wunder | |
| 10,654,013 B1 * | 5/2020 | Palmer | B01F 15/0222 |
| 10,689,240 B1 * | 6/2020 | Schultz | B67D 1/0041 |
| 2002/0152896 A1 * | 10/2002 | Young | A47J 27/18 99/330 |
| 2003/0080138 A1 * | 5/2003 | Chirnomas | G07F 9/002 221/123 |
| 2004/0069795 A1 * | 4/2004 | Sams | G07F 11/42 221/281 |
| 2005/0142253 A1 | 6/2005 | Purcell | |
| 2005/0183426 A1 | 8/2005 | Learned | |
| 2006/0081653 A1 | 4/2006 | Boland et al. | |
| 2007/0295746 A1 * | 12/2007 | Gapp | G07F 13/10 221/304 |
| 2008/0089983 A1 | 4/2008 | Coste | |
| 2008/0245079 A1 | 10/2008 | Lim et al. | |
| 2011/0073618 A1 | 3/2011 | Anderson et al. | |
| 2011/0174008 A1 | 7/2011 | Kim | |
| 2011/0226795 A1 * | 9/2011 | Sichich | G07F 11/165 221/1 |
| 2011/0266302 A1 | 11/2011 | Masse | |
| 2012/0285986 A1 * | 11/2012 | Irvin | A47J 31/007 222/1 |
| 2012/0330461 A1 | 12/2012 | Doom | |
| 2013/0008559 A1 | 1/2013 | Andersen | |
| 2014/0272017 A1 | 9/2014 | Sepehr | |
| 2015/0216201 A1 * | 8/2015 | Bruckner | A23G 9/28 700/233 |
| 2015/0233631 A1 | 8/2015 | Shuntich | |
| 2015/0245734 A1 * | 9/2015 | Vogelsang | A47J 31/4403 99/289 R |
| 2015/0264968 A1 | 9/2015 | Shuntich | |
| 2015/0366405 A1 | 12/2015 | Manchuliantsau | |
| 2016/0332128 A1 * | 11/2016 | Abraham | B01F 15/00071 |
| 2017/0039797 A1 * | 2/2017 | Elmery | A23G 9/045 |
| 2017/0326437 A1 | 11/2017 | Sampson et al. | |

(56) References Cited

U.S. PATENT DOCUMENTS

| 2019/0062138 | A1  | 2/2019 | Elmery |            |
|--------------|-----|--------|--------|------------|
| 2019/0166872 | A1* | 6/2019 | Mathijssen | A23G 9/283 |
| 2019/0272699 | A1* | 9/2019 | Mohammed | G07F 17/0071 |

FOREIGN PATENT DOCUMENTS

| CN | CN1998031        |    | 5/2016  |
|----|------------------|----|---------|
| EP | 1089240          | A2 | 4/2001  |
| EP | 1564696          | A2 | 8/2005  |
| KR | 20080088944      | A  | 10/2008 |
| WO | WO 2005/111955   | A1 | 11/2005 |
| WO | WO2014010771     | A1 | 1/2014  |
| WO | WO 2019/105181   | A1 | 6/2019  |

OTHER PUBLICATIONS

Fitgo [retrieved on Apr. 4, 2016], Retrieved from the Internet:<URL: http://www.fitgosmoothie.com/>.

Jamba Juice [retrieved on Apr. 4, 2016], Retrieved from the Internet:<URL: http://www.jambajuice.com/morejamba/jambago>.

QuenchBot [retrieved on Apr. 4, 2016], Retrieved from the Internet:<URL: https://www.indiegogo.eom/projects/quenchbot-smoothie-robot#/>.

Berries by Astrid [retrieved on Apr. 4, 2016], Retrieved from the Internet:. <URL: https://www.fundedbyme.com/en/campaign/6137/invest-in-berries-by-astrid>.

Oranfresh [retrieved on Apr. 4, 2016], Retrieved from the Internet: <URL: http://www.oranfresh.com/en/?product_category=vending-en>.

PCT/ISA/237, Written Opinion of the International Searching Authority, PCT/US2020/027591, International Filing Date Apr. 10, 2020.

PCT/ISA/210, International Search Report, PCT/US2020/027591, International Filing Date Apr. 10, 2020.

USPTO, Office Action of co-pending U.S. Appl. No. 17/056,410 dated Sep. 17, 2021.

USPTO, Office Action of co-pending U.S. Appl. No. 17/155,361 dated May 12, 2021.

* cited by examiner

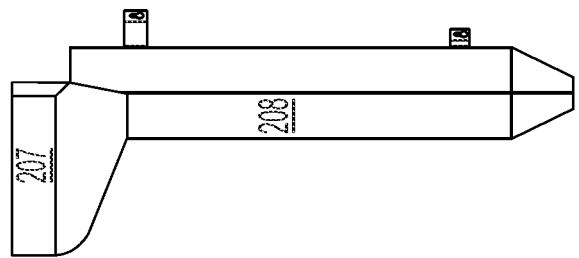
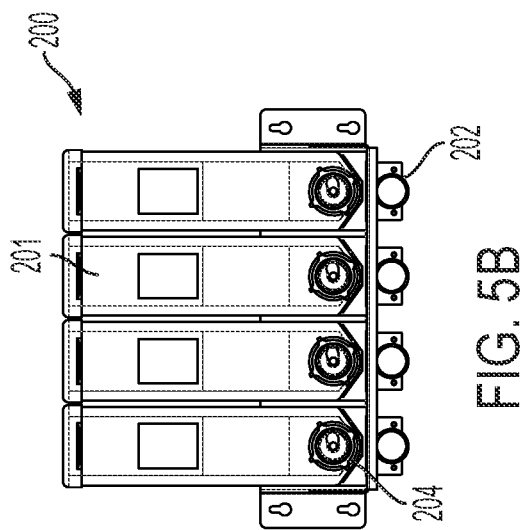
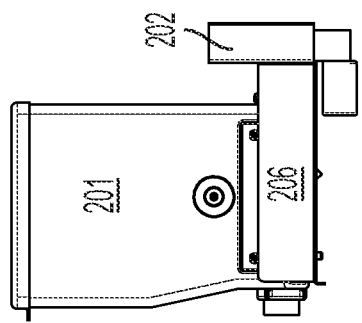
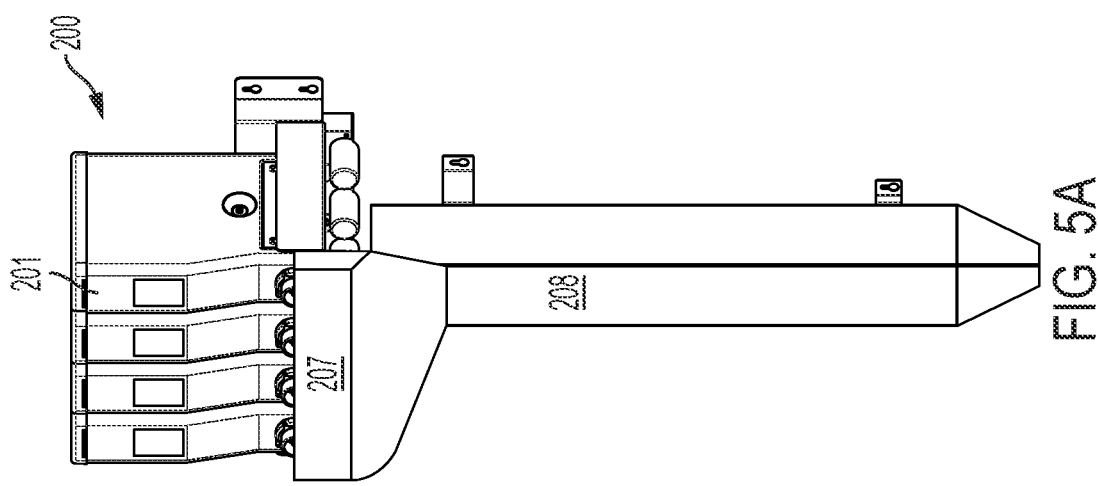

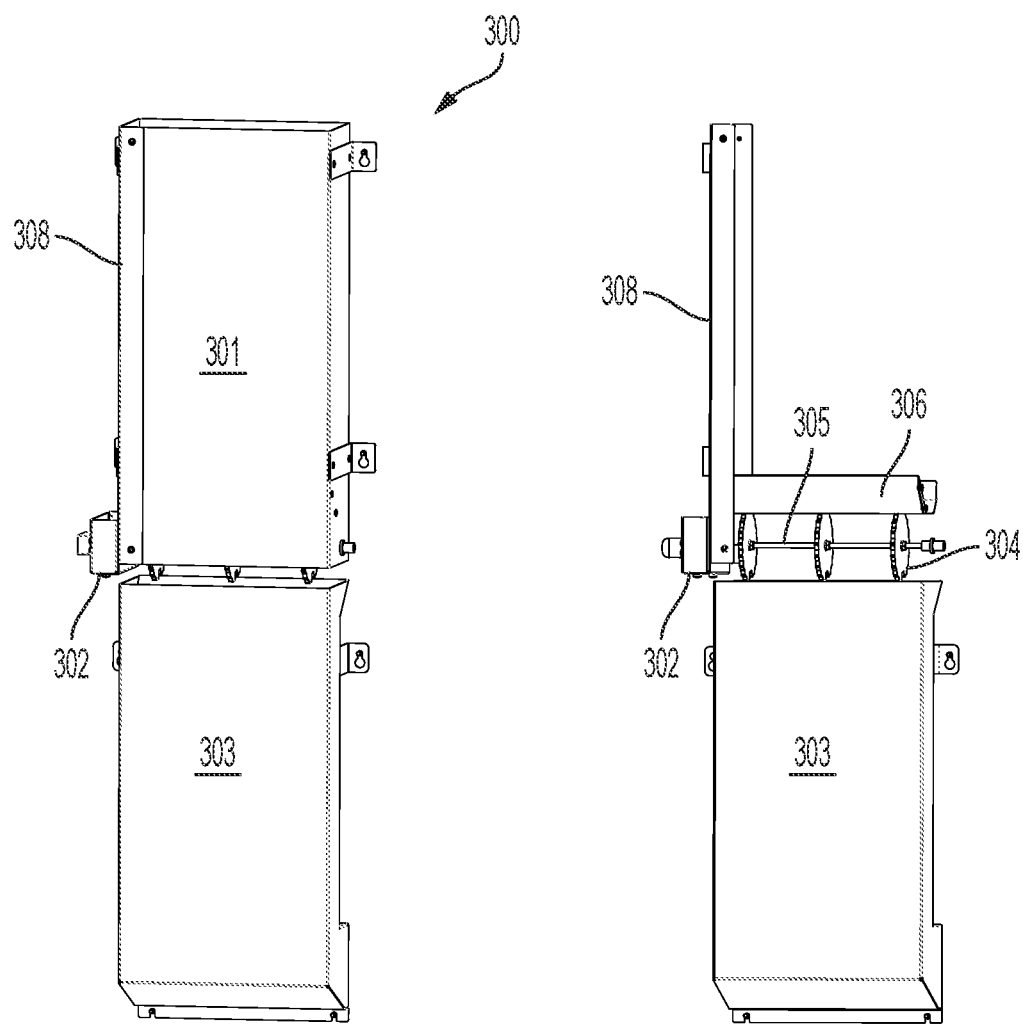
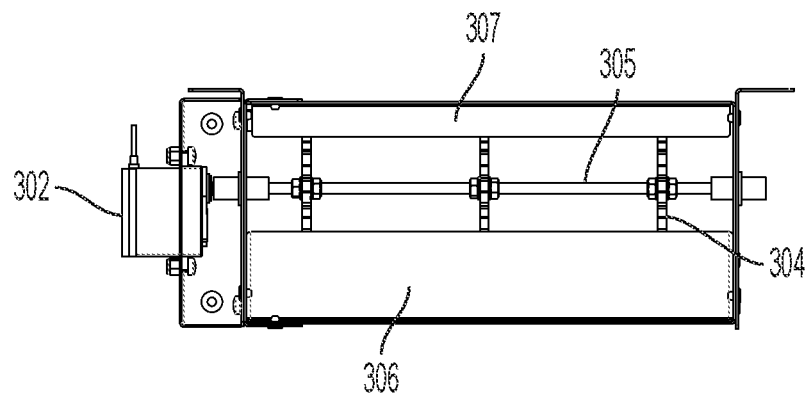
FIG. 8A  FIG. 8B
FIG. 8C

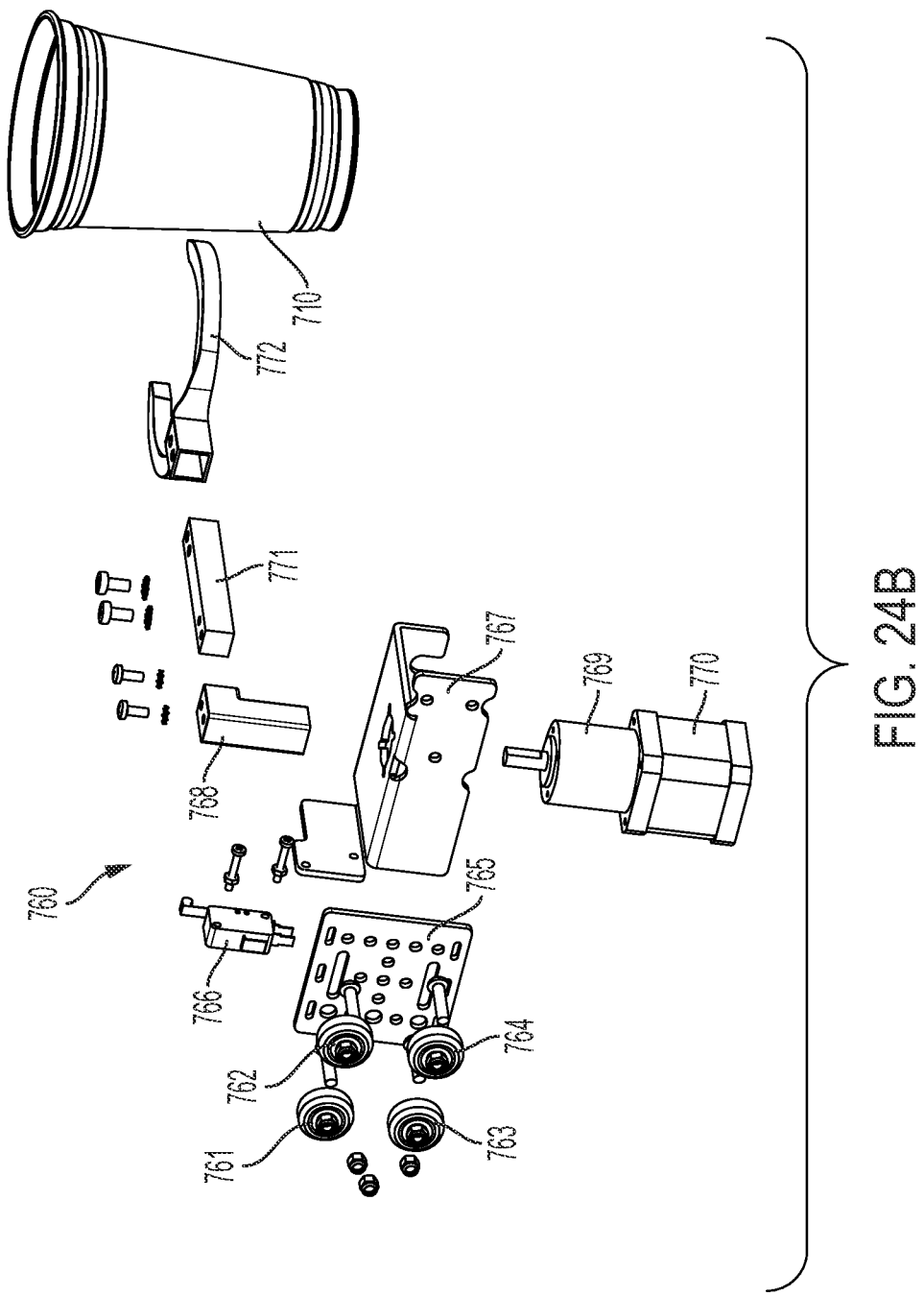

SMOOTHIE VENDING MACHINE

CROSS REFERENCE TO RELATED APPLICATIONS

This application claims the benefit of U.S. Provisional Application No. 62/964,647 of filing date Jan. 22, 2020. This application claims the benefit of International Application No. PCT/US20/27591, filed 10 Apr. 2020, which claims the benefit of U.S. Provisional Application No. 62/964,647 of filing date Jan. 22, 2020.

TECHNICAL FIELD

Disclosed herein is a vending machine capable of dispensing modern smoothie beverages with protein additives.

BACKGROUND OF THE INVENTION

The inventor has discovered several problems that have prevented the dispensing of "smoothie" type beverages from unattended vending machines. This may be one reason why there has been a proliferation of attended smoothie shops across the world. These shops custom make smoothies by an attendant, upon ordering by the customer. A smoothie, in the modern sense, includes a thick blend of fruits and suspended particles of ice, which creates a macro consistency of a thick liquid.

The smoothie must be in constant mix to maintain the desired consistency of the suspension. Unlike soda dispensing vending machines, tubing from a smoothie reservoir to a fixed cup location will need to be limited to one flavor. Otherwise, an amount of one flavor will be in the length of the tubing at the end of dispensing. If the next dispensing is for another flavor (or the next dispensing is too long after the previous dispensing) then a problem becomes apparent. This previous beverage in the tube will likely need to be thrown out, and possibly also require a sophisticated system of cleaning the tubing between each dispensing. Hence, the current art of using an attendant to manually dispense the beverage and keep the dispensing machine clean. So, if an unattended machine is to dispense multiple flavors, or use multiple reservoirs, then one tube for each reservoir may be needed to solve these practical considerations. This does not, however, address the need to periodically clean these tubes to prevent slime. Also, when the next dispensing is too long after the previous dispensing, then the tube(s) need to be cleared.

The problems just described create a myriad of cascading problems to create an unattended vending machine that can provide smoothies from multiple reservoirs. An unattended machine still needs to be easily refilled and have a minimal number of surfaces that need to be cleaned. An unattended vending machine is less likely to be in a kitchen style environment where attended machines are readily cleaned. Each flavor consists of real fruit that is blended with the ice particles, so multiple blenders provide the selection of beverages—as opposed to a single large blender dispensing the ice slurry and a flavoring squirted into the cup at time of dispensing. These blenders are continuously mixing the slurry and maintaining the temperature needed to keep the slurry at the proper consistency and temperature expectations of the customer. This creates a space situation for a vending machine of "standard" or expected size. The blenders need to be segregated from the electronics modules (to reduce spray of fluids onto the electronic components) but at the same time be easily accessible for refill and cleaning. At the same time, there needs to be a way to get the beverage from the reservoirs to an exterior wall of the machine, so the customer can retrieve their drink.

Another problem arises in the demands of the modern healthy drink customer. These customers want or need specific dry supplements added to their slurry beverage in order to satisfactorily complete their nutritional drink experience. Many of these dry supplements are protein based, and different customers will have different supplement preferences or requirements. In manually prepared and served stores, it is relatively easy for the attendant to add the dry supplements on demand and custom to each customer. A problem arises for an unattended vending machine as to how to keep the dry ingredients segregated from the liquid containers but still have room to intervene to add the dry ingredient to complete the customer's request.

Unlike an icee-type machine, which manually dispenses one or two flavors, the self-serve vending machine of the present invention necessitates a broad range of food-choice options that are now demanded of the modern, health-conscious consumer. Each customer is a unique individual—with particular proteins and particular fruits and vegetables that are acceptable to meet their specific nutritional intake plan. Expensive manual preparation and delivery, at sparse or inconvenient store locations, is currently the typical option that they have.

Applicant has discovered these problems and found a way to practically solve these problems, enabling a cleanable, working unattended smoothie vending machine with the ability to add dry ingredients.

BRIEF SUMMARY OF THE INVENTION

In one example, disclosed herein is a smoothie vending machine dispensing smoothie beverage into an electromechanically positioned cup from a plurality of arranged and positioned electrically actuated dispensing nozzles without intervening hose. In a further example, the vending machine further includes a housing, a mounting plate vertically disposed on the vending machine housing, where the mounting plate is vertically hinged, and where the mounting plate is swingable outward from the vending machine housing, and where the mounting plate is positioned and arranged between a front door of the vending machine and a plurality of smoothie blenders contained in the vending machine, and where the mounting plate is positioned and arranged to swing open to enable access to the smoothie blenders and a plurality of blender DC motors for refilling and maintenance. In a further example, the vending machine includes extendable shelving for holding the smoothie blenders, and where the mounting plate is hinged to swing open to enable the blenders and shelving to be fully extended from a chassis cabinet of the vending machine housing.

In one example, disclosed herein is a tubeless smoothie vending machine having a plurality of smoothie dispensing tanks. The vending machine includes a housing, a tubeless electro-mechanically actuated dispensing nozzle attached to each smoothie dispensing tank, a means for retrieving an empty cup and moving the cup to each selected dispensing nozzle, a tubeless means for delivering beverage from the dispensing tank to the cup, a means for transferring the cup through the cup retrieving and moving means, a receiving shelf to receive the filled cup, a means for dropping dry food product into the beverage filled cup, and an access door to open when the beverage filled cup is ready to vend to the customer.

In one example, disclosed herein is a method for dispensing smoothie beverage from a machine having a plurality of smoothie dispensing tanks, each dispensing tank having a tubeless electro-mechanically actuated dispensing nozzle. The method includes retrieving an empty cup, moving the cup to a selected electro-mechanically actuated dispensing nozzle, actuating open the tubeless electro-mechanically actuated dispensing nozzle, tubelessly delivering beverage from the dispensing tank to the cup, transferring the cup to a receiving shelf, dropping dry food product into the beverage filled cup, and opening an access door to open to vend the filled cup to a customer. In a further example, the method includes receiving a beverage selection from the customer, and receiving payment at a point of sale. In a further example, the method includes dispensing straws at a point of vending. In a further example, the method includes dispensing lids at a point of vending.

BRIEF DESCRIPTION OF THE SEVERAL DRAWINGS

FIG. 1 is a 3-D perspective illustration of an example of the vending machine assembly 1 of the present disclosure;

FIG. 2 is a 3-D perspective illustration of an example of the vending machine assembly 1 of the present disclosure, with front door assembly 100 shown in an open position, revealing interior front door assemblies and assemblies interior, inside the main chassis cabinet assembly 1000 of vending machine assembly 1;

FIG. 3 is a 3-D perspective illustration of an example of the vending machine assembly 1 of the present disclosure, with front door assembly 100 removed and interior cup rail guide system 700 shown in a swung open position, revealing interior assemblies;

FIG. 4 is detail face view of the interior side 101 of front door assembly 100, revealing assemblies 200, 300, 400, 500 attached to the front door assembly 100, with upper chute 207 removed for clarity;

FIG. 5A is a 3-D perspective view of additive supplement assembly 200, shown apart from the rest of vending machine assembly 1;

FIG. 5B is a frontal view of additive supplement assembly 200, with chutes 207, 208 not shown (removed) to expose inner components associated with canisters 201;

FIG. 5C is a side view of canisters 201 and associated components;

FIG. 5D is a 3-D perspective view of chutes 207, 208, shown apart from the rest of vending machine assembly 1;

Figure 6:
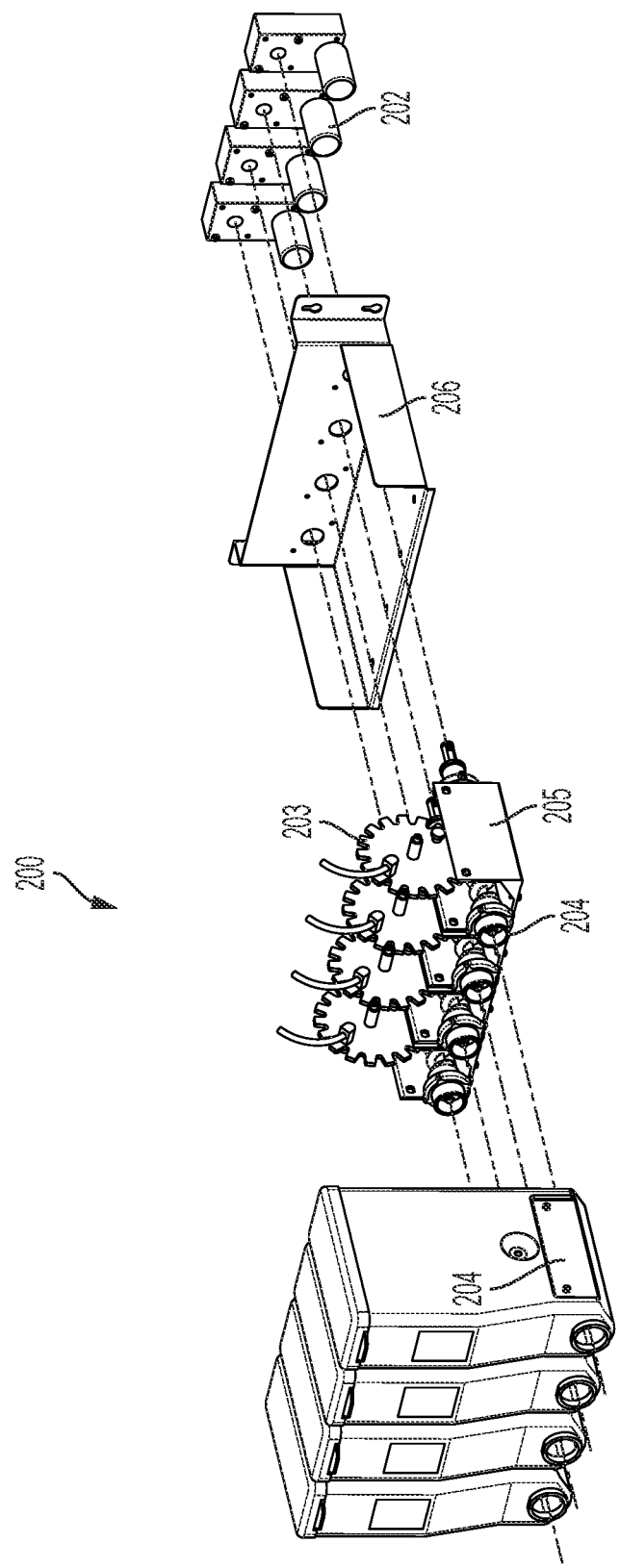
Figure 7:
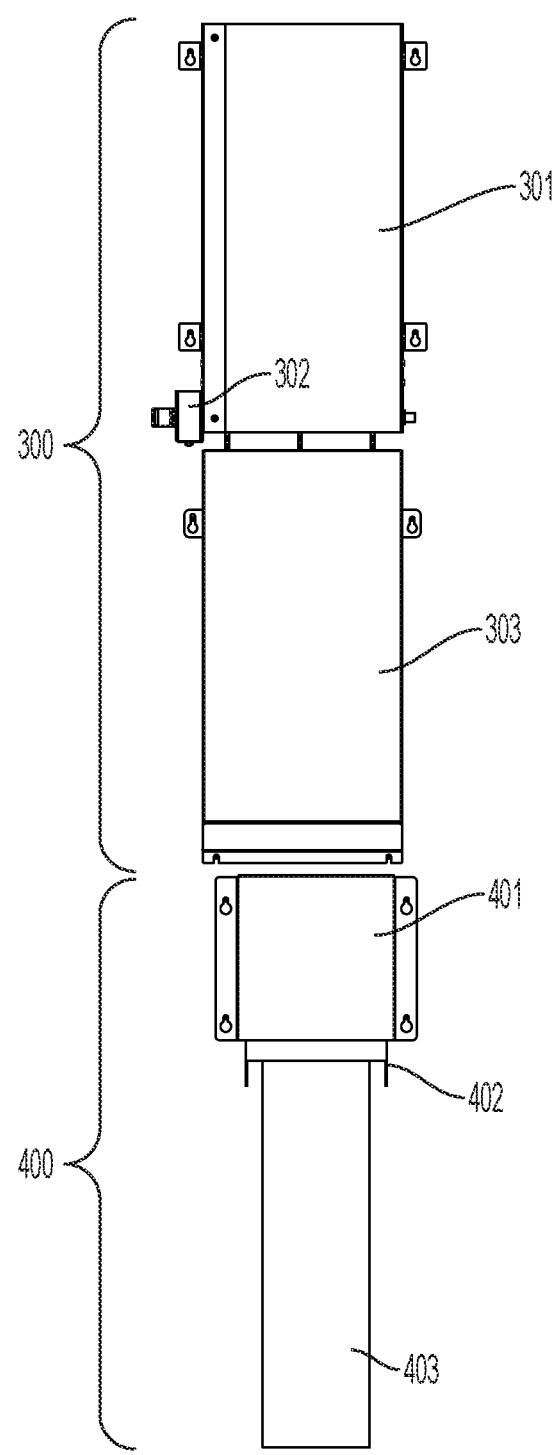
Figure 9B:
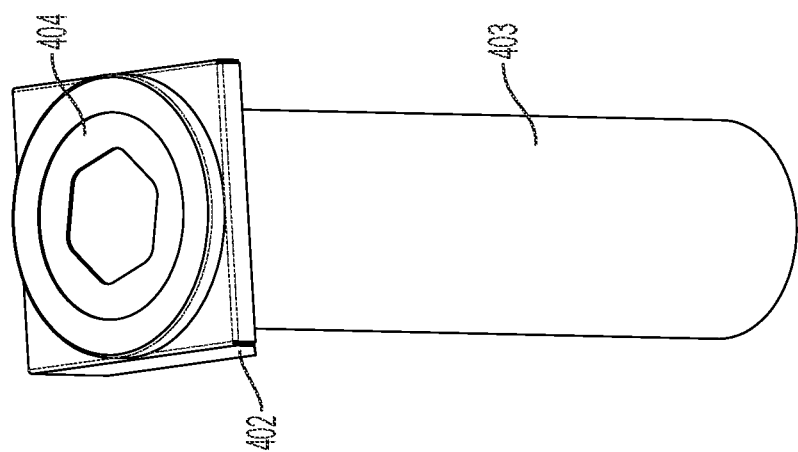
Figure 9A:
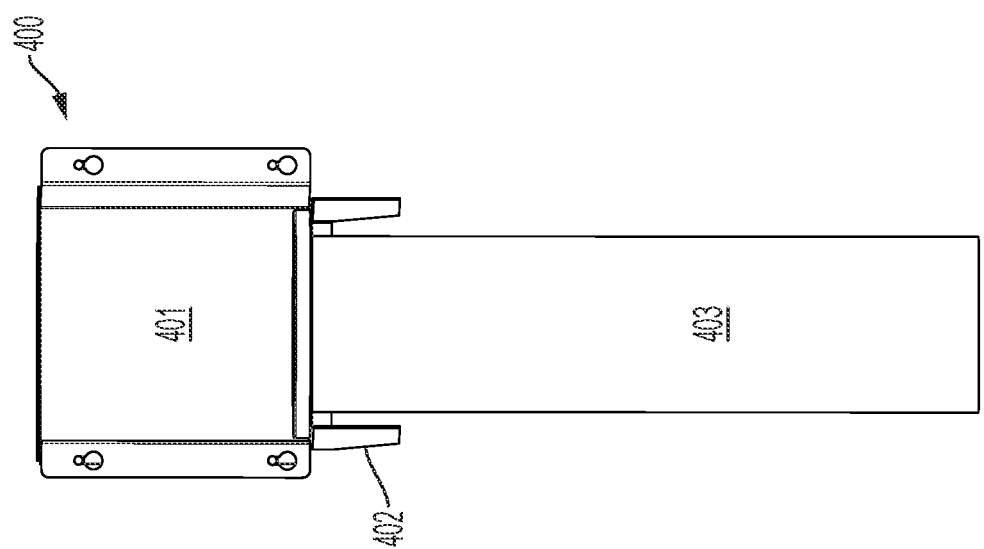
Figure 10B:
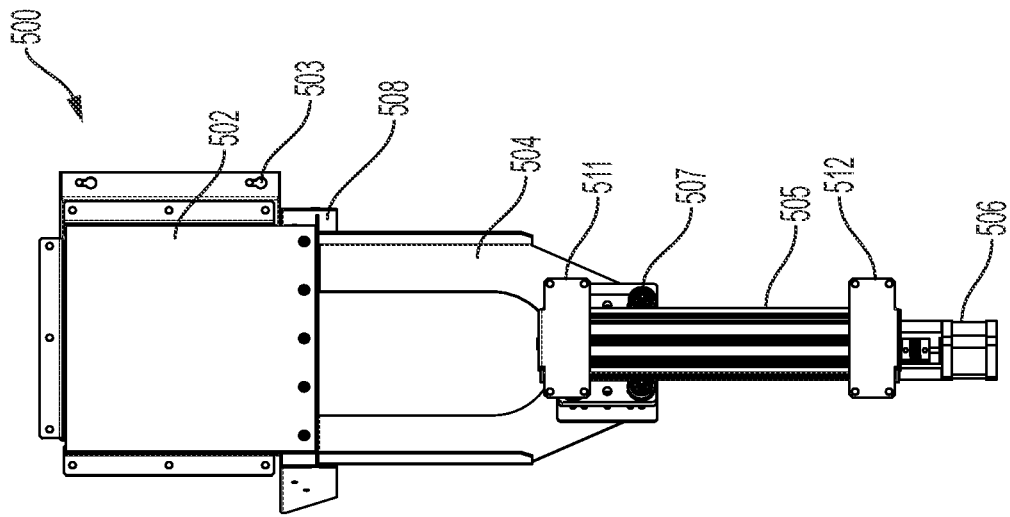
Figure 10A:
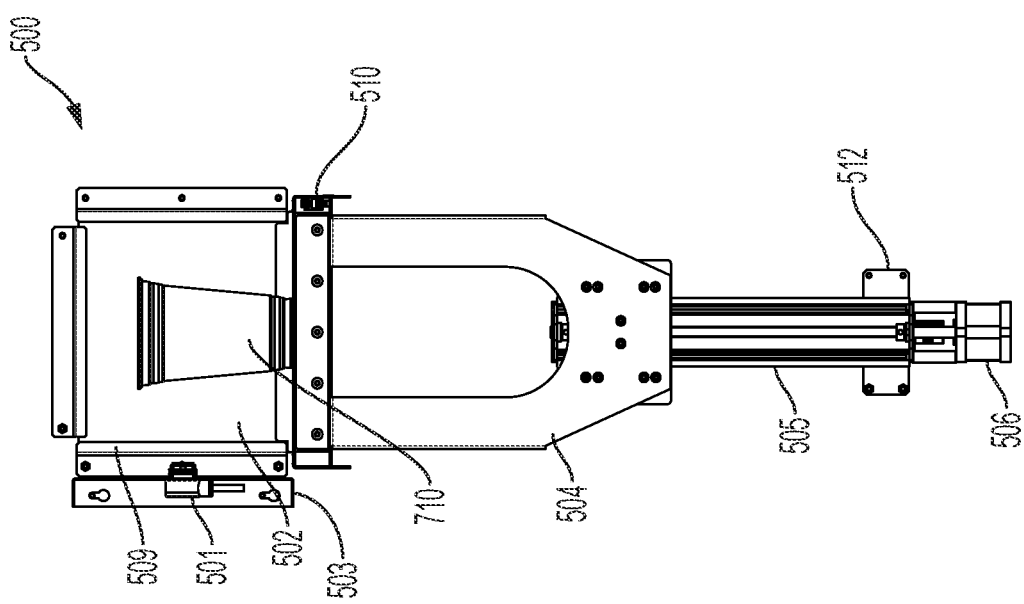
Figure 11:
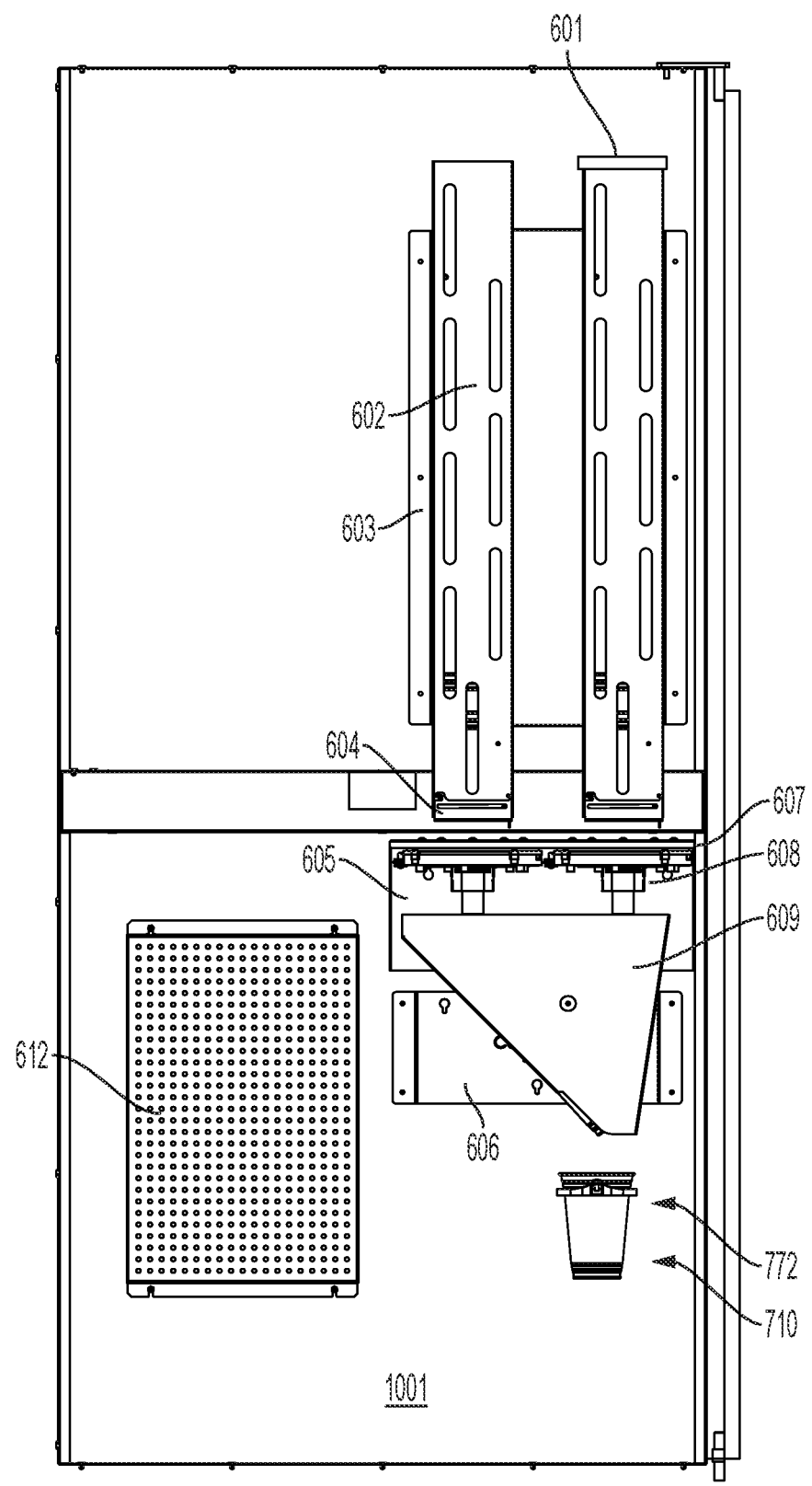
Figure 12:
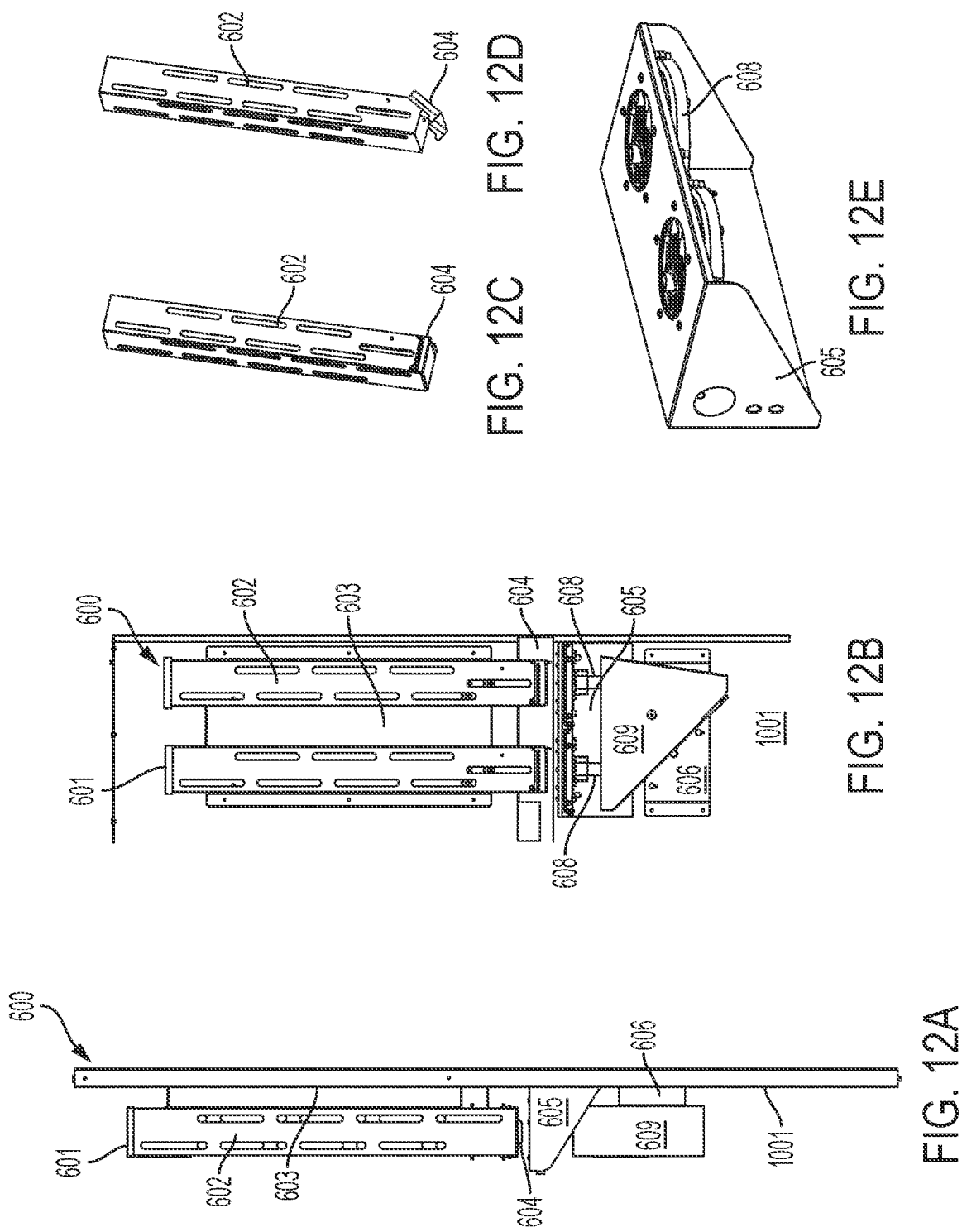
Figure 13:
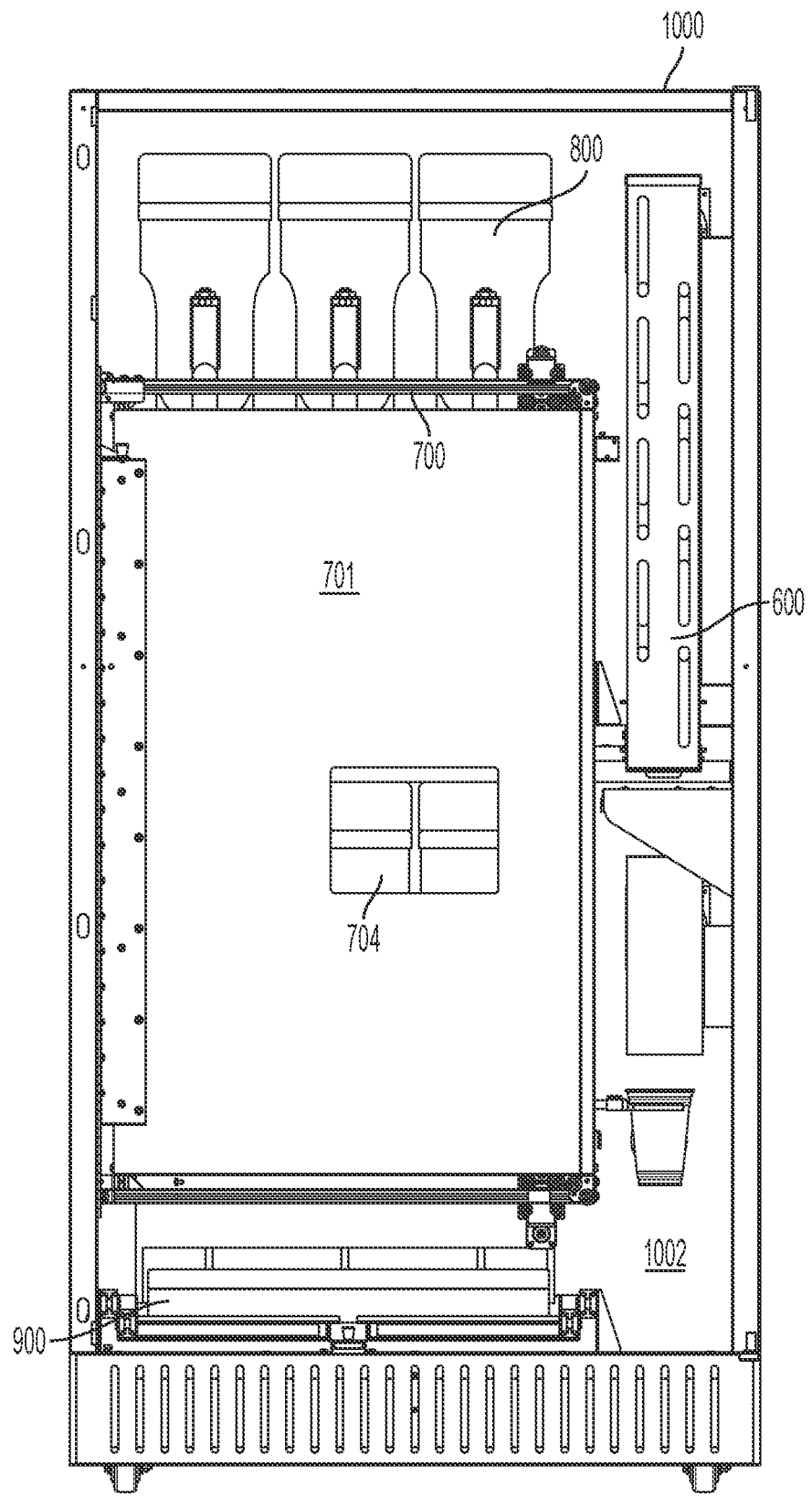
Figure 14A:
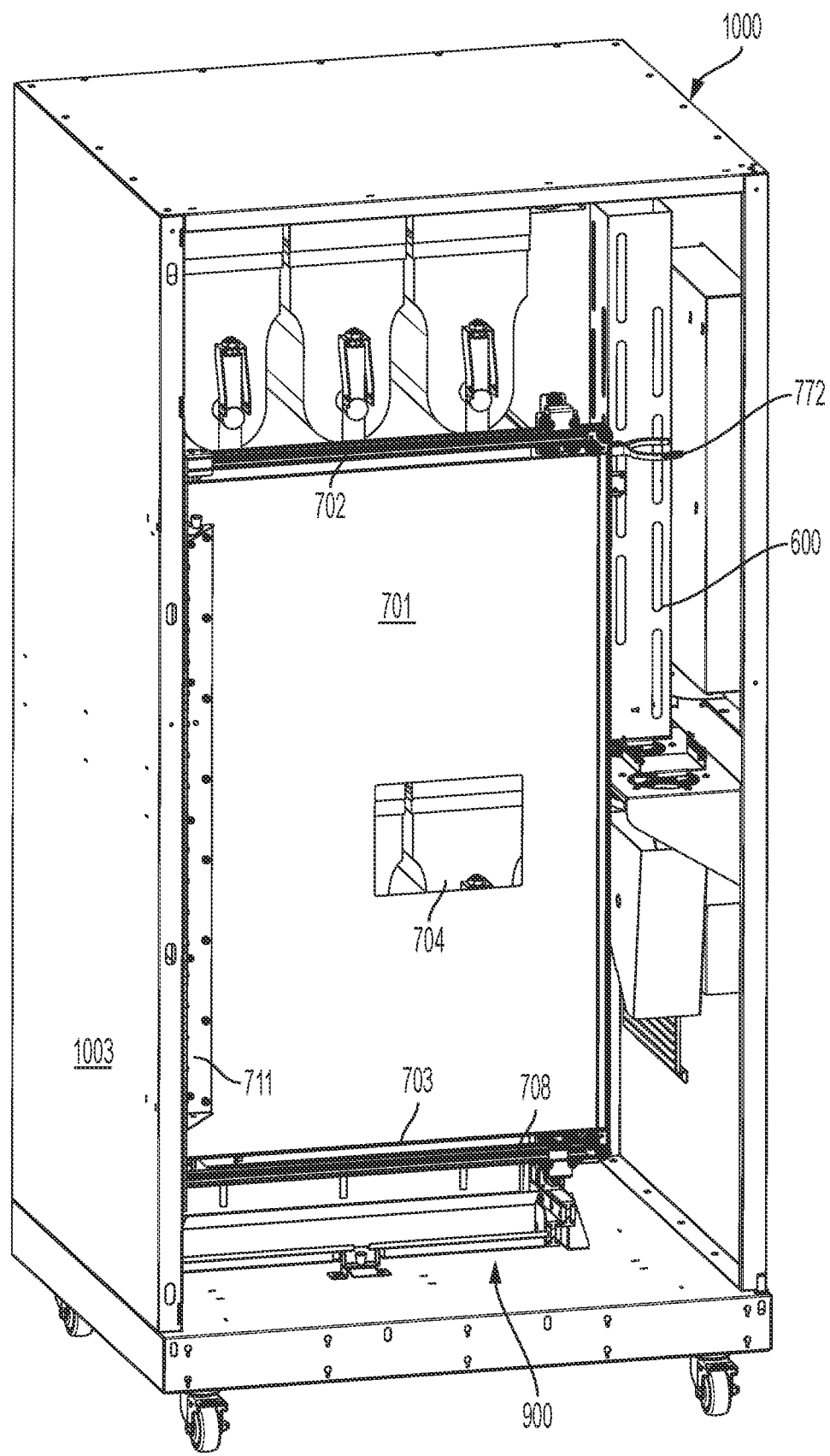
Figure 14B:
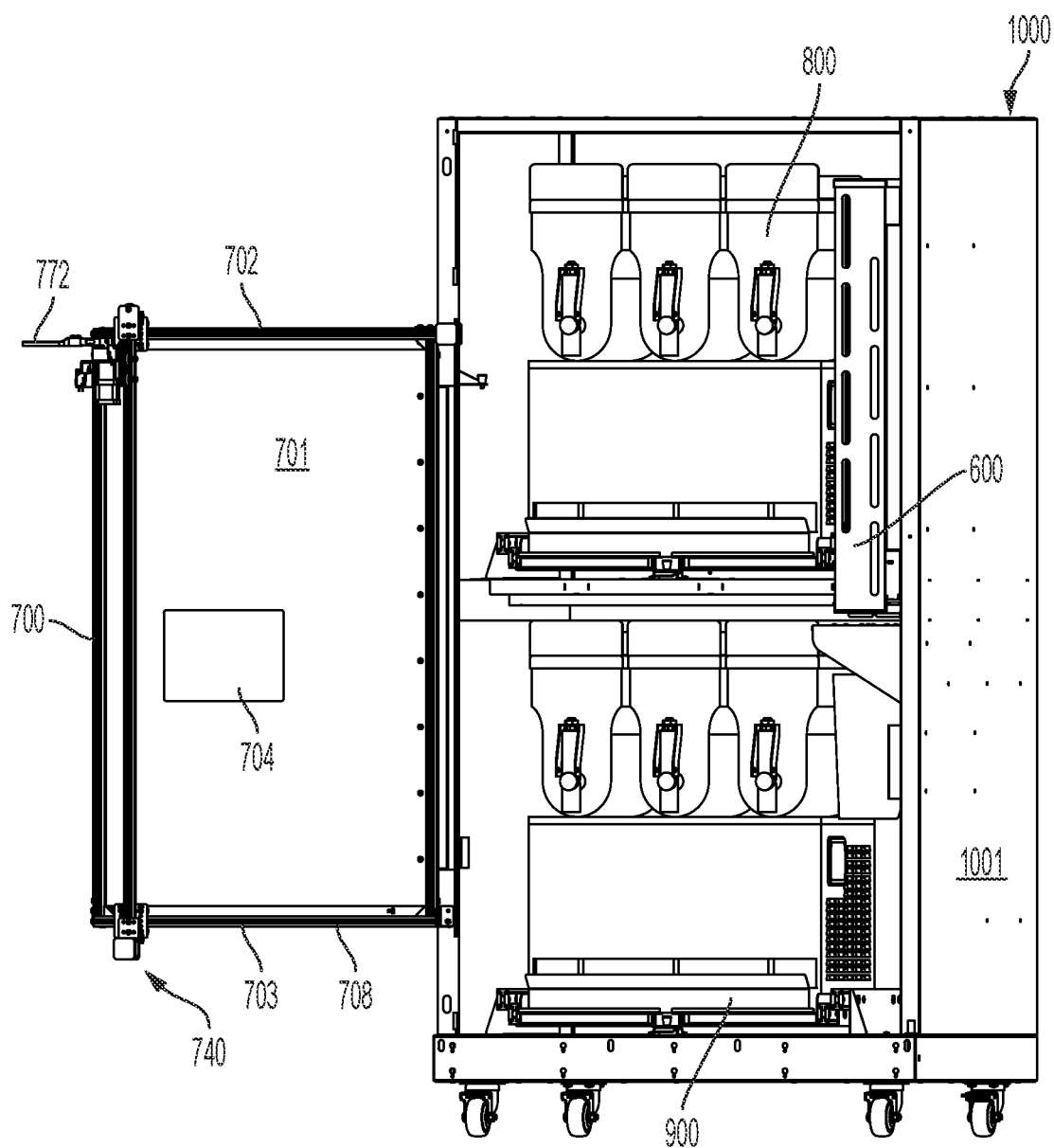
Figure 15A:
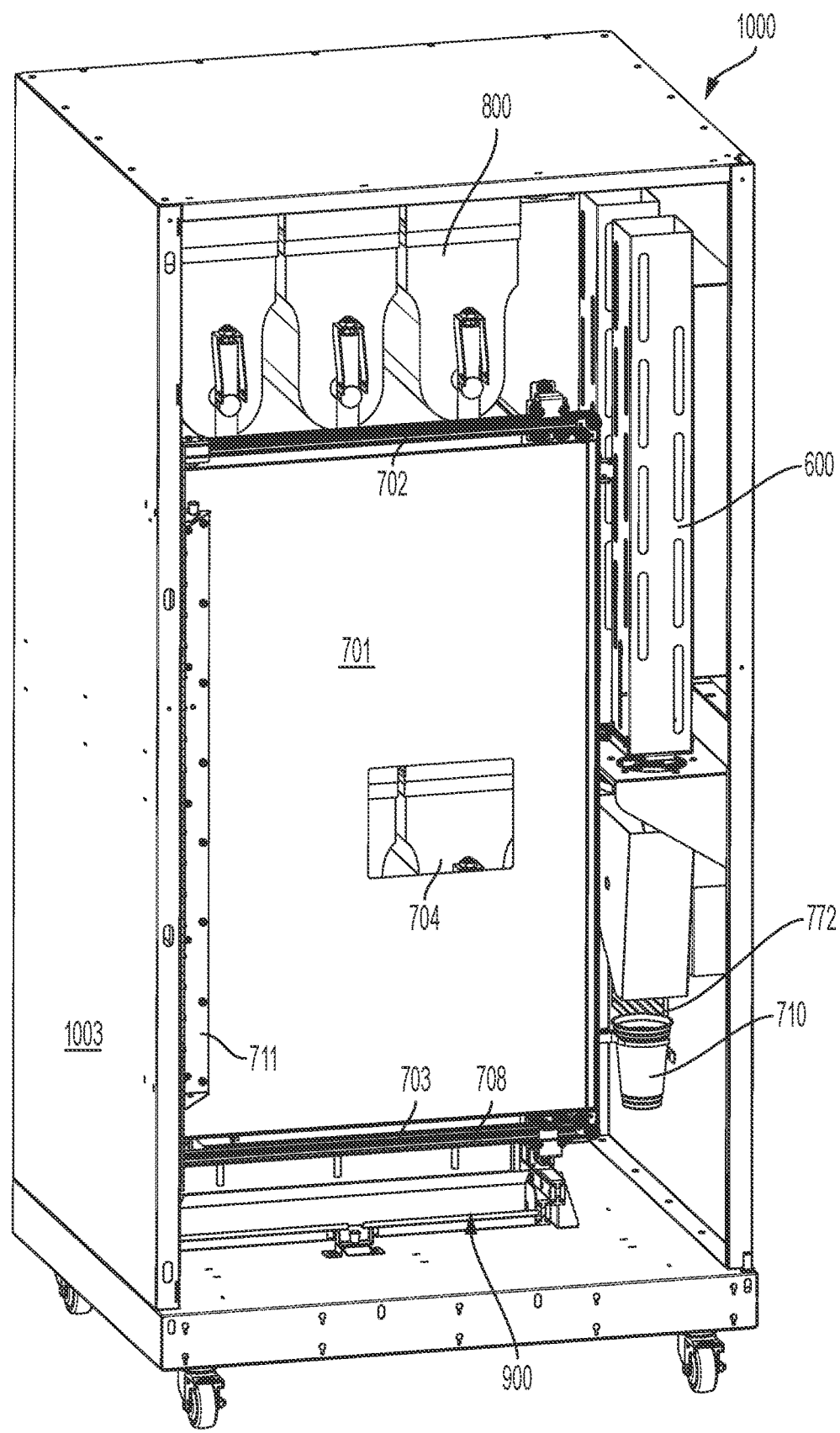
Figure 15B:
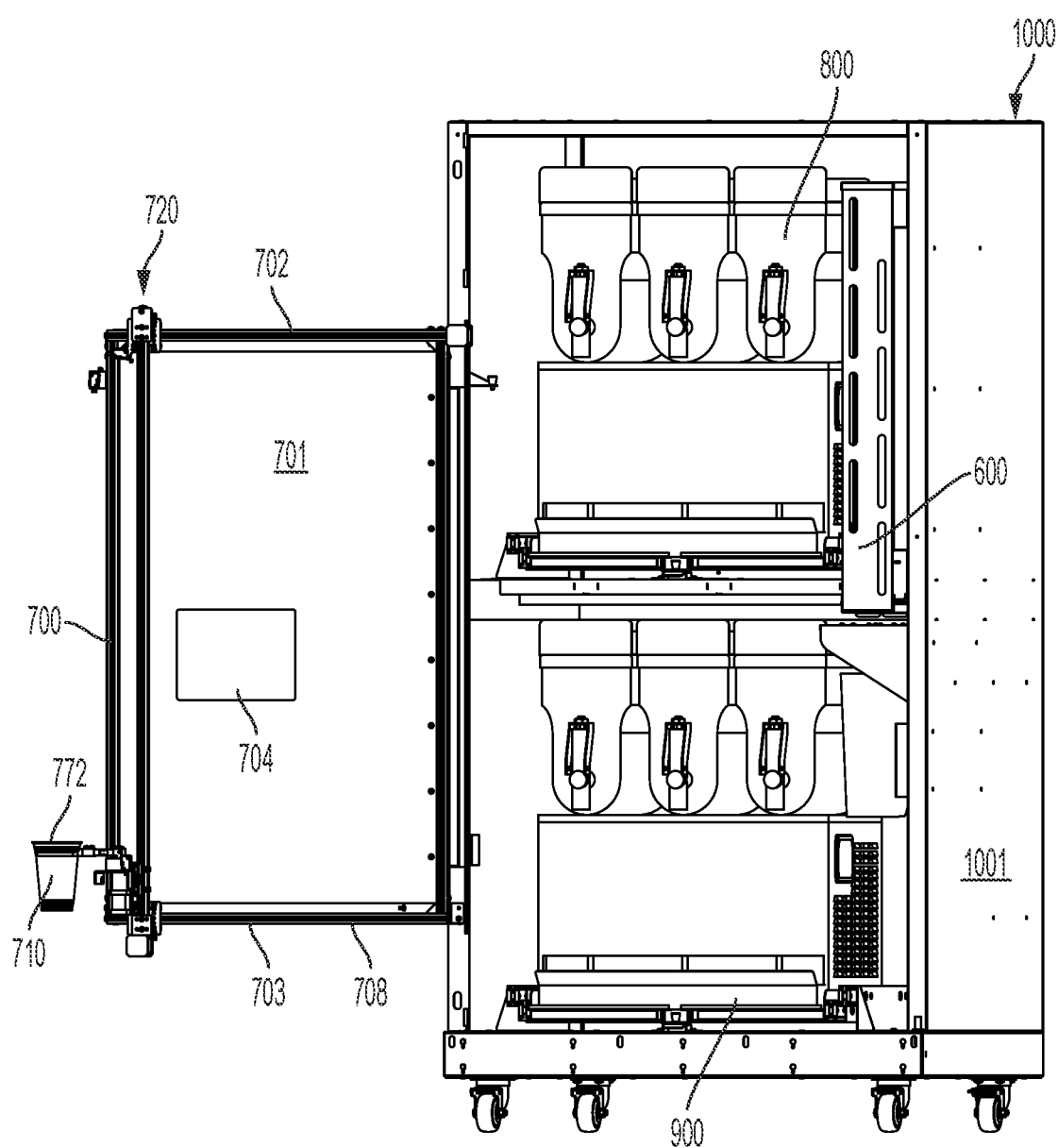
Figure 16:
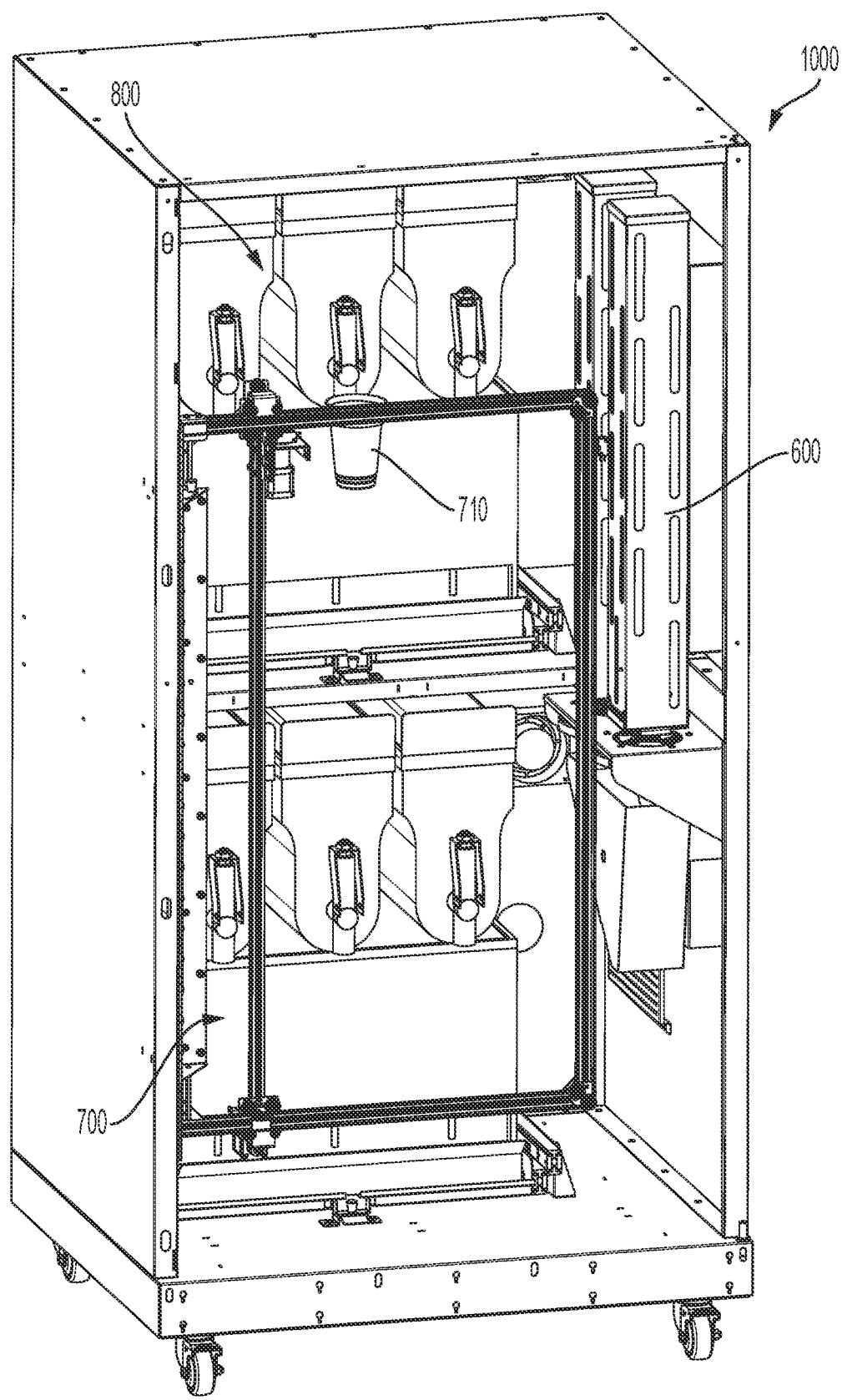
Figure 17:
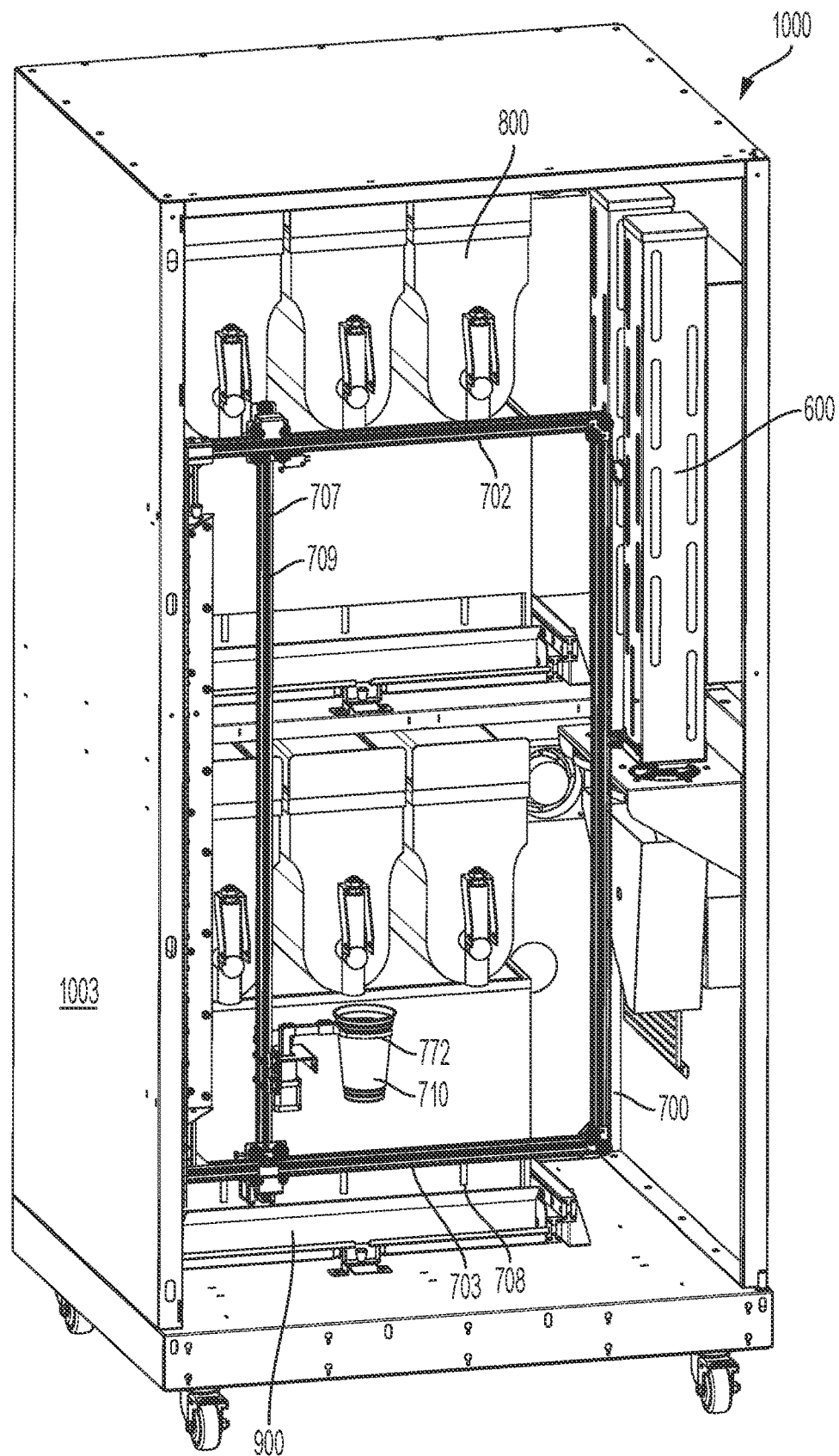
Figure 18A:
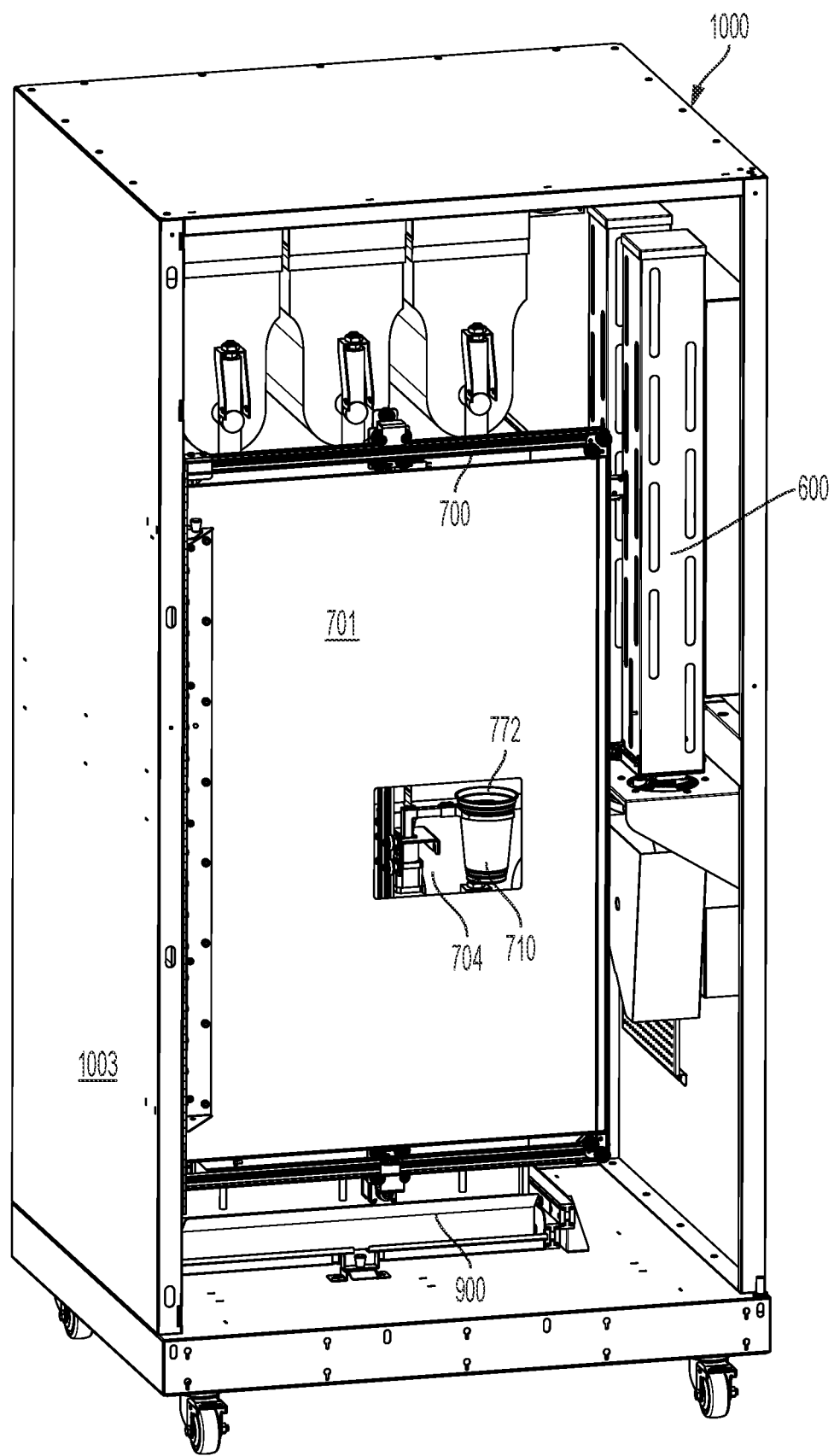
Figure 18B:
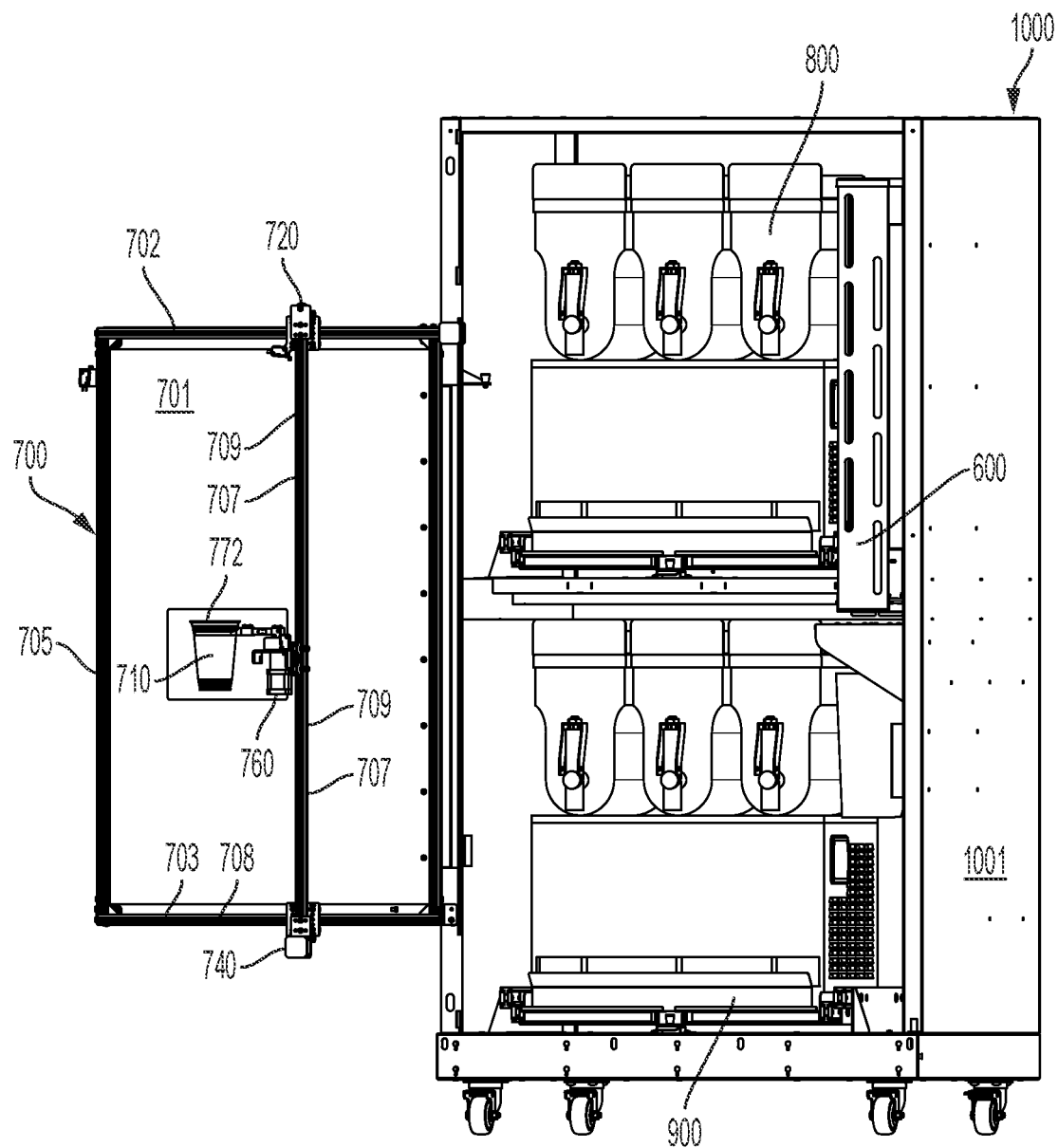
Figure 19:
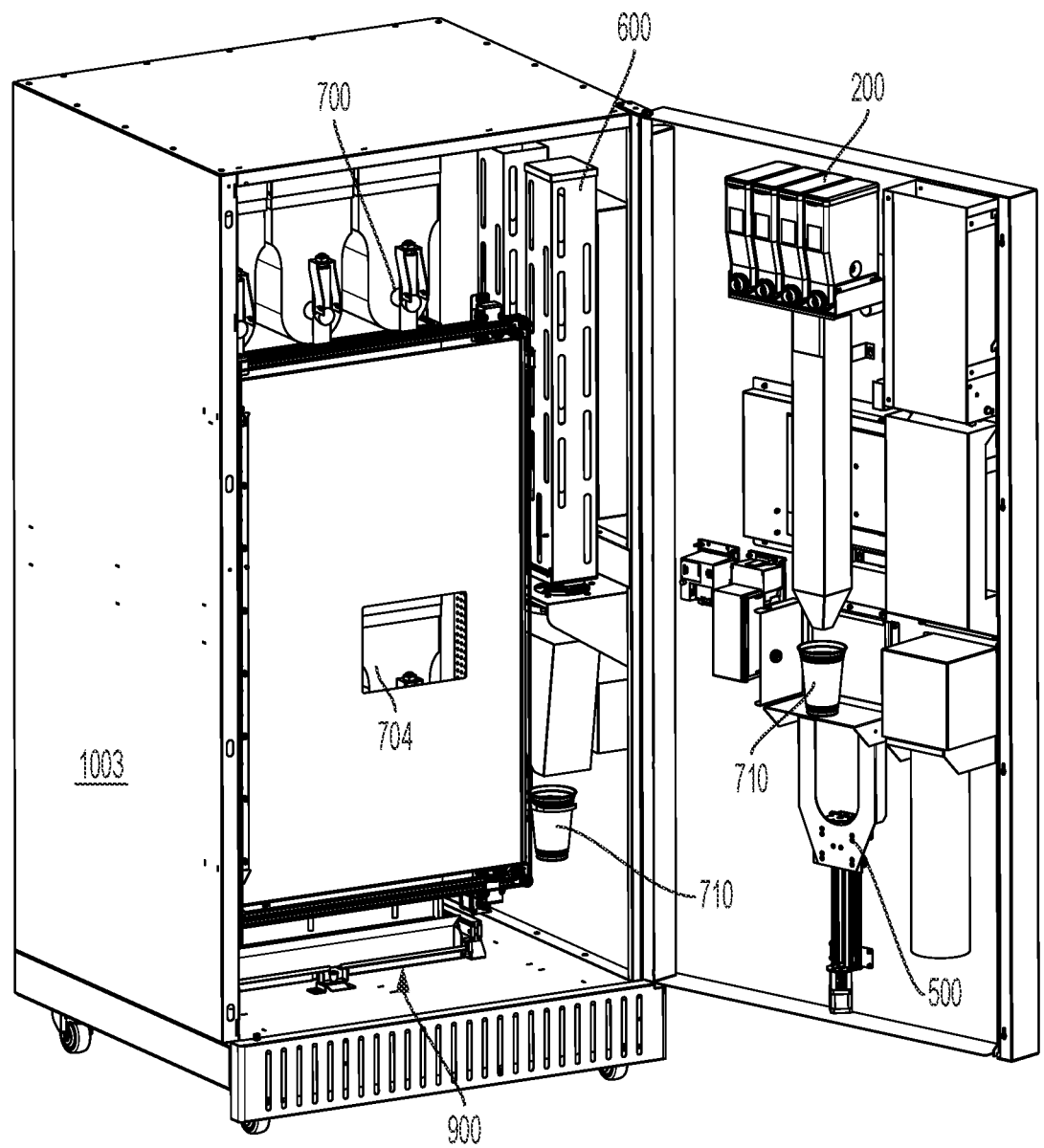
Figure 20:
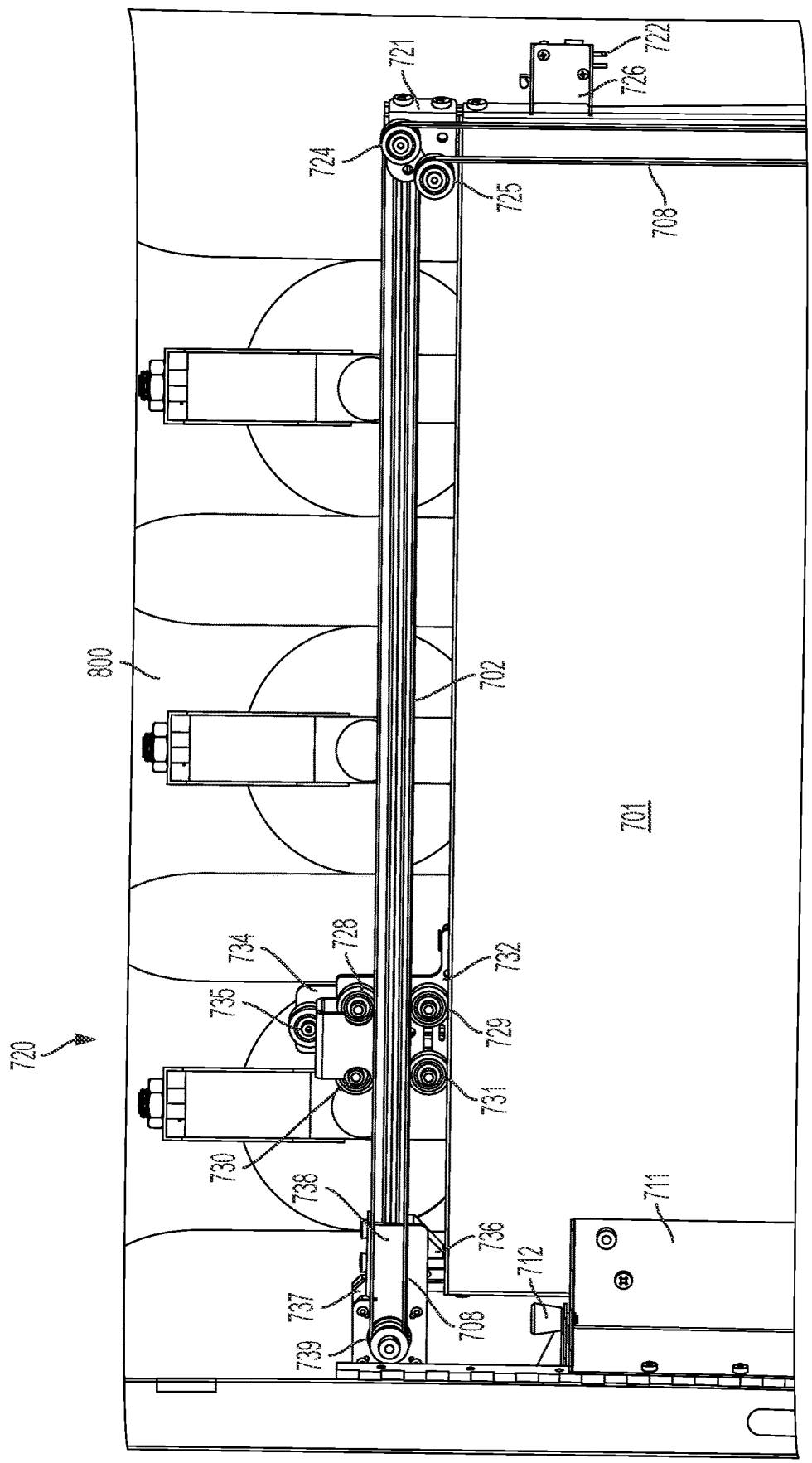
Figure 21A:
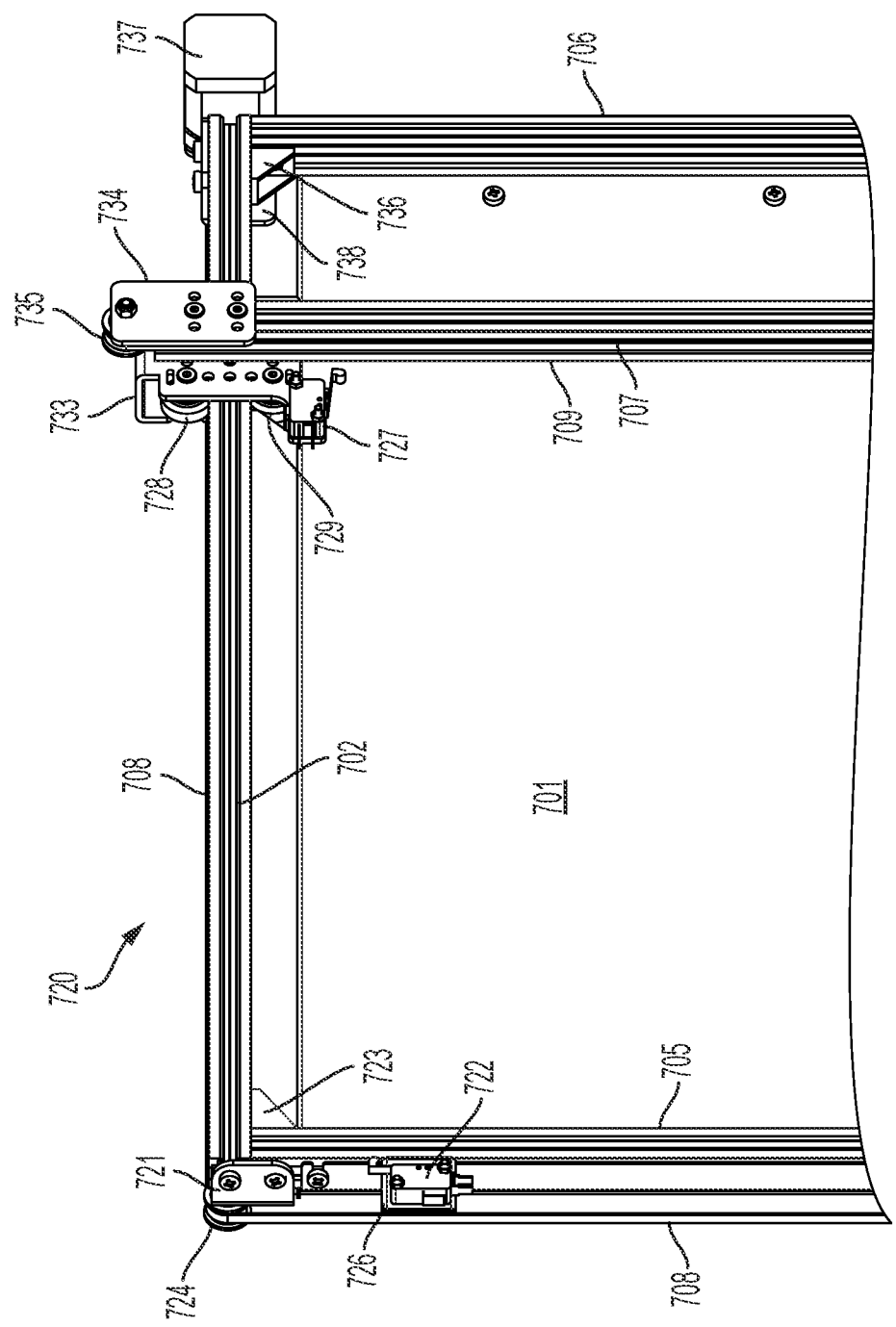
Figure 21B:
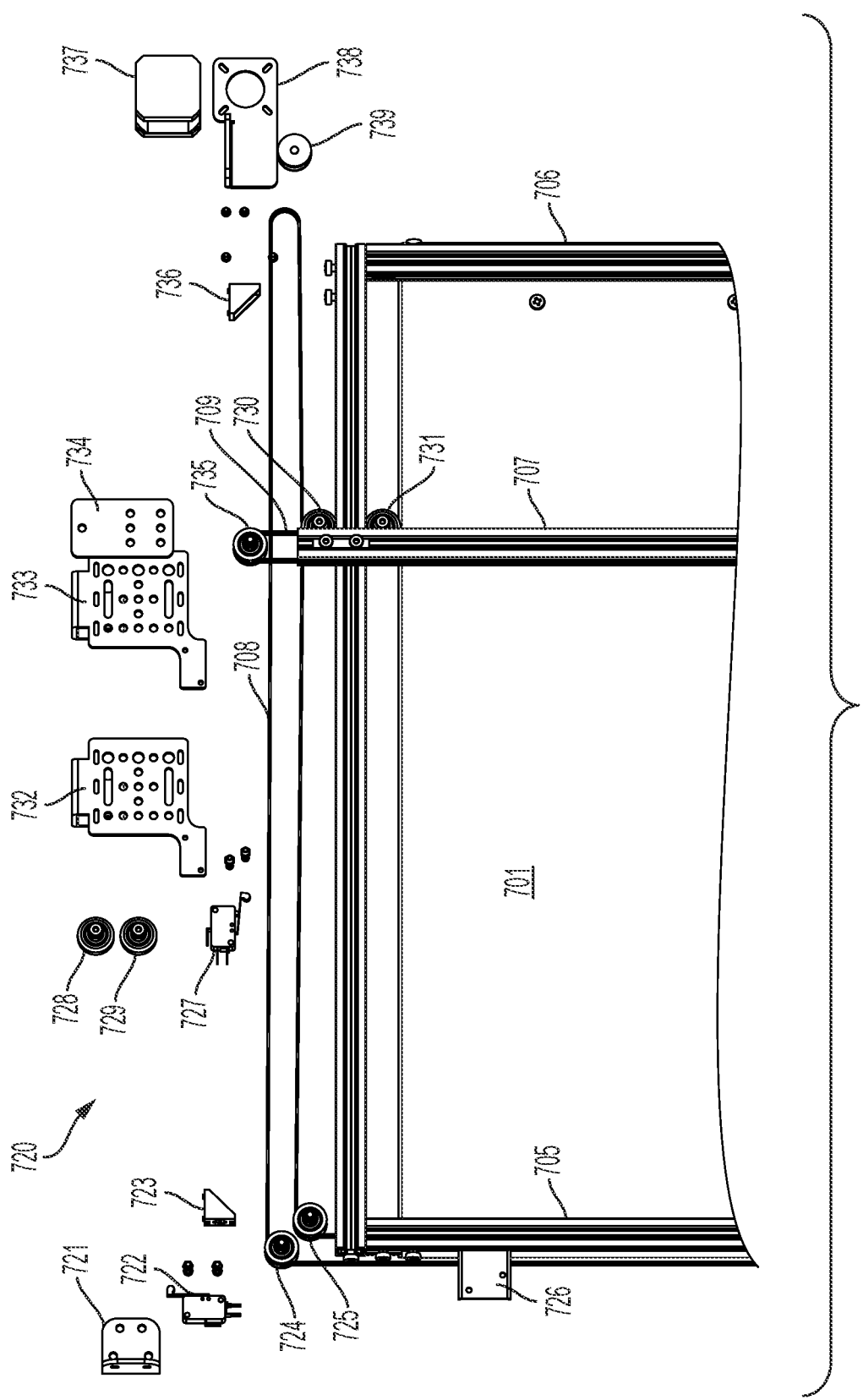
Figure 22:
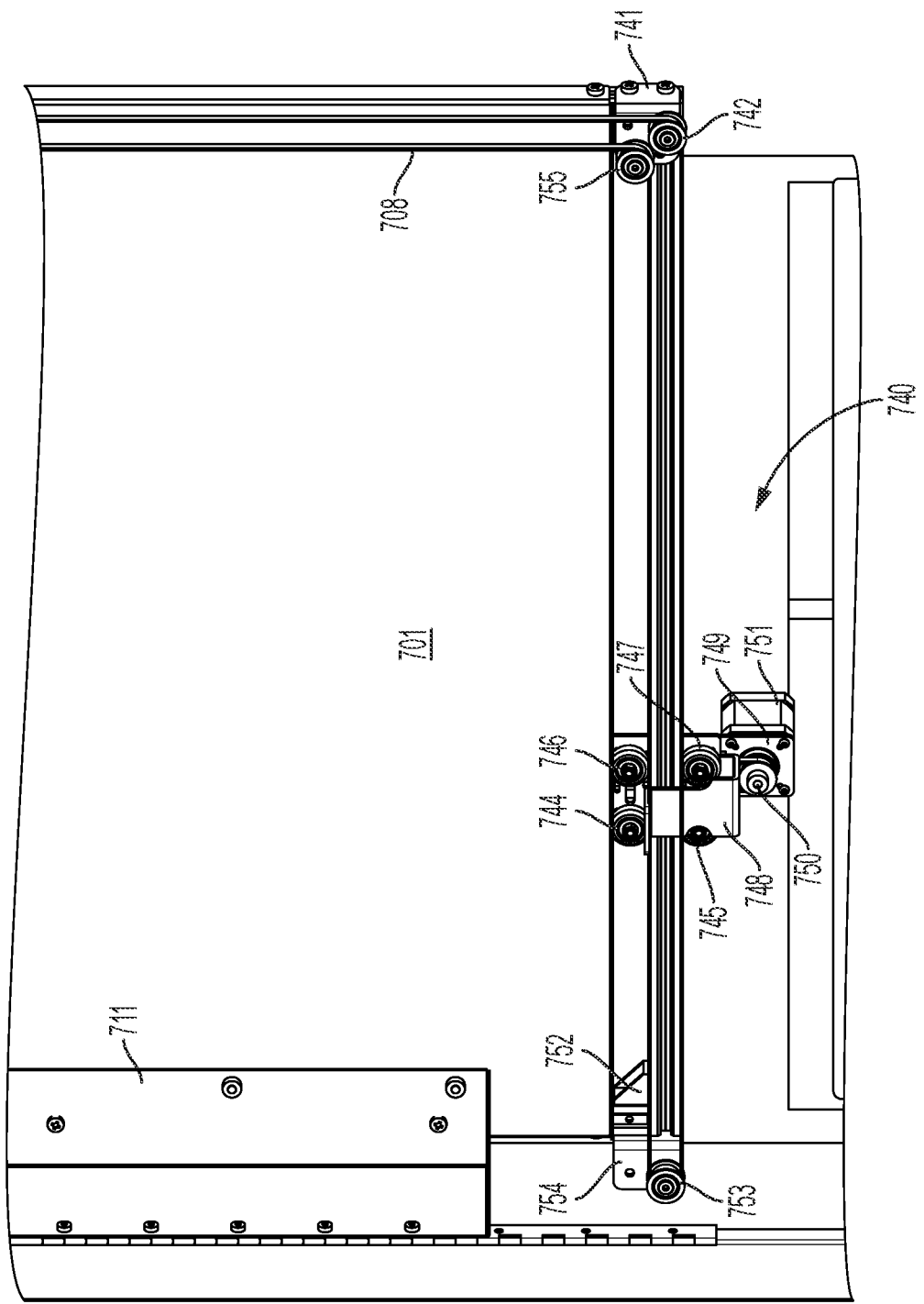
Figure 23A:
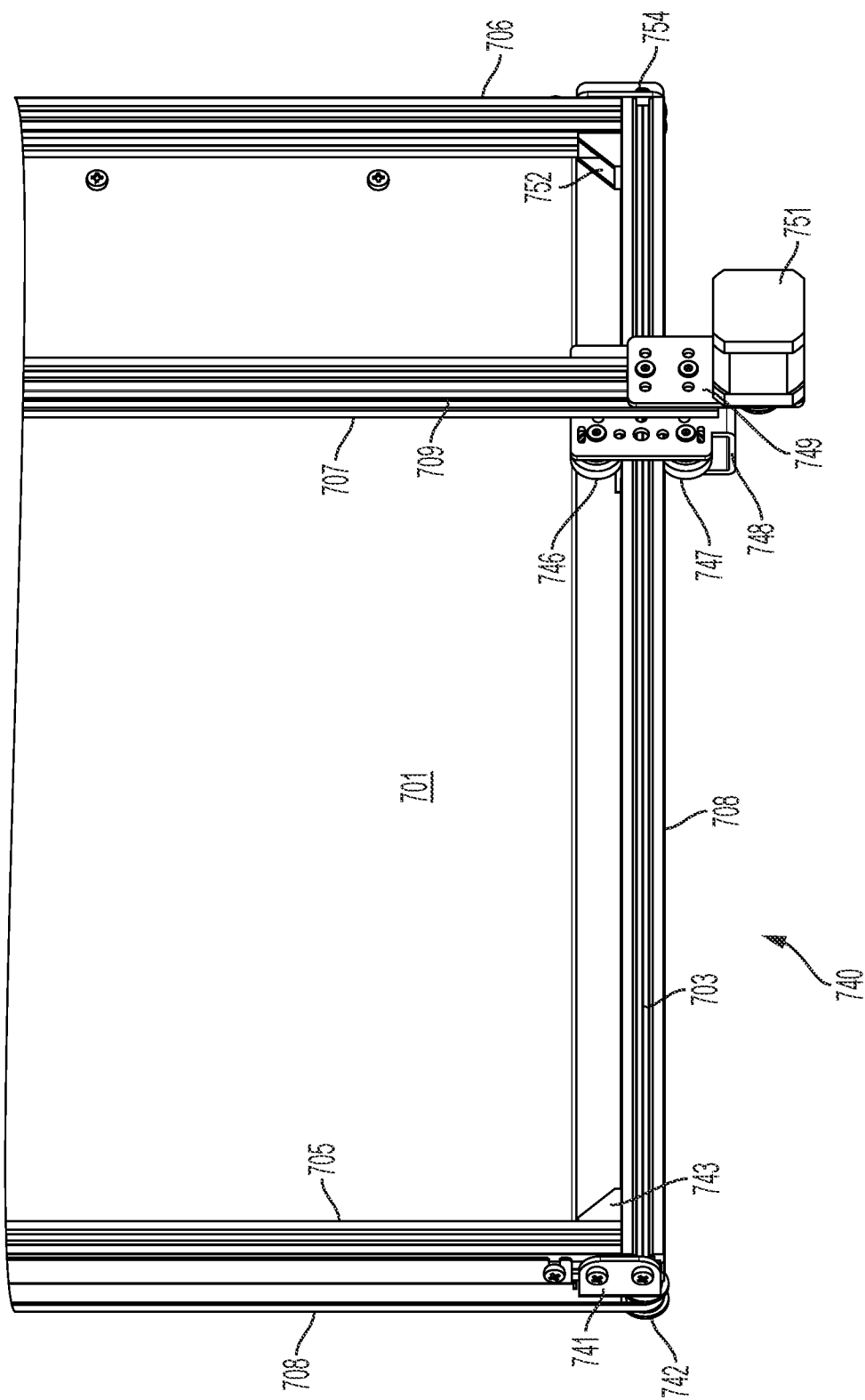
Figure 23B:
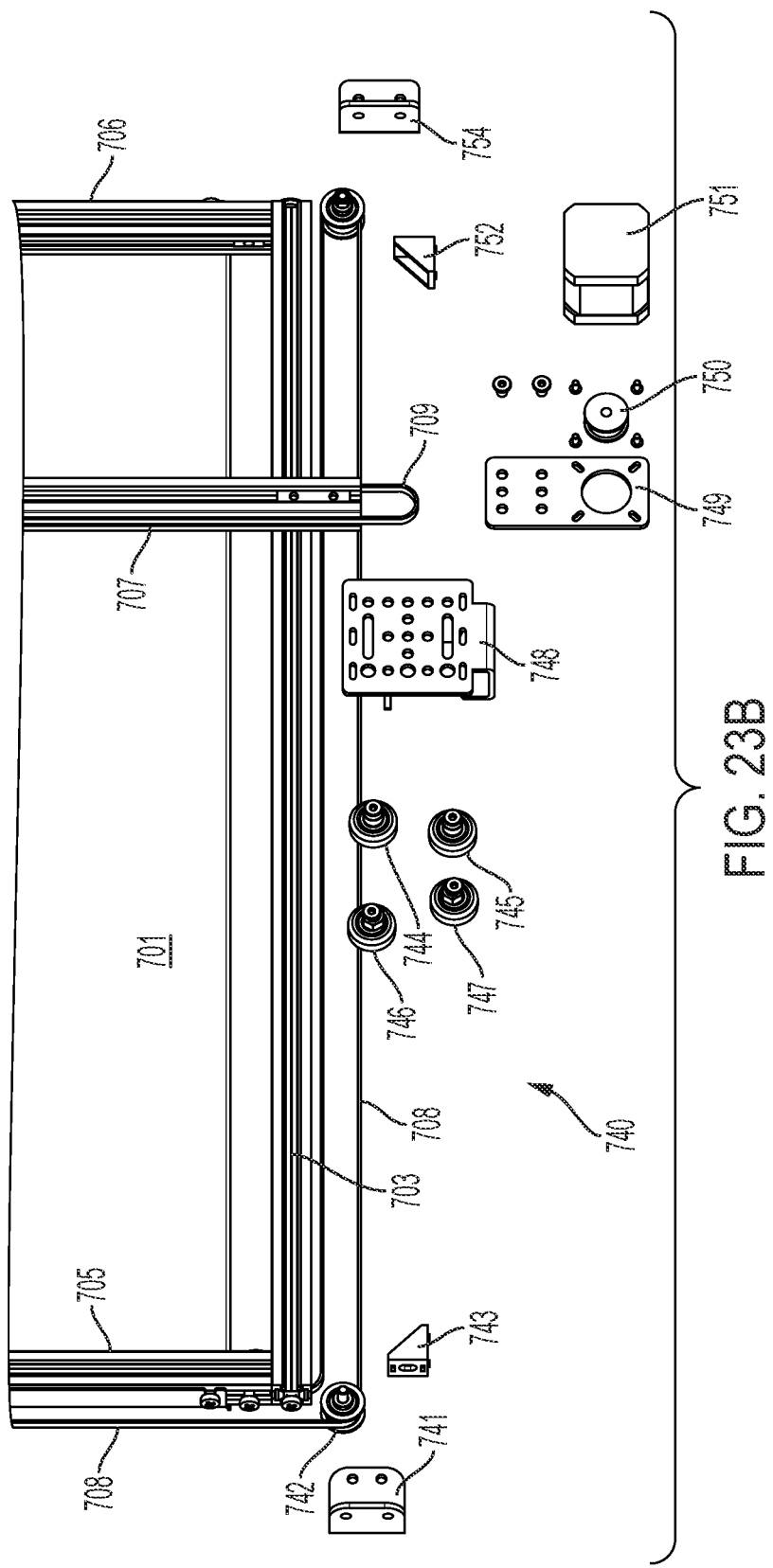
Figure 24A:
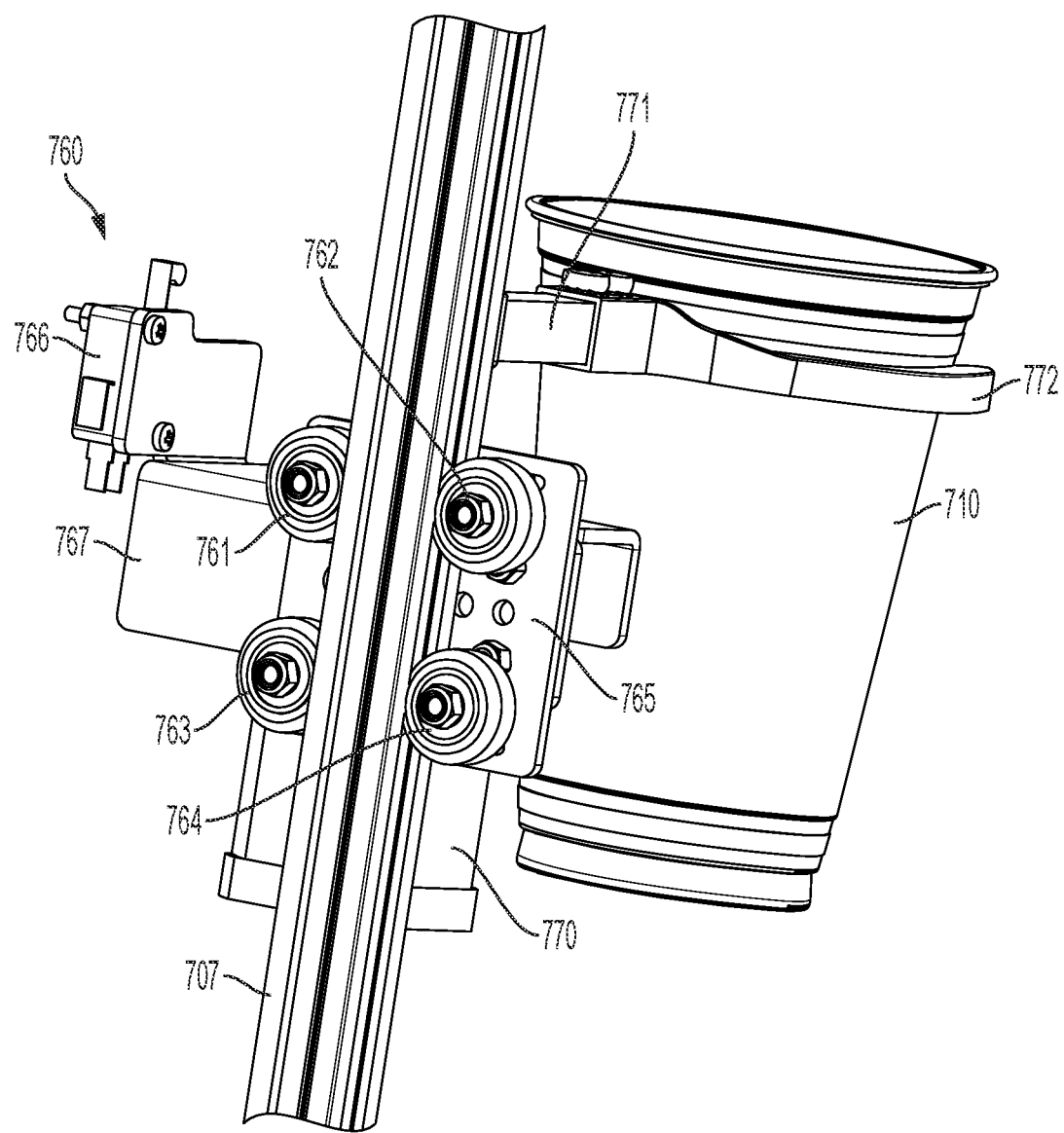
Figure 25:
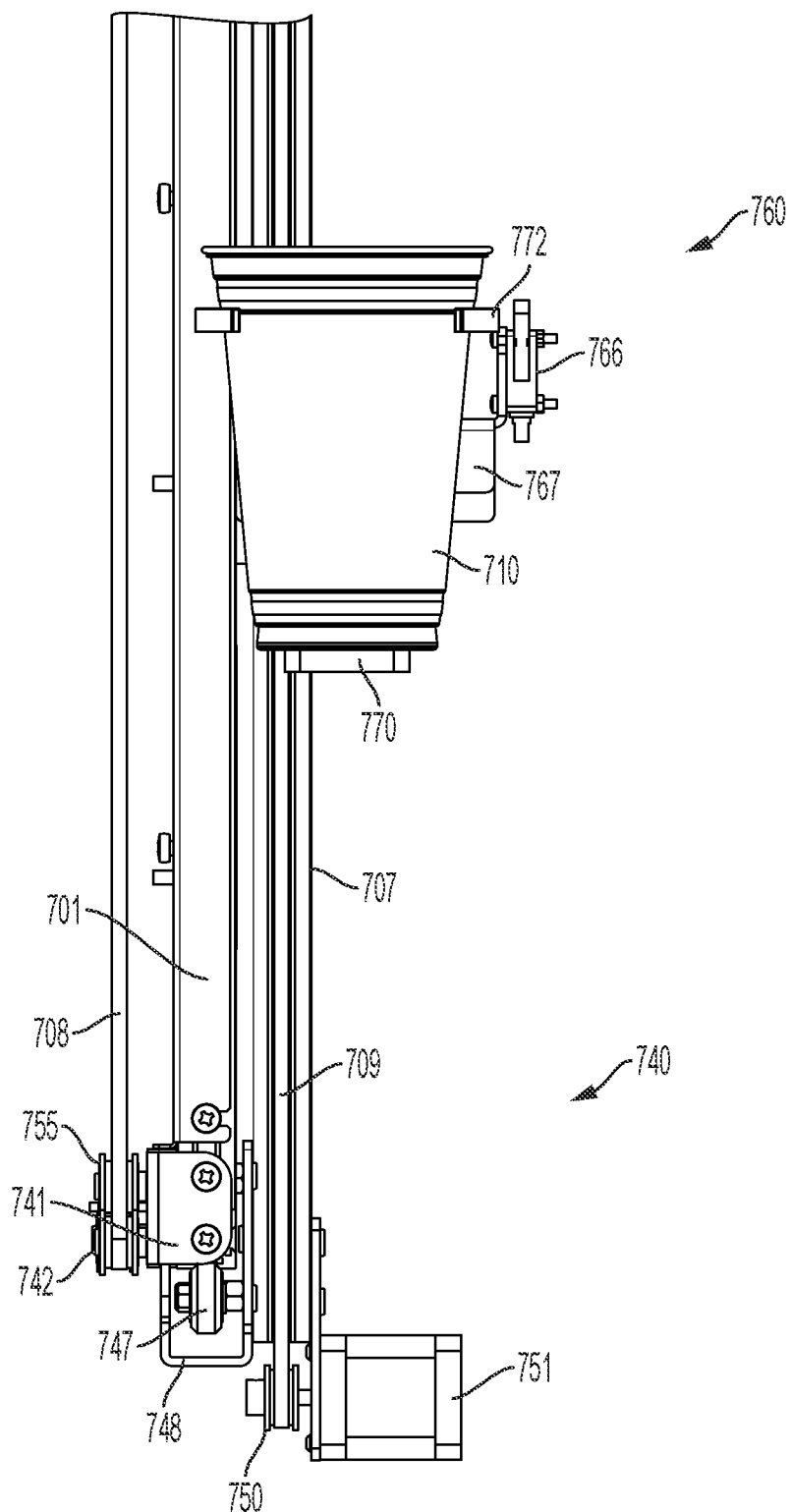
Figure 26:
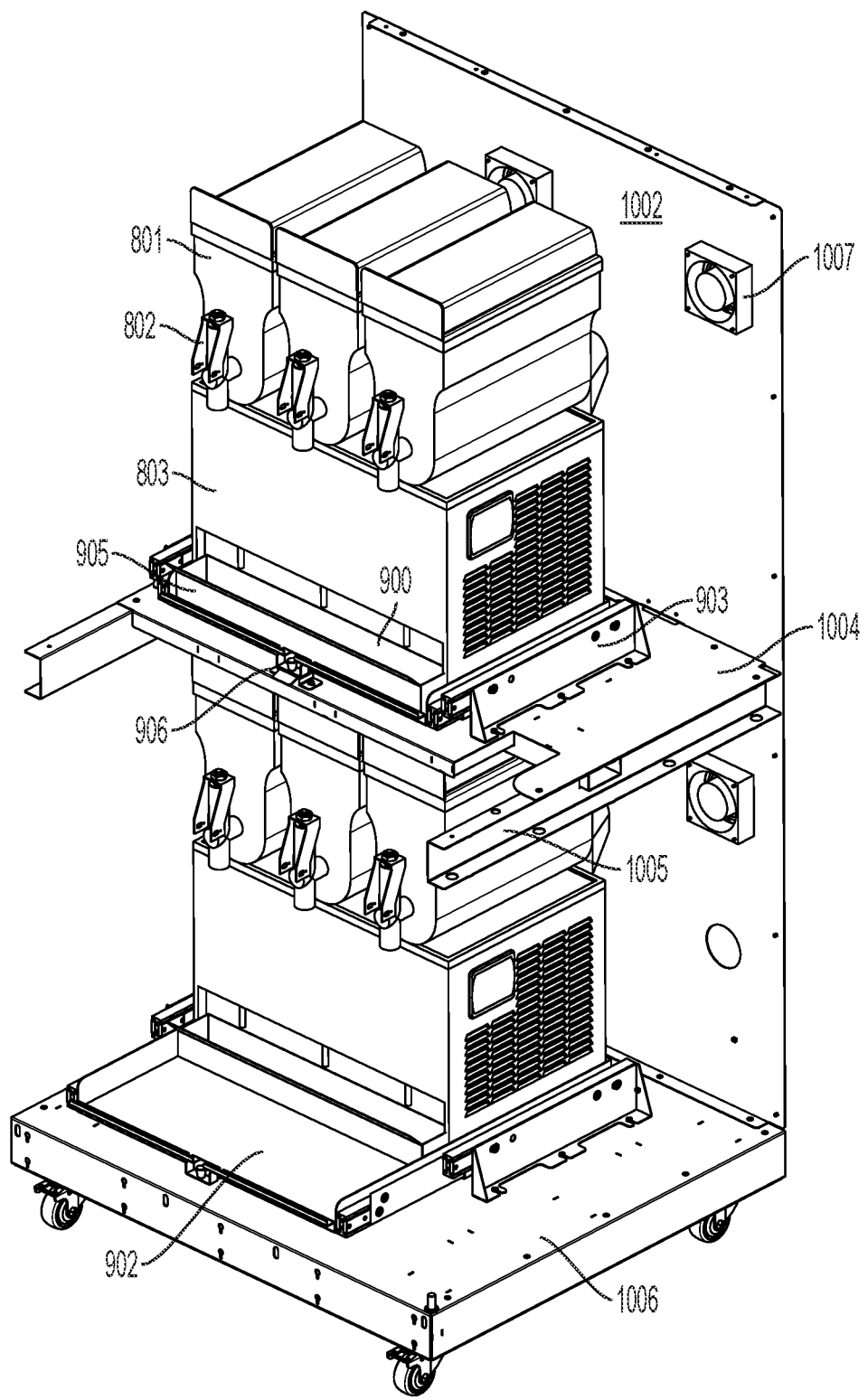
Figure 27B:
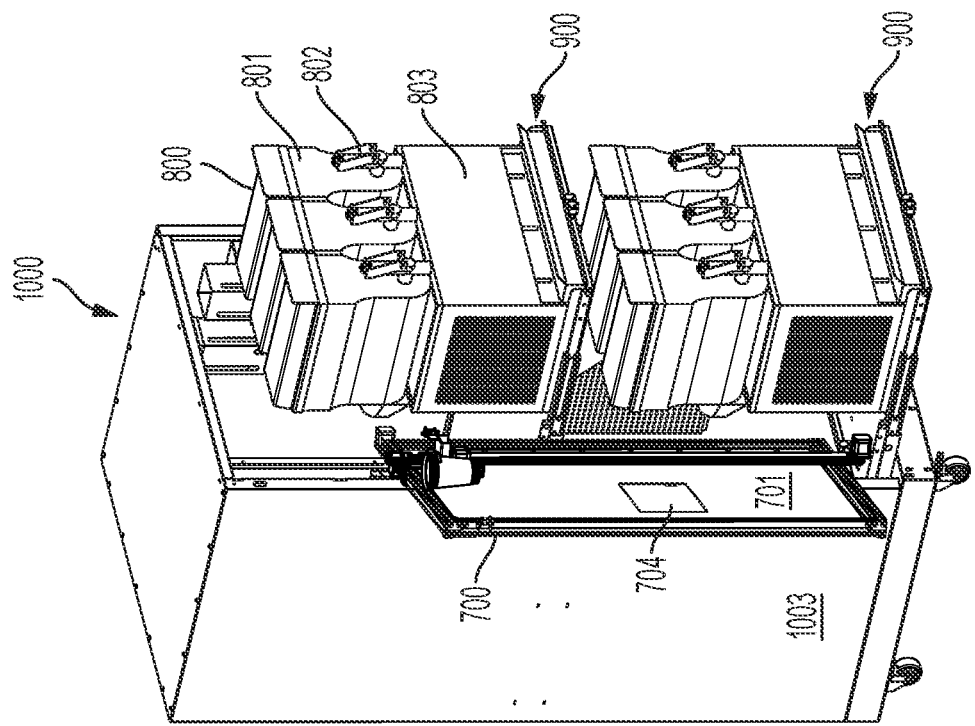
Figure 27A:
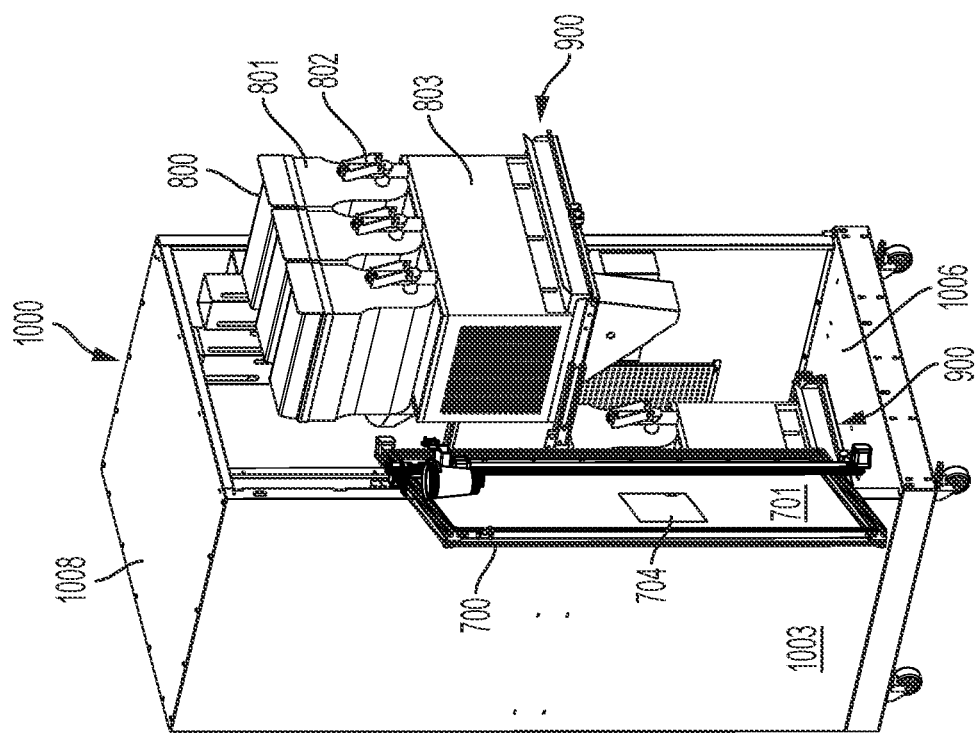
Figure 28B:
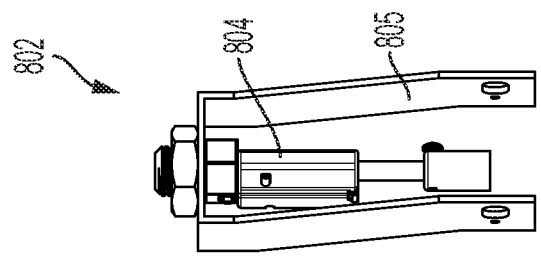
Figure 28A:
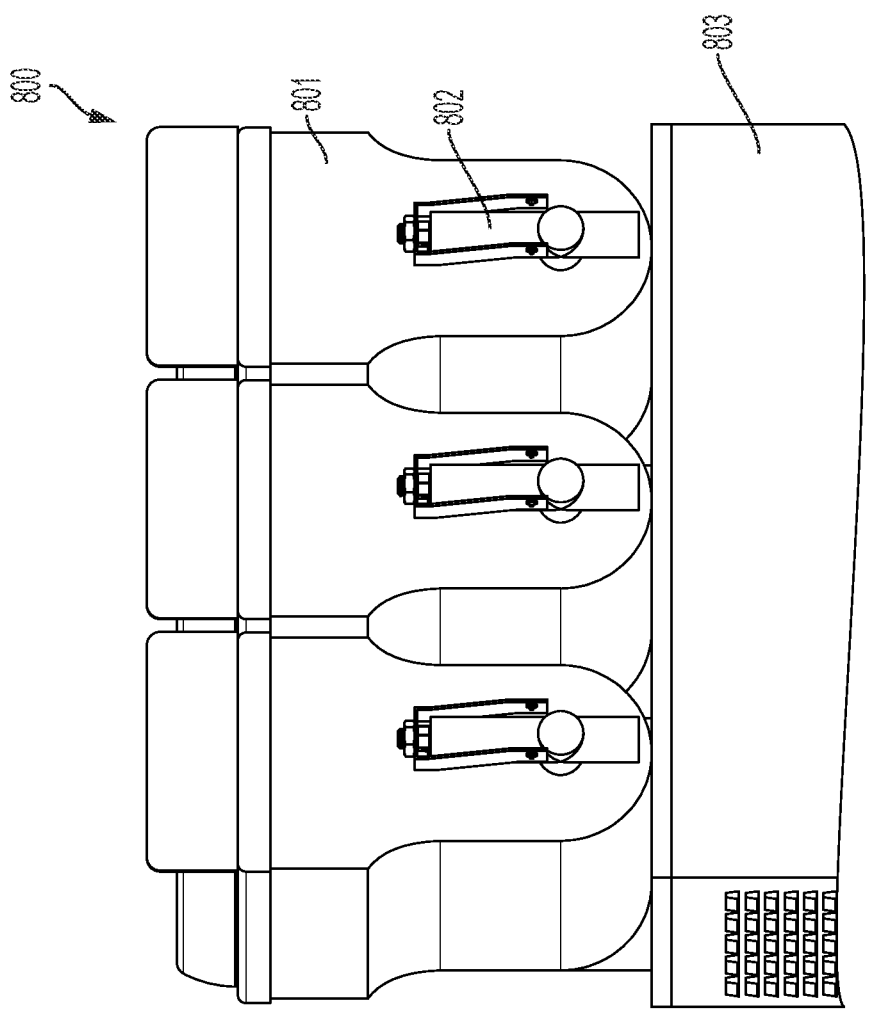
Figure 29B:
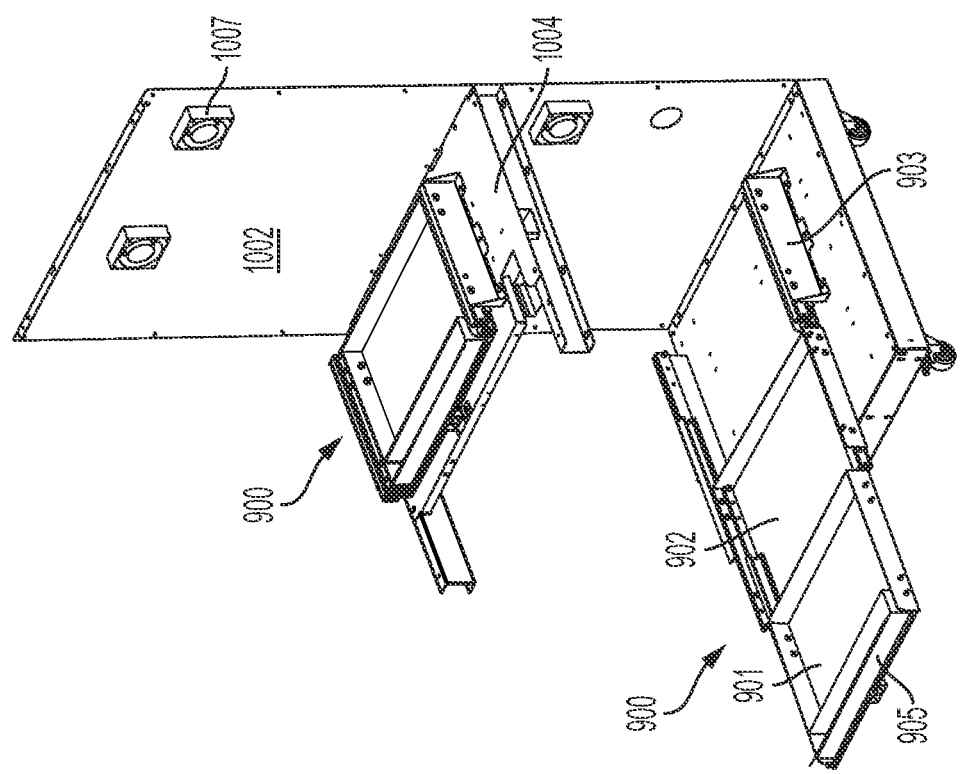
Figure 29A:
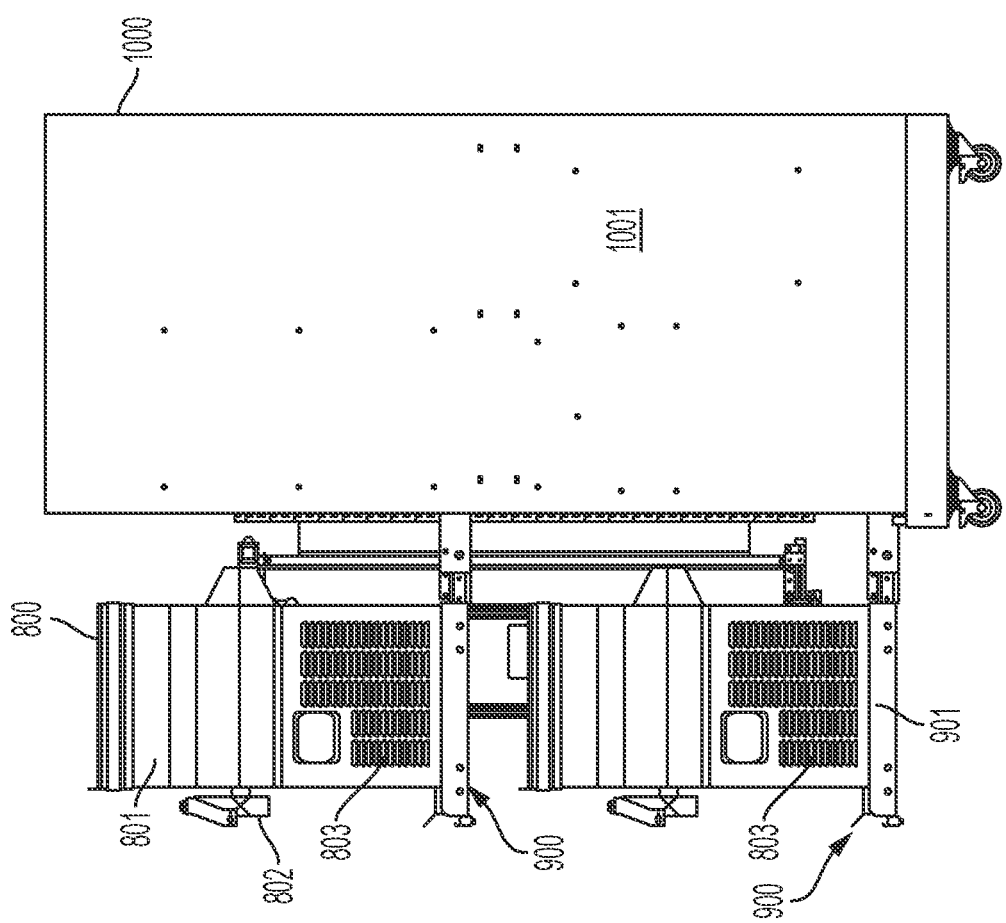
Figure 30:
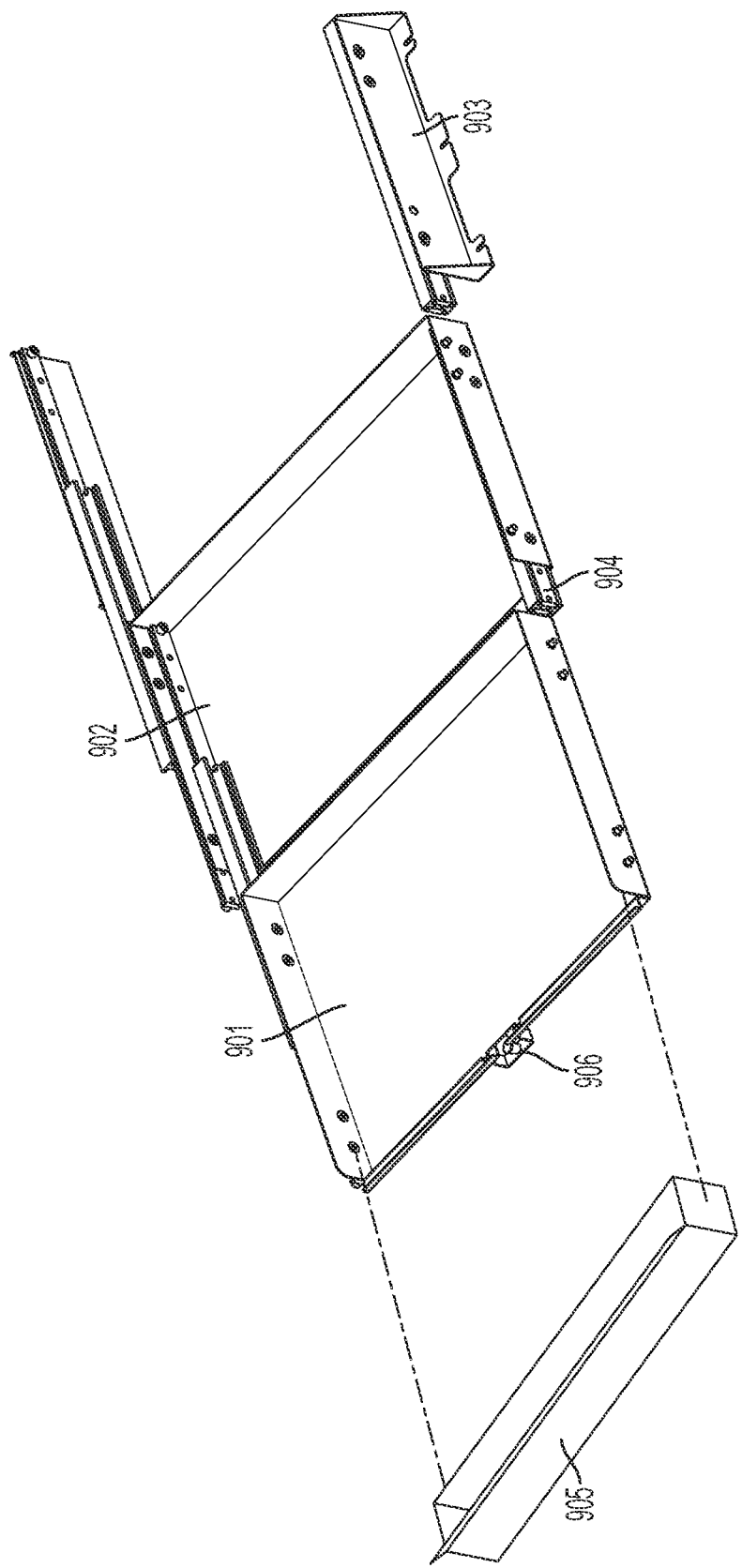
Figure 31B:
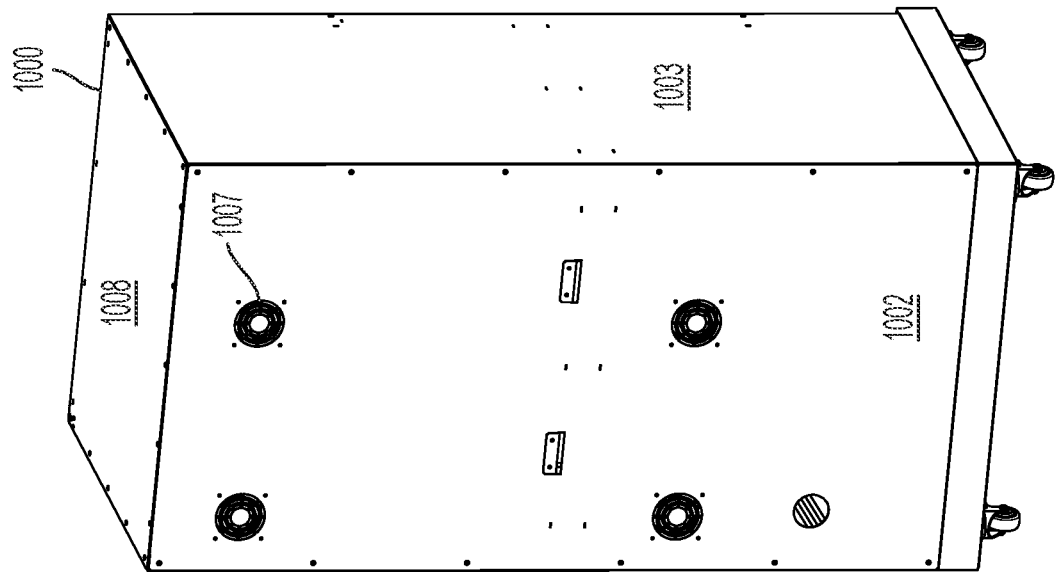
Figure 31A:
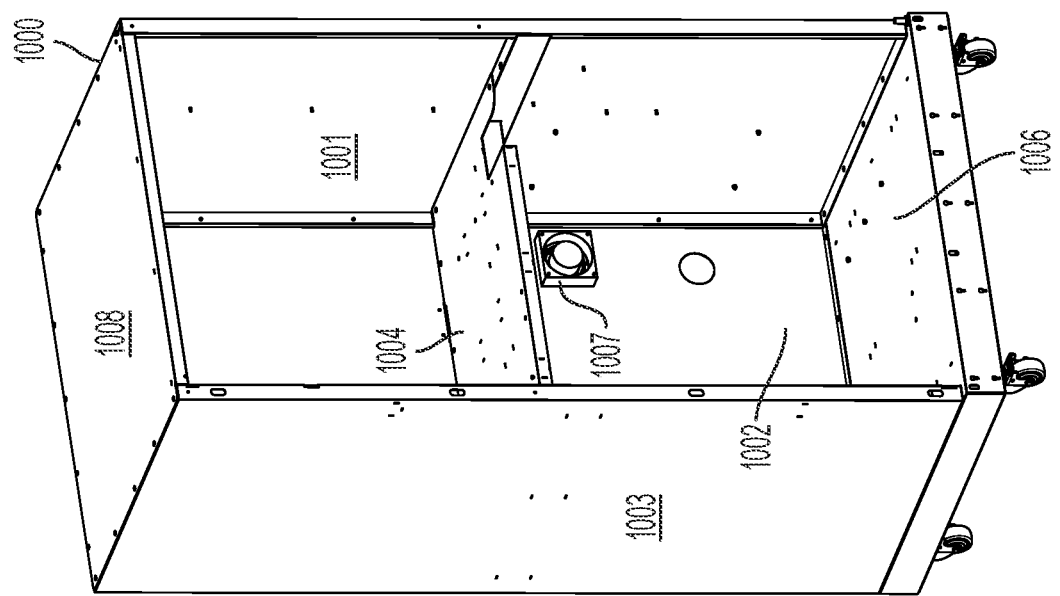
Figure 32:
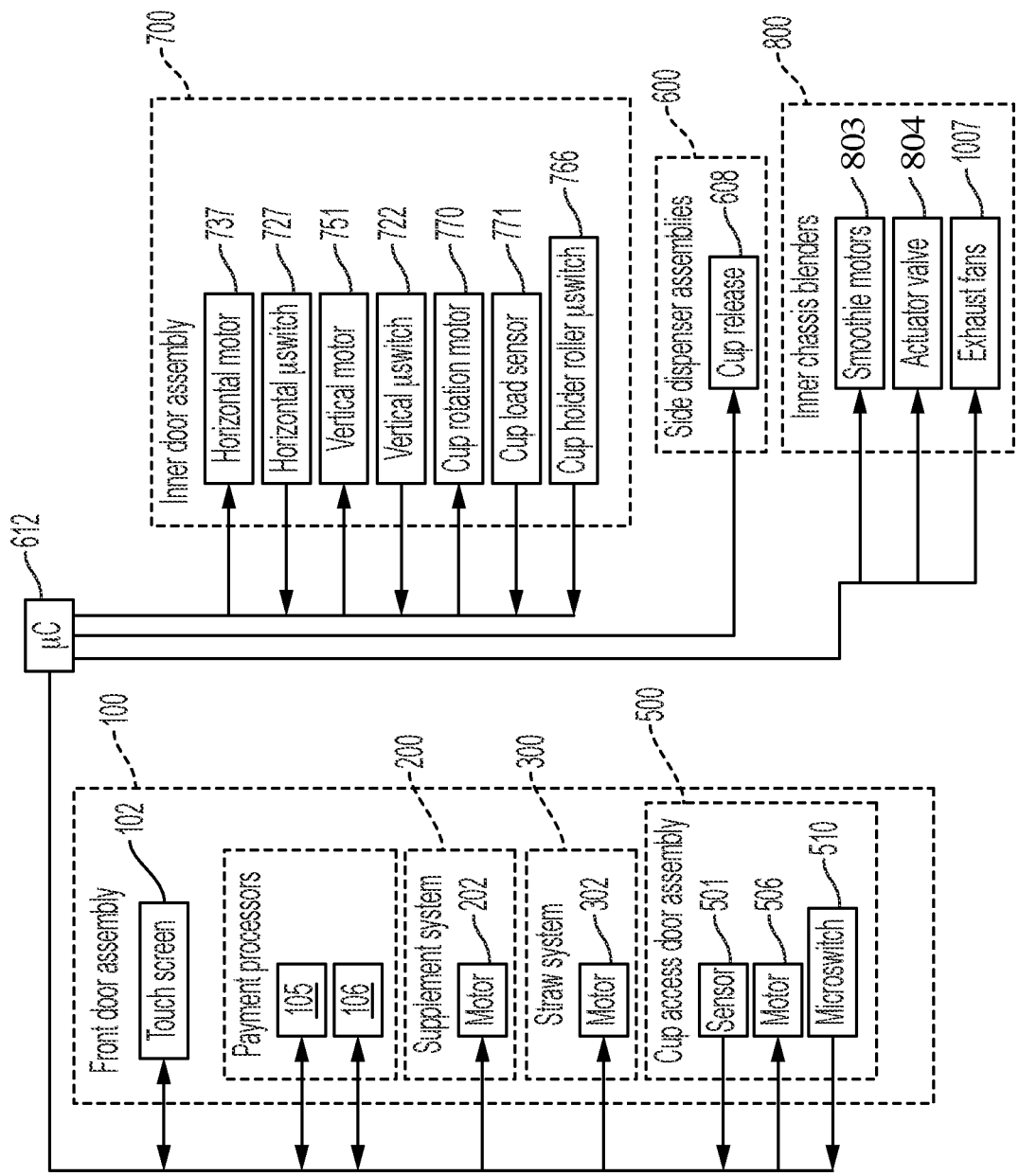
Figure 33:
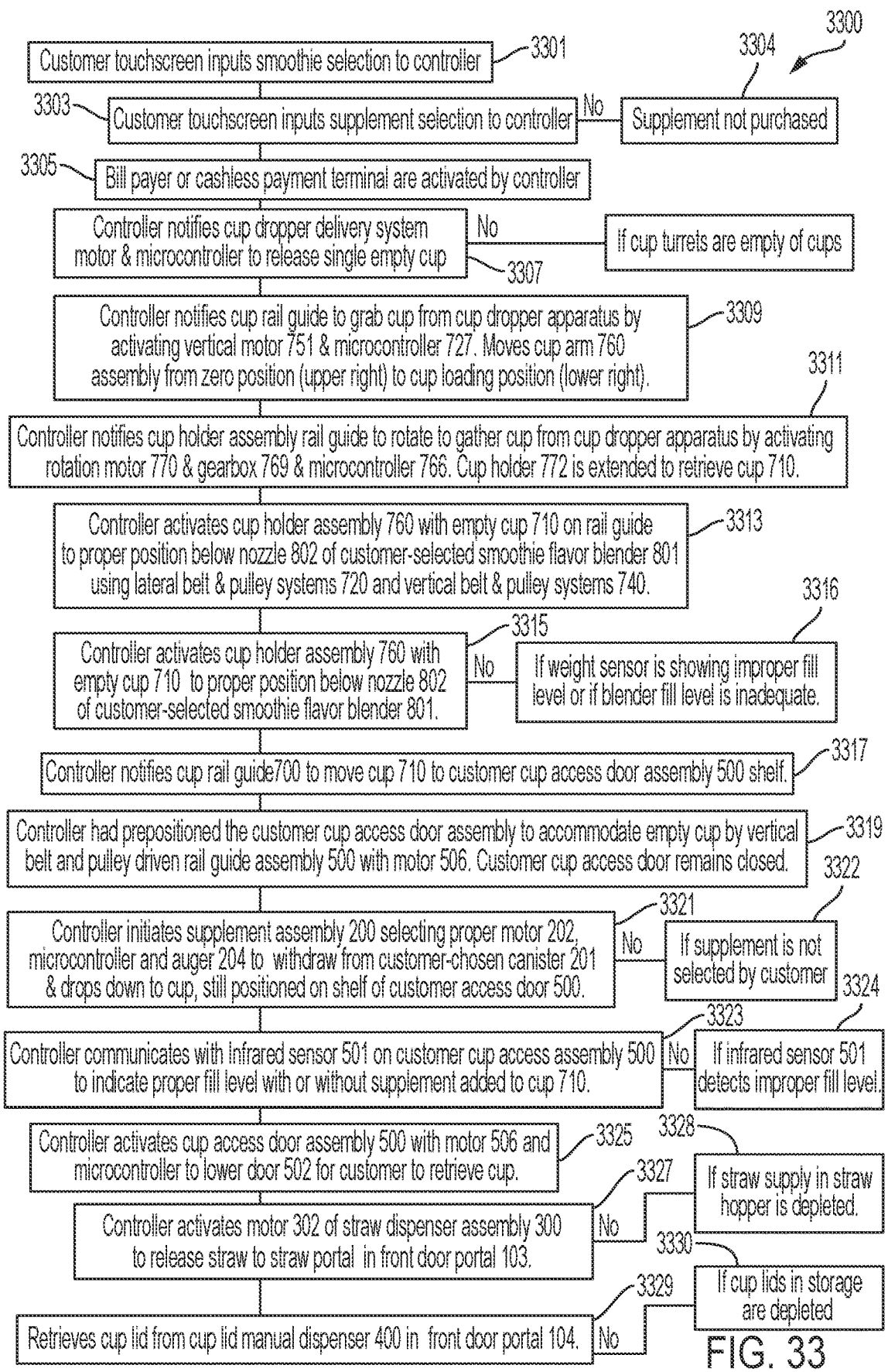
Figure 34:
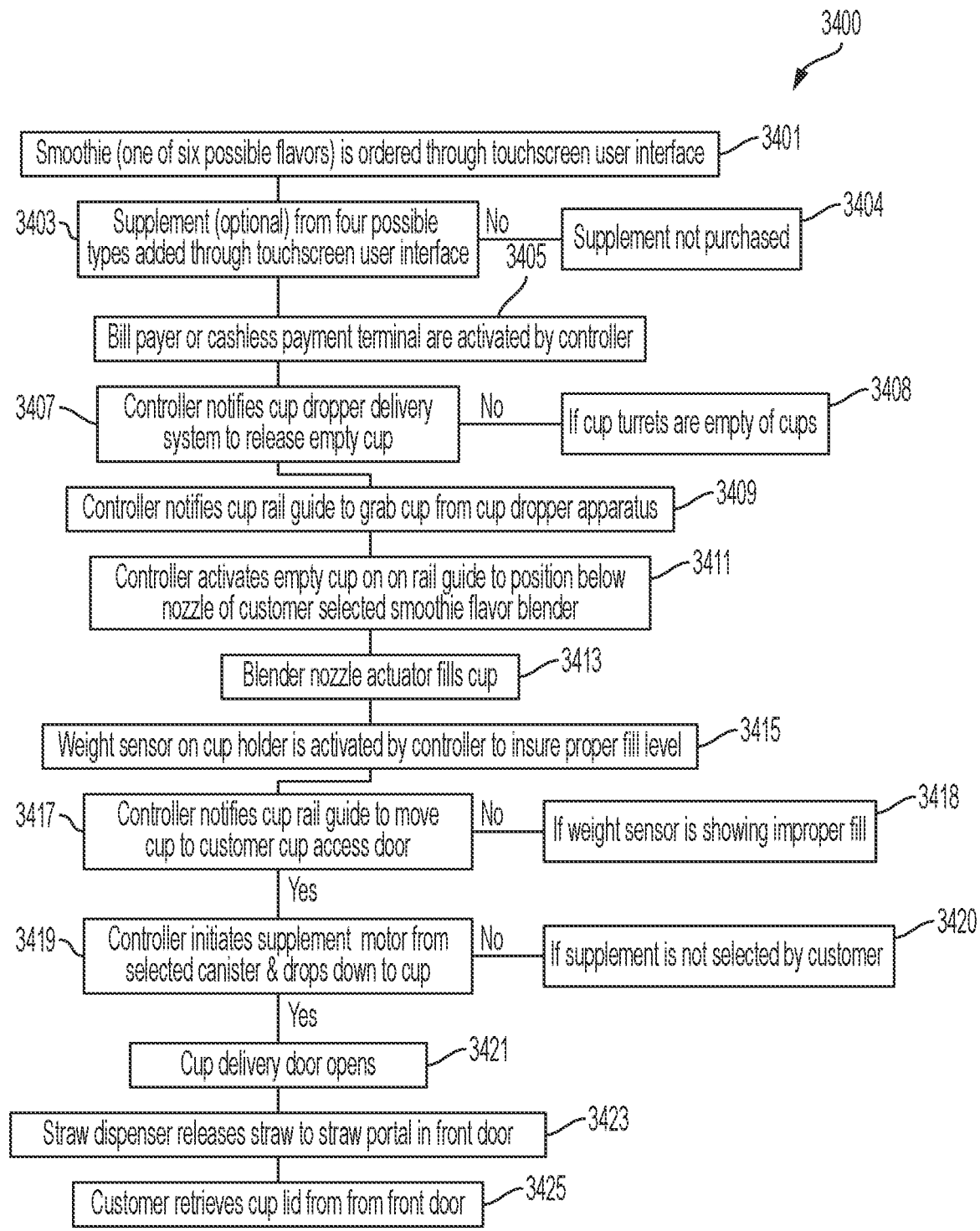

FIG. 6 is a 3-D perspective exploded view of the upper components of additive supplement assembly 200 used to house canisters 201, detailing canister bracket 206, motors with gear assemblies 202, spools 203, augers 204, and auger housing 205;

FIG. 7 is a front view of straw delivery assembly 300 and lid dispensing assembly 400, as viewed facing the interior 101 of front door assembly 100;

FIG. 8A is a front detail view of straw delivery assembly 300, as viewed facing the interior of front door assembly 100;

FIG. 8B is a front detail view of straw delivery assembly 300 with straw hopper housing 301 removed to reveal interior components;

FIG. 8C is a top detail view of straw delivery assembly 300 with straw hopper housing 301 removed to reveal interior components;

FIG. 9A is a front view of lid dispensing assembly 400, as viewed facing the interior 101 of front door assembly 100;

FIG. 9B is a 3-D perspective view of lid dispensing assembly 400 with lid dispensing housing 401 removed, revealing the top view of lid dispenser housing 402 and lid dispenser silicon sleeve 404;

FIG. 10A is a slight 3-D perspective rear interior view of cup access door assembly 500, showing the surface to be attached to the interior 101 of front door assembly 100, revealing components of the cup access door assembly 500;

FIG. 10B is a slight 3-D perspective front interior view of cup access door assembly 500, as viewed facing the interior 101 of front door assembly 100;

FIG. 11 is a facing view of the interior of right side panel 1001 of vending machine assembly 1, showing placement of empty cup delivery system 600 components;

FIG. 12A is a side view of the interior of right side panel 1001 of vending machine assembly 1, as viewed looking into the interior of vending machine assembly 1 from the front, showing placement of empty cup delivery system 600 components;

FIG. 12B is a detail view of FIG. 11 facing view of the interior of right side panel 1001 of vending machine assembly 1, showing placement of empty cup delivery system 600 components;

FIG. 12C is a 3-D view of field removable components of empty cup delivery system 600, namely, cup turret 602, and cup turret hanging plate 604 in closed position;

FIG. 12D is a 3-D view of field removable components of empty cup delivery system 600, namely, cup turret 602, and cup turret hanging plate 604 in an open position;

FIG. 12E is a 3-D view of dual cup dropper holder bracket 605, showing attachment of cup dispenser mechanism 608;

FIG. 13 is a front view of vending machine assembly 1 with front door assembly 100 removed, revealing interior assemblies and components positioned and arranged inside the housing of vending machine assembly 1, including cup loading rail guide system 700;

FIG. 14A is a 3-D perspective view of the front-facing side of cup loading rail guide system 700, with rotating cup holder 772 in an upper right position (when viewed from front of vending machine assembly 1, looking in) for receiving a cup from empty cup delivery system 600, demonstrating operation in a first position A;

FIG. 14B is a 3-D perspective view of the interior side of cup loading rail guide system 700, shown by swinging open assembly 700 and revealing inner components, with rotating cup holder 772 in a first position A;

FIG. 15A is a 3-D perspective view of the front-facing side of cup loading rail guide system 700, with rotating cup holder 772 in a lower right position (when viewed from front of vending machine assembly 1, looking in) for receiving a cup from empty cup delivery system 600, demonstrating operation in a second position B;

FIG. 15B is a 3-D perspective view of the interior side of cup loading rail guide system 700, shown by swinging open assembly 700 and revealing inner components, with rotating cup holder 772 in a second position B;

FIG. 16 is a 3-D perspective view of the front-facing side of cup loading rail guide system 700, closed position, with inner mount plate 701 removed for clarity, with rotating cup holder placing cup 710 in an upper lateral position for receiving beverage from an upper smoothie blender 801 (as detailed in FIG. 26) of smoothie blender assembly 800, demonstrating operation in a third position C;

FIG. 17 is a 3-D perspective view of the front-facing side of cup loading rail guide system 700, closed position, with inner mount plate 701 removed for clarity, with rotating cup holder 772 placing cup 710 in an lower lateral position for receiving beverage from a lower smoothie blender 801 (as detailed in FIG. 26) of smoothie blender assembly 800, demonstrating operation in a an alternate third position C;

FIG. 18A is a 3-D perspective view of the front-facing side of cup loading rail guide system 700, closed position, with rotating cup holder 772 and cup 710 positioned at inner mount plate portal 704 of inner mount plate 701, demonstrating operation in a fourth position D;

FIG. 18B is a 3-D perspective view of the interior side of cup loading rail guide system 700, swung open, with rotating cup holder 772 and cup 710 positioned at inner mount plate portal 704 of inner mount plate 701, demonstrating operation in a fourth position D;

FIG. 19 is a 3-D perspective illustration of an example of the vending machine assembly of the present disclosure, with front door assembly shown in an open position, revealing cup 710 in a final position E, after rotation through portal 704 and release from rotating cup holder 772;

FIG. 20 is a front facing view detailing upper drive system subassembly 720, the upper portion of front-facing side of cup loading rail guide system 700;

FIG. 21A is an interior facing view detailing upper drive system subassembly 720, the upper portion of interior side of cup loading rail guide system 700;

FIG. 21B is an interior facing exploded view detailing the components of upper drive system subassembly 720, the upper portion of front-facing side of cup loading rail guide system 700;

FIG. 22 is a front facing view detailing lower drive system subassembly 740, the lower portion of front-facing side of cup loading rail guide system 700;

FIG. 23A is an interior facing view detailing lower drive system subassembly 740, the lower portion of rear-facing side of cup loading rail guide system 700;

FIG. 23B is an interior facing exploded view detailing the components of lower drive system subassembly 740, the lower portion of rear-facing side of cup loading rail guide system 700;

FIG. 24A is a slight 3-D perspective view of cup holder assembly 760;

FIG. 24B is a slight 3-D perspective exploded view detailing the components of cup holder assembly 760;

FIG. 25 is a side view of cup holder assembly 760 with travel in the region of lower drive system subassembly 740;

FIG. 26 is a 3-D perspective view of interior assemblies when viewed from an elevated right position, exposed by removing door 100, sides and top of housing 1000, and rail guide system 700;

FIG. 27A is a 3-D perspective view of housing 1000 when viewed from a left position, with door 100 removed for clarity and rail guide system 700 swung open, showing upper smoothie blender assembly 800 and upper sliding shelving assembly 900 pulled out for servicing;

FIG. 27B is a 3-D perspective view of housing 1000 when viewed from a left position, with door 100 removed for clarity and rail guide system 700 swung open, showing both upper and lower smoothie blender assemblies 800 and upper and lower sliding shelving assemblies 900 pulled out for servicing;

FIG. 28A shows a frontal slight 3-D perspective view of smoothie blender assembly 800 and arrangement and positioning of smoothie blender nozzle subassemblies 802;

FIG. 28B is a 3-D perspective view of smoothie blender nozzle subassembly 802;

FIG. 29A is a side view from the right of housing 1000 showing both upper and lower smoothie blender assemblies 800 and upper and lower sliding shelving assemblies 900 pulled out for servicing;

FIG. 29B is a 3-D perspective view of upper and lower sliding shelving assemblies 900 when viewed from an elevated right position, exposed by removing door 100, sides and top of housing 1000, and the other assemblies;

FIG. 30 is a 3-D perspective exploded view detailing the components of sliding shelving assembly 900;

FIG. 31A is a 3-D perspective view of housing 1000 when viewed from a front-left position, showing arrangement and configuration on housing frame components;

FIG. 31B is a 3-D perspective view of housing 1000 when viewed from a back-left position, showing positioning and arrangement of exhaust fans 1007;

FIG. 32 is a schematic block schematic diagram of an example of the electrical and signal connections between the various components of the vending machine;

FIG. 33 is a flowchart 3300 of an example of the electro-mechanical operation of the vending machine; and FIG. 34 is a flowchart 3400 of an example of the vending process.

DETAILED DESCRIPTION OF THE INVENTION

In one example, disclosed is a smoothie vending machine dispensing smoothie beverage into a cup from arranged and positioned electrically actuated dispensing nozzles without intervening hose.

In one example, disclosed is a tubeless smoothie vending machine including a tubeless electro-mechanically actuated dispensing nozzle attached to each smoothie dispensing tank, a means for retrieving an empty cup and moving the cup to each selected dispensing nozzle, a tubeless means for delivering beverage from the dispensing tank to the cup; a means for transferring the cup through the cup retrieving and moving means, a receiving shelf to receive the filled cup, a means for dropping dry food product into the beverage filled cup; and an access door to open when the beverage filled cup is ready to vend to the customer. A means for payment and a means for beverage selection is included at a point of sale. A means for dispensing straws is included at the point of vending. A means for dispensing lids is included at the point of vending. Tubes for delivering beverage to the cup are eliminated.

In one example, disclosed is a tubeless smoothie vending machine including a tubeless electro-mechanically actuated dispensing nozzle attached to each smoothie dispensing tank, a cup retrieval system to retrieve an empty cup and move the cup to each selected dispensing nozzle, a portal in the cup retrieval system to transfer the cup through the cup retrieval system, a receiving shelf to receive the filled cup, a dispenser system to drop dry food product into the beverage filled cup; and an access door to open when the beverage filled cup is ready to vend to the customer. A payment and beverage selection system is included at the point of sale. A straw dispenser system is included at the point of vending. A lid dispenser system is included at the point of vending. Tubes for delivering beverage to the cup are eliminated.

In one example, disclosed is a hinged, swingable mounting plate vertically disposed in a vending machine housing. The mounting plate is positioned and arranged between a front door and smoothie blenders. The mounting plate is positioned and arranged to swing open to enable access to smoothie blenders and blender DC motors for refilling and maintenance. The mounting plate is hinged to swing open to enable blenders and shelving to be fully extended from the chassis cabinet of the vending machine housing. A linear rail guide system is attached to the mounting plate. A hole is disposed on the plate to provide access from the door to a filled cup that is positioned behind the plate by the linear rail guide system.

In one example, disclosed is a linear rail guide system for a smoothie vending machine, the linear rail guide system positioned and arranged for positioning a cup at the dispensing point of six separate smoothie blenders, the blenders located at different horizontal and vertical positions. The linear rail guide system includes a cup holder apparatus, the cup holder apparatus electronically controlled to rotate the cup through at least an approximately 180 degree arc. In further example, the cup holder apparatus includes a weight sensor, whereby the amount of cup fill can be monitored and/or controlled. The smoothie blenders include electrically actuated dispensing nozzles. In further example, the linear rail guide system includes a motor and a belt and pulley system for horizontal movement. In further example, the linear guide system includes one motor and a belt and pulley system separate from the horizontal movement system, for vertical movement. In further example, a digital controller system controls the linear rail guide system for movement and rotation of the cup holder apparatus. In further example, a smoothie vending machine includes the linear rail guide system. In further example, an integrated digital micro switch is positioned and arranged for precise positioning of the cup holder for receiving an empty cup. In further example, an integrated digital micro switch is positioned and arranged for precise positioning of the cup holder under the electrically actuated dispensing nozzles. In further example, an integrated digital micro switch is positioned and arranged for precise positioning of the cup holder at a customer access door. In further example, a digital controller guides positioning of the cup holder using the linear rail guide system to at least the locations including: an empty cup drop location, a selected blender nozzle location, and a customer access door location.

In one example, a linear rail guide system is disclosed for a smoothie vending machine, the linear rail guide system including a frame of two vertical members and two horizontal members. The two horizontal members are rail guides that receive a third vertical member rail guide that is horizontally moveable across the horizontal members. The third vertical member includes a vertically moveable cup holder assembly and motor to vertically move the cup holder. The cup holder has a motor to enable rotation of the cup holder. In one example, the rotation motor moves vertically with the cup holder. In one example, brackets are attached to the horizontal and first two vertical members, to provide additional rigidity and to maintain the square between the horizontal and vertical members. In one example, the squaring brackets are made of cast aluminum.

In one example, disclosed is an empty cup delivery assembly for a smoothie vending machine, the empty cup delivery assembly including removable canisters for holding empty cups, positioned and arranged above a dual cup motorized cup dropper, the canisters further positioned and arranged linearly inside the vending machine housing. In further example, the removable canisters include sliding "j-hook" turret bottoms for holding empty cups inside the canisters while the canisters are removed from the housing frame. In further example, the empty cup delivery assembly includes a chute for guiding empty cup delivery to a positioned rail guide cup holder. In further example, the dual cup motorized cup dropper includes an adjustable member to manually adjust the dropper to match a cup size within a range of cup sizes. In further example, the adjustable member adjusts to match a cup size in the range of 12 to 24 ounces.

In one example, disclosed is a dry food supplement delivery assembly for a smoothie vending machine, the dry food supplement delivery assembly including a funneled gravity drop chute, a plurality of canisters for containing a plurality of dry food supplements, each canister including an electro-mechanical auger and motor assembly for rationed dispensing of the dry food supplement from the canister and into the chute.

In one example, disclosed is a consolidated smoothie vending machine including integrated smoothie blenders, a dry food supplement delivery assembly, a straw delivery assembly, and a lid delivery assembly. In one example, a touch screen for consumer input is attached to the vending machine housing. In one example, a bill acceptor and digital card payment device is attached to the vending machine housing. In one example the smoothie blenders are stacked. In one example, the smoothie blenders are attached to sliding shelving. In one example, the vending machine housing includes a sliding chassis cabinet. In one example the dry food supplement delivery assembly is integrated. In further example, the dry food supplement delivery assembly is configured with to electro-mechanically ration dispensing of the dry food. In further example, the straw delivery assembly is configured with to electro-mechanically dispense straws.

Figure 1:
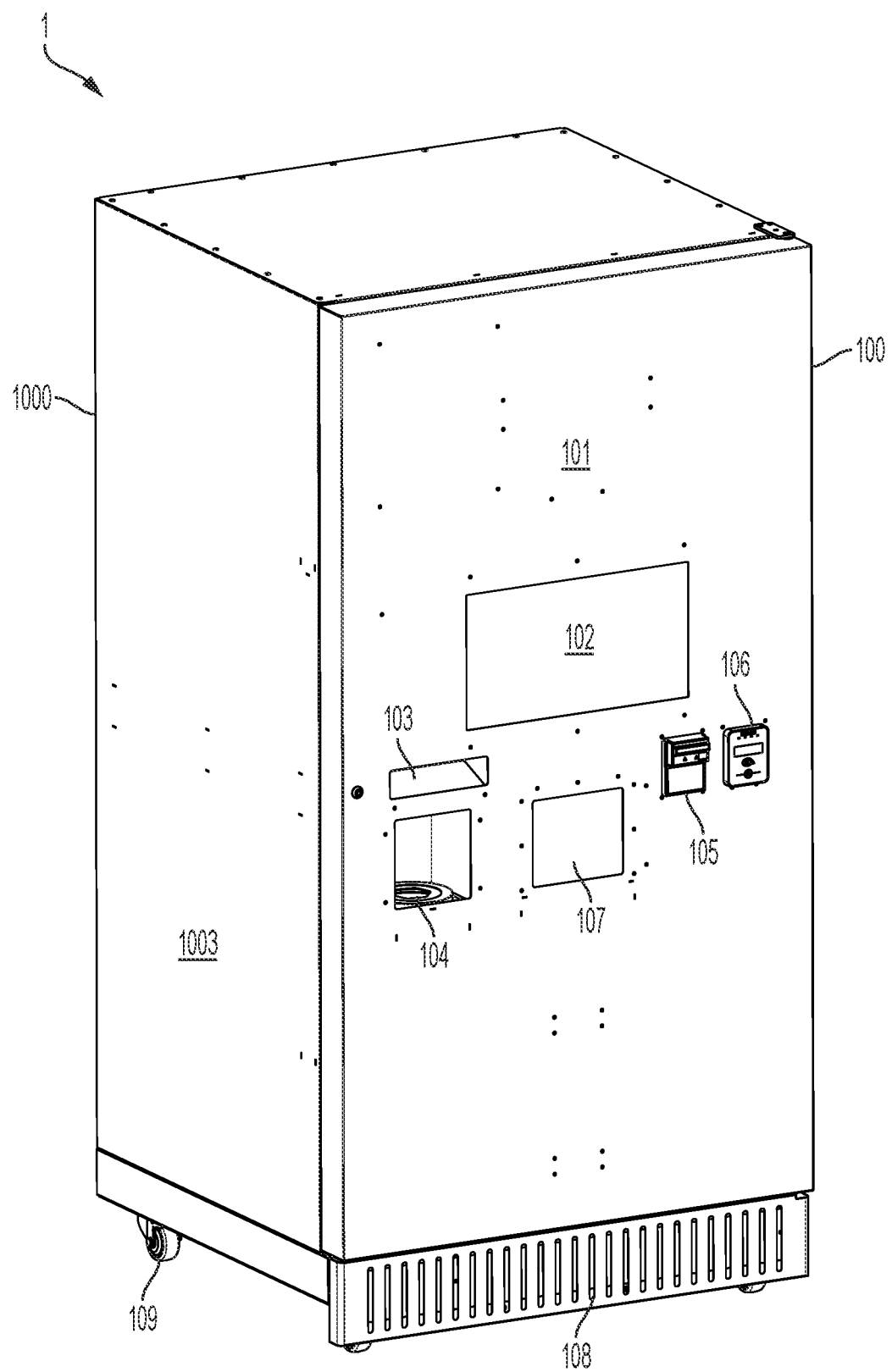

FIG. 1 is a 3-D perspective illustration of an example of the vending machine assembly 1 of the present disclosure. In one example, a front door assembly 100 is attached by hinges to a main chassis cabinet assembly 1000. The main chassis cabinet assembly 1000 houses several internal components and sub-assemblies that will be described in more detail, herein. The front door assembly 100 carries several internal components and sub-assemblies that will also be described in more detail. A standard beverage machine becomes impractical to dispense the semi-frozen nature of the "smoothie" type of beverage. Interestingly, the arrangement of the various sub-assemblies and the method of beverage delivery become critical to meet the dispensing and variety requirements of this type of beverage within a typically dimensioned vending apparatus.

For orientation, the left side panel 1003 of main chassis cabinet assembly 1000 is illustrated. In this example, coaster wheels 109 are attached to the bottom of main chassis cabinet assembly 1000 to allow the apparatus to be moved for floor cleaning, servicing and other needs. It should be noted that, in one example, the vending machine is of the transitory type. This means that the vending machine is designed for deployment and re-deployment with relative ease. Hence, in one example, attaching coaster wheels 109 to the chassis of the vending machine. The transitory vending machine is also sized to occupy a commercially standard space for such vending machines. It should be appreciated that the combination of structural features disclosed herein are borne of the need to provide all of the disclosed functionality and range of vending options within such a commercially standard space.

A kick plate 108 is placed on the front of main chassis cabinet assembly 1000, under the front door assembly 100. In this example, several sub-assemblies are attached to the backside of front door assembly 100 rather than attached inside the interior of the main chassis cabinet assembly 1000. This allows these sub-assemblies to be "swung" out of the way when front door assembly 100 is opened, allowing easier and faster access to the interior assemblies that require beverage refill and cleaning of food-handling parts. In one example, front door assembly 100 has a front door 101, which is a panel having an exterior surface or side and an interior surface or side. Various sub-assemblies are attached to the interior side of front door 101 and have exposure on the exterior side of front door 101. In one example, as illustrated, the exterior side front door 101 shows touch screen monitor 102 for making beverage and topping selection. Also shown is a straw portal 103, a cup lid portal 104, a bill acceptor 105, a pay accepting unit 106, and a cup opening door 107. Cup opening door 107 opens into a chamber that will provide the beverage-filled cup to the consumer. In one example, pay accepting unit 106 includes or is a Payter P66 Contactless Payment system.

In a brief example of operation from the perspective of a consumer, the consumer uses touch screen monitor 102 to select a flavor or flavor-combination of the "smoothie" type of beverage. In one example, the consumer makes the product selection and/or payment from their smart phone or hand held device. In the example used for illustration, there are six separate beverage reservoirs, each keeping the beverage in vendible condition. From these, a multitude of flavor combination choices are available for the consumer to "create". In this example, the ability to provide so many keeps (6-six) in the standard dimensions of a vending machine is a decisive commercial advantage. The consumer is also given the opportunity to select from a combination of several dry "toppings", such as protein supplements. In the example, as illustrated herein, four different toppings are available—greatly increasing the number of combination choices available to the consumer. For example, the consumer has the choice of one of six fluid beverages, a combination of two or more of the six fluid beverages, one of four toppings, a combination two or more of the four toppings, no toppings. In one example, the consumer has the choice of placing the dry "toppings" on top of the beverage or at the bottom of the cup, or both!

Continuing with the brief example of operation, the consumer pays by one of the available payment devices, for example, payment by bill acceptor 105 or pay accepting unit 106. With the consumer selection known and the payment received, the beverage-filled cup (not illustrated) is prepared by the machine and dispensed to the consumer, who retrieves the beverage-filled cup through cup opening door 107. A straw is dispensed and available at straw portal 103 and a lid for the cup is dispense and available at cup lid portal 104. This completes a transaction in this brief example of operation.

Figure 2:
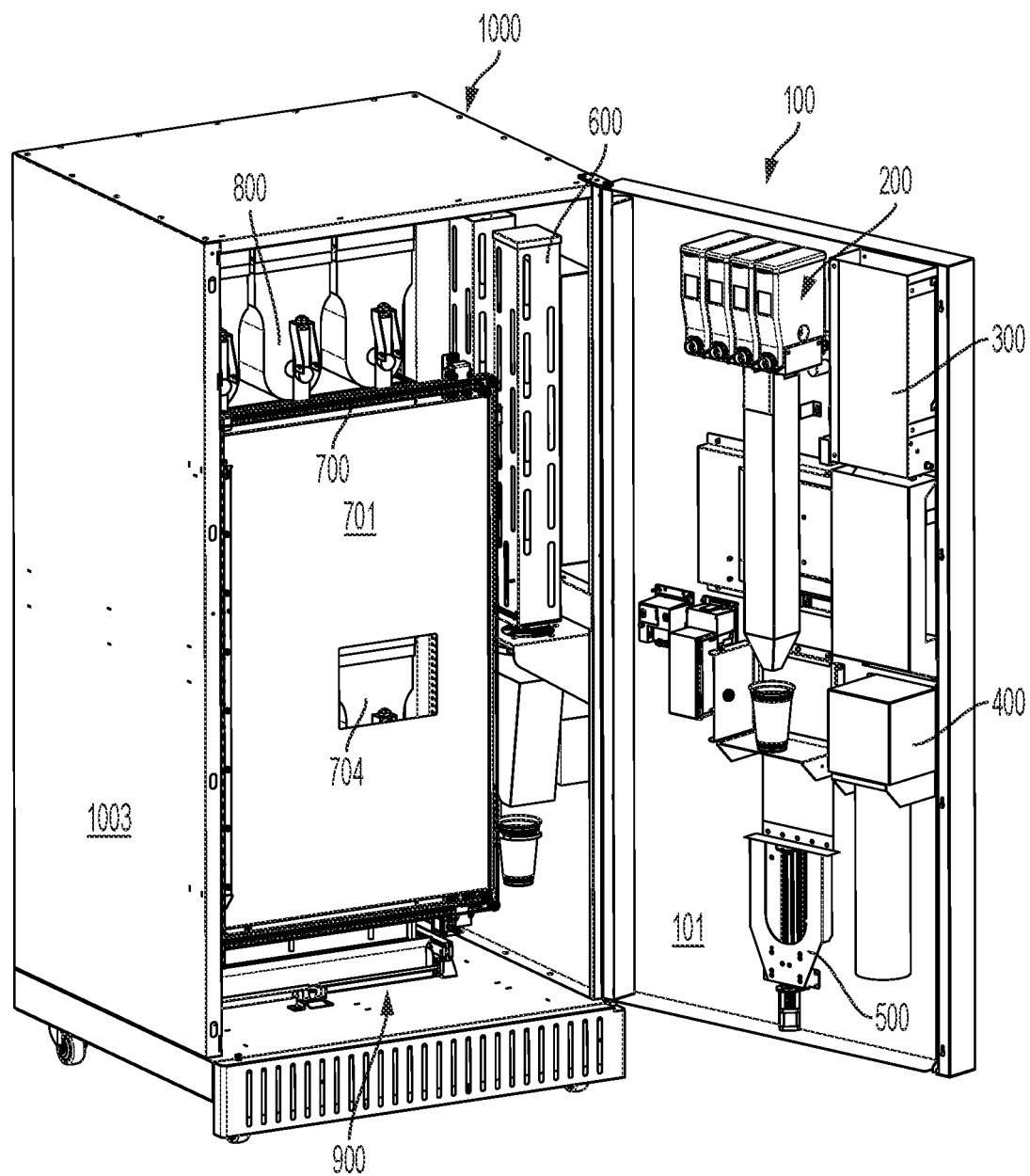

FIG. 2 is a 3-D perspective illustration of an example of the vending machine assembly 1 of the present disclosure, with front door assembly 100 shown in an open position, revealing interior front door assemblies and assemblies interior, inside the main chassis cabinet assembly 1000 of vending machine assembly 1. Electrical wiring is not shown, for clarity.

Several sub-assemblies are attached to the interior side 101 of front door assembly 100. In the illustrated example, these include an additive supplement assembly 200, for dry supplements, a straw dispensing assembly 300, a lid dispensing assembly 400, and a cup access door assembly 500. An upper chute 207 of additive supplement assembly 200 is not shown (is removed) for clarity and to show general positioning and arrangement of internal components of additive supplement assembly 200. The placement of these sub-assemblies on the interior of front door assembly 100 enables speed and ease in refilling the dry food additives, straws, lids, and collection of paper money.

One particular advantage of this configuration becomes apparent in this example. All the dry product and consumables are shielded and segregated from the fluid reservoirs and fluid dispensing. If the vending machine only needs dry product or consumable replenishment, the fluid portions of the machine are not exposed and kept shielded away from these less sterile handling operations. The cold is also kept in to some degree. In this configuration, a maintenance person simply opens the front door and quickly adds cups or lids or straws or adds dry supplements. The operation is fast and the door quickly shut and the vending machine put back into operation.

Several sub-assemblies are contained within the interior of main chassis cabinet assembly 1000. In the illustrated example, these include an empty cup delivery system 600, an interior cup rail guide system 700, a smoothie blender assembly 800, and a slidable shelf 900. Interior cup rail guide system 700 is attached by a hinge or hinges to the left side 1003 of interior of main chassis cabinet assembly 1000, such that interior cup rail guide system 700 swings outward (to the left, as illustrated) in an opposite direction to the swing of front door assembly 100 (to the right, as illustrated). By swinging interior cup rail guide system 700 open, access to smoothie blender assembly 800 is possible. The components of smoothie blender assembly 800 are placed on sliding shelves 900, enabling the vendor to pull out the blender assembly components for even easier access. As illustrated, interior cup rail guide system 700 is not shown swung open, rather it is shown in the closed, operational position. As such, the exterior surface or side of rail guide mounting plate 701 is visible. A hole, mounting plate portal 704, is shown. In operation, a beverage-filled cup is prepared behind rail guide mounting plate 701 and delivered by interior cup rail guide system 700 through the hole, mounting plate portal 704, to make the beverage-filled cup available to the consumer through cup opening door 107 (as illustrated in FIG. 1).

At this point, it becomes apparent that, in this example, there are three stacked vertical layers from the front of the vending machine to the back where the smoothie reservoirs are located. The beverage reservoirs are in the back layer, the rail guide system defines the middle layer, and the front door represents the front layer. The beverage product (ultimately, in a cup) passes between these three layers.

Figure 3:
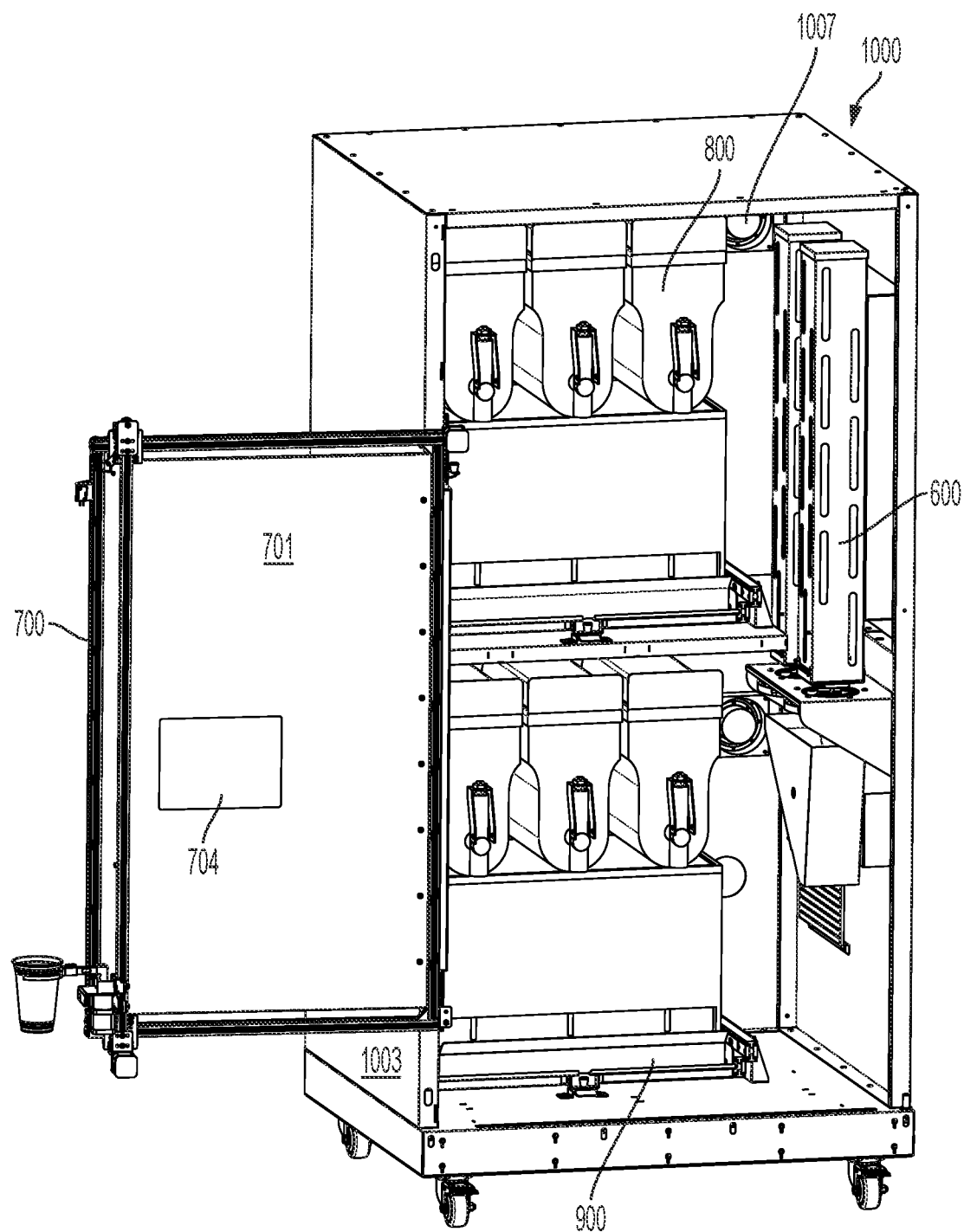

FIG. 3 is a 3-D perspective illustration of an example of the vending machine assembly 1 of the present disclosure, with front door assembly 100 removed and interior cup rail guide system 700 shown in a swung open position, revealing interior assemblies.

As illustrated, the interior (back face) side of rail guide mounting plate 701, with the hole, mounting plate portal 704, is revealed. In this example, as illustrated, interior cup rail guide system 700 is hinged on the left panel 1003 of main chassis cabinet assembly 1000. An empty cup delivery system 600 is shown, attached to the interior right side panel of main chassis cabinet assembly 1000 in this example. Smoothie blender assembly 800 is visible, resting on sliding shelves 900. In this example, smoothie blender assembly 800 has two rows of three smoothie dispensers: three reservoirs on an upper sliding shelf 900 and three additional reservoirs underneath, on a lower sliding shelf 900. A heat-dissipating fan 1007 is shown on the back wall of main chassis cabinet assembly 1000.

Figure 4:
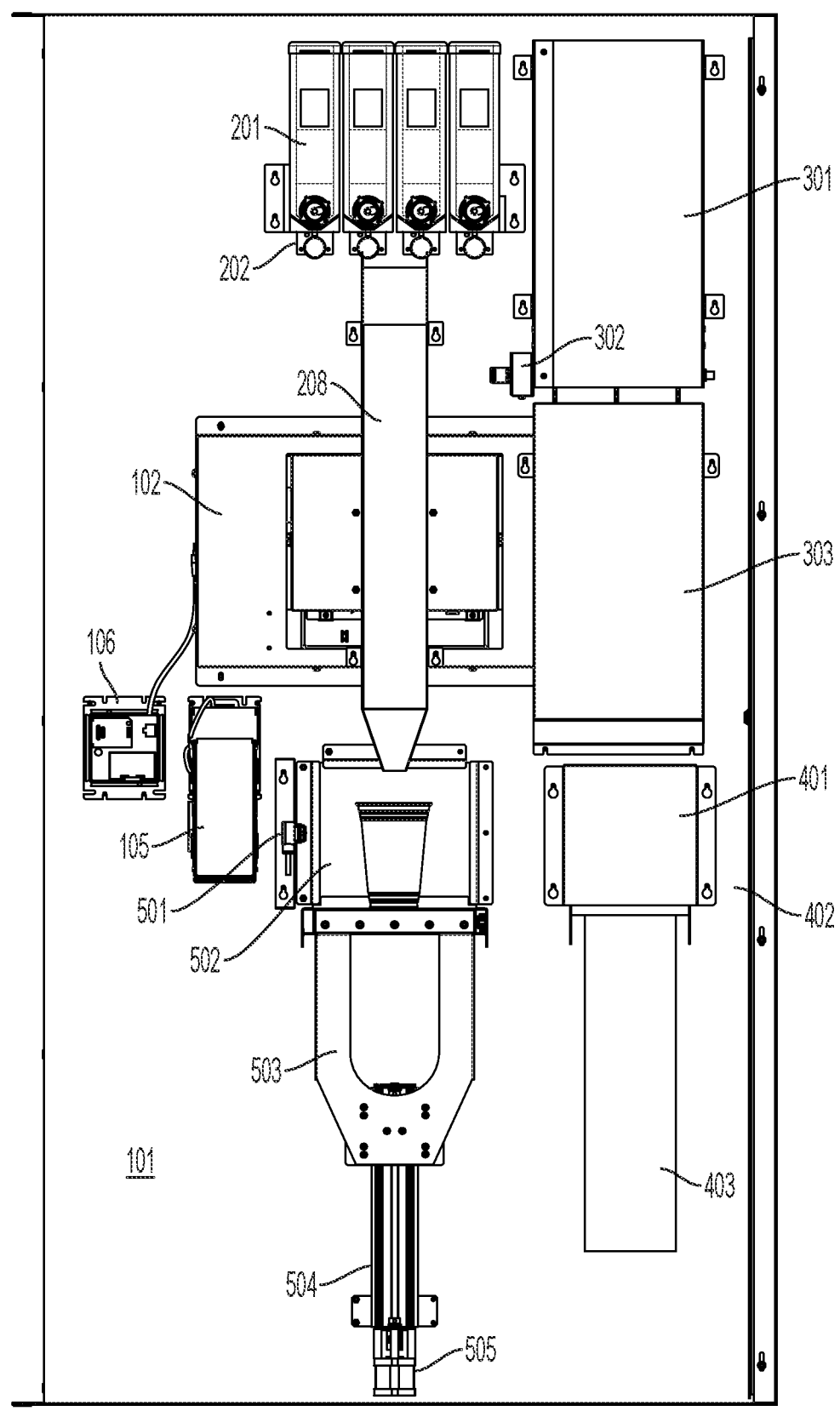

FIG. 4 is detail face view of the interior side 101 of front door assembly 100, revealing assemblies 200, 300, 400, 500 attached to the interior side 101 of front door 101 of assembly 100, with upper chute 207 removed for clarity. Wiring is not shown, for clarity.

In the example, as illustrated, the back of touch screen monitor 102 is shown, as attached to the interior side of front door 101. Also shown are the backsides of bill acceptor 105 and pay accepting unit 106, as attached to the interior side of front door 101.

In the example, as illustrated, the upper chute 207 of additive supplement assembly 200 is not shown, revealing some of the primary components of additive supplement assembly 200. Canisters 201 hold the dry food. Each canister 201 plugs into an auger 204 (illustrated in FIGS. 5B & 6), which is driven by a motor with gear assembly 202. The dry food extracted by the auger(s) drops through and is guided by upper chute 207 (illustrated in FIGS. 5A & 5D) into and through lower chute 208 to drop into a cup that is being presented through mounting plate portal 704 (FIG. 2) by cup opening door 107 (FIG. 1).

In this example, as illustrated, exterior surfaces of straw dispensing assembly 300 are visible on the interior side of front door 101. Straw hopper storage cover 301, straw servomotor 302, and straw dispenser chute 303 are shown as attached to the interior side of front door 101.

In this example, as illustrated, exterior surfaces of lid dispensing assembly 400 are visible on the interior side of front door 101. Lid dispenser housing 401, lid dispenser support bracket 402, and lid dispenser cylinder 403 are shown as attached to the interior side of front door 101.

In this example, as illustrated, components of cup access door assembly 500 are visible on the interior side of front door 101. In this example, a cup infrared sensor 501 is affixed on the interior side of front door 101, to one side of cup opening door 107. Until the beverage-filled cup is ready to dispense to the customer, a sliding acrylic glass access door panel 502 covers the cup opening-door 107. In order to open and close cup opening door 107 with the sliding acrylic glass access door panel 502, the sliding acrylic glass access door panel 502 is attached at its bottom to the top of a "Y" shaped piece, the access door housing bracket 503. The bottom of the "Y" bracket, access door housing bracket 503, is attached to a sliding access vertical rail 504 such that access door housing bracket 503 is able to slide up and down sliding access vertical rail 504. The sliding is controlled by an access door stepper motor 505, attached at the bottom end of sliding access vertical rail 504.

FIG. 5A is a 3-D perspective view of additive supplement assembly 200, shown apart from the rest of vending machine assembly 1.

In the example, as illustrated, upper chute 207 is shown attached to the top of lower chute 208, indicating their relative positioning below the dry food canisters 201. The angle of the upper chute 207 is designed to efficiently allow the dry food to freely fall down and into lower chute 208. In one example, upper chute 207 and/or lower chute 208 is readily detachable for cleaning the food-bearing surfaces. Canisters 201 hold the dry food. Each canister 201 plugs into an auger 204 (illustrated in FIGS. 5B & 6), which is driven by a motor with gear assembly 202 (illustrated in FIGS. 5A & 5B & 6). The dry food extracted by the auger(s) drops through and is guided by upper chute 207 (illustrated in FIGS. 5A & 5D) into and through lower chute 208 to drop into a cup that is being presented through mounting plate portal 704 (FIG. 2) by cup opening door 107 (FIG. 1).

FIG. 5B is a frontal view of additive supplement assembly 200, with chutes 207, 208 not shown (removed) to expose inner components associated with canisters 201.

In this example, as illustrated, four dry food canisters 201 attach and are removable from a canister bracket 206 (as shown in FIG. 5C & FIG. 6). Canister bracket 206 is attached to the interior side of front door 101. The bottom portions of canisters 201 engage with respective augers 204. Situated behind canister bracket 206 are respective motors with gear assemblies 202 which axially engage with their respective augers 204.

FIG. 5C is a side view of canisters 201 and associated components.

In this example, as illustrated, dry food canisters 201 are resting on canister bracket 206. To the left is the interior of main chassis cabinet assembly 1000 (when front door assembly 100 is in a closed position). To the right is the interior side of front door 101. The right edge of canister bracket 206 attaches to the interior side of front door 101. The bottom portion of motor with gear assembly 202 is visible, "hanging" beneath canister bracket 206. In this positioning and arrangement, obstruction of airflow is reduced around the motors of the motor with gear assemblies 202.

FIG. 5D is a 3-D perspective view of chutes 207, 208, shown apart from the rest of vending machine assembly 1.

FIG. 6 is a 3-D perspective exploded view of the upper components of additive supplement assembly 200 used to house canisters 201, detailing canister bracket 206, motors with gear assemblies 202, spools 203, augers 204, and auger housing 205.

In this example, as illustrated, the engagement, arrangement and positioning of the assembly components are shown. Canister bracket 206 forms a standoff spacing from the interior side of front door 101 to accommodate the upper gearbox portion of the motors with gear assemblies 202. Holes in the rear wall of the canister bracket 206 align with the power-take-off orifice in the upper gearbox portions of the motors with gear assemblies 202.

Respective augers 204 each include a shaft that aligns to engage the power-take-off orifices, the shafts traversing through the respective holes in the rear wall of the canister bracket 206. Augers 204 are housed in respective U-shaped enclosures or housings, auger housing 205.

The auger housings 205 are attached to the bottom portions of their respective canisters 201. Canisters 201, with auger housings 205, rest on and are slidingly attached to canister bracket 206.

Respective spools 203 are engaged above each auger 204. A vertical gear on spool 203 is in contact with a horizontal worm gear on auger 204. The vertical gear includes a claw attachment. In this way, the power from motor gearbox 202 is used to rotate the worm gear of auger 204 which, in turn, rotates vertical gear and claw of spool 203. The claw-auger arrangement of 203, 204 grabs a ration of the dry food, to dispense a portion from auger 204.

FIG. 7 is a front view of straw delivery assembly 300 and lid dispensing assembly 400, as viewed facing the interior 101 of front door assembly 100.

In this example, as illustrated, a straw-hopper mounting bracket 308 attaches to the interior side of front door 101 (not illustrated, see FIG. 2). A hand-removable straw hopper storage cover 301 fits onto straw hopper mounting bracket 308, forming a compartment to house a supply of straws and to also enclose components for robotically dispensing a straw from the bottom of the compartment. At the bottom left of bracket 308 and cover 301 is a horizontally positioned straw servomotor 302, one of the components for robotically dispensing a straw. A straw dispenser chute 303 is positioned underneath bracket 308 and cover 301, enabling a dispensed straw to fall to the bottom of chute 303. A straw portal 103 (shown in FIG. 1) on the exterior side of front door 101 opens into the bottom of the space enclosed by straw dispenser chute 303, providing the dispensed straw for a customer to retrieve. The dimensions of straw dispenser chute 303, in one example, having a height greater than the length of its dispensed straw, reduce jamming of the straw delivery, even when a misaligned straw "stands" and partially obstructs the dispenser chute 303.

In this example, as illustrated, a lid dispenser housing 401 is attached to the interior side of front door 101, positioned to cover the hole created by cup lid portal 104 (shown in FIG. 1). A dispensing space or cavity is created by the offset of lid dispenser housing 401 from the interior side of front door 101. A lid dispenser support bracket 402 is attached to the bottom of lid dispenser housing 401. A removable lid dispenser cylinder 403 is vertically positioned lid dispenser support bracket 402. The lid dispenser cylinder 403 is capable of holding a quantity of cup lids and dispensing by way of a spring configuration to push up the top-most lid into the cavity, for dispensing to the consumer through the cup lid portal 104.

The straw delivery assembly 300 and lid dispensing assembly 400 are disposed on the interior side of front door 101. In this way, these dispensing assemblies do not interfere or obstruct the operation of the beverage dispensing. At the same time, ample space is provided to the vendor to easily replenish the straw and lid products by simply swinging open the front door 101.

FIG. 8A is a front detail view of straw delivery assembly 300, as viewed facing the interior of front door assembly 100. Assembly 300 is essentially as shown and described for FIG. 7, and is shown here for convenience in comparing to FIGS. 8B and 8C. FIGS. 8B and 8C show the interior workings of straw delivery assembly 300.

FIG. 8B is a front detail view of straw delivery assembly 300 with straw hopper housing 301 removed to reveal interior components.

In this example, as illustrated, a straw-hopper mounting bracket 308 attaches to the interior side of front door 101 (not illustrated, see FIG. 2). In this illustration, the hand-removable straw hopper storage cover 301 that fits onto straw hopper mounting bracket 308 is removed to show the internal components. Three gear-shaped disks, straw agitator wheels 304, are mounted onto a rod axle 305 to rotate the agitator wheels 304. In one example, axle 305 is a stainless steel rod. A front bracket guide at base of straw hopper, straw base front bracket 306, funnels the faggot of straws into the agitator wheels 304. The purpose of this configuration is to deliver a single straw to the straw delivery chute 303.

FIG. 8C is a top detail view of straw delivery assembly 300 with straw hopper housing 301 removed to reveal interior components. From this perspective, the attachment of straw servomotor 302 to axle 305 is apparent. In one example, servomotor 302 is a Tower Pro MG-995 Analog Servo Motor. The teeth of agitator wheels 304 are arranged and positioned to allow a single straw to fall into each gap between the teeth. The three distributed wheels 304 provide a three-point balance of each straw, facilitating the smooth delivery of a single straw into the delivery chute 303.

FIG. 9A is a front view of lid dispensing assembly 400, as viewed facing the interior 101 of front door assembly 100. Assembly 400 is essentially as shown and described for FIG. 7, and is shown here for convenience in comparing to FIG. 9B, which shows the interior workings of lid dispensing assembly 400.

FIG. 9B is a 3-D perspective view of lid dispensing assembly 400 with lid dispensing housing 401 removed, revealing the top view of lid dispenser housing 402 and lid dispenser silicon sleeve 404.

FIG. 10A is a slight 3-D perspective rear interior view of cup access door assembly 500, showing the surface to be attached to the interior side 101 of front door assembly 100, revealing components of the cup access door assembly 500.

An example cup 710 is shown resting on a shelf 508. Cup shelf 508 is mounted to an access door bracket 504 to support cup 710 for dispensing to a customer. A cup infrared sensor 501 is disposed on access door housing bracket 503. In one example, sensor 501 is an Infrared LED beam sensor to sight proper cup fill level of cup. In one example, sensor 501 is attached to a cup infrared sensor bracket 509 that is otherwise attached to a metal frame, holder bracket 503, which, in turn, is attached to the interior side of front door 101 for holding or bracketing the acrylic glass door 502. A sliding acrylic glass access door panel 502 is attached to a metal bracket 504. In one example, clear door panel 502 is a Perspex acrylic glass door panel. Door panel 502 covers cup delivery door portal 107 located on front door 101 (shown on FIG. 1), the portal (opening) being for customer cup (filled) retrieval. Bracket 504 is slidingly attached to rail guide, linear rail 505, to move cup shelf up or down. Rail guide 505 provides freedom of vertical movement for the sliding door panel while at the same time providing the robustness against binding and misalignment needed for the clear door panel 502, which is exposed to customers. A lower rail guide mount bracket 512 Lower mount bracket secures the end of linear rail 505 to interior front door 101. A stepper motor 506 is located at the end of linear rail 505. Its purpose is to power vertical movement of sliding door panel. In one example, stepper motor 506 is a "Nema 17". A roller micro switch 510 is attached to shelf 508, which is, in turn, attached to bracket 504. Roller micro switch 510 enables proper movement of stepper motor 506 for vertical ascent and descents along linear rail 505.

FIG. 10B is a slight 3-D perspective front interior view of cup access door assembly 500, as viewed facing the interior 101 of front door assembly 100.

From this perspective, the customer facing side of sliding acrylic glass access door panel 502 is plainly visible, along with its attachment at the bottom of the acrylic panel to Y-shaped access door bracket 504. A holder bracket 503, for attaching to the interior side of front door 101 is for enclosing or bracketing the acrylic glass door 502. At the bottom of Y-shaped access door bracket 504 is attached a bracket with guide wheels 507 to enable vertical movement along linear rail 505. An upper mount bracket 511 is to rail guide 505 so rail guide 505 can be attached to interior front door 101. A stepper motor 506 is located at the end of linear rail 505.

The sliding acrylic glass access door panel 502 is one of the components that is in direct exposure to customers and is, accordingly, subject to external physical forces and abuse. For this reason, the structural features and the arrangement and positioning of the components of sliding customer access door assembly 500 are critical to reduce the risk of failure. Conventional wisdom would suggest that this assembly is "over-engineered". For example, the Y-shaped bracket 504 distributes the strength and resilience of the rail guide engagement across the plane of the acrylic panel 502, reducing the risk of the acrylic cracking from a stress point.

The enclosing bracket 503 and guide wheels 507 greatly reduce the degrees of freedom of movement (and rotation) of the acrylic panel 502, effectively restricting the movement of panel 502 to a vertical up and down movement over a short distance, enough to open and close access to the chamber holding the cup 710. The stepper motor 506 is used to reduce physical touching by the customer, so that the rate of soiling of the access door is reduced as well as reducing the reasons for a customer to apply excessive physical force on the panel 502.

FIG. 11 is a facing view of the interior of right side panel 1001 of vending machine assembly 1, showing placement of empty cup delivery system 600 components.

The placement of empty cup delivery system 600 on the interior of right side panel 1001 is especially interesting in how it contributes to solving the problem of unattended vending of modern smoothie beverages. Empty cup stacks, in past vending machines, use a carousel of stacks to retrieve a cup of the desired size. Such a carousel has significant width and breadth, which would take up too much room away from the room needed for the smoothie dispensers. A relatively new device has become available for controlling delivery of an empty cup from a stack. (See, adjustable plastic cup dispenser 608.) Applicant discovered that this device could be used to eliminate the need for a carousel, flattening the stacks of empty cups. (By having two or more stacks of empty cups, it is possible to offer a selection of different cup sizes—or, a larger quantity of cups is available for high demand vending.) This solves the space problem of fitting several smoothie dispensers along with dry additive in a standard sized vending machine footprint. The turrets holding the reservoirs of cups are still easily accessible for in-situ refilling.

In this FIG. 11 perspective view, for convenience, shown "floating" on the Figure is the relative placement of a dropped cup 710 into rotating cup holder 772. Shown placed on the interior of right side panel 1001 is a cup turret hanging plate 603, whose purpose is to act as a mount for attaching two removable cup turrets 602. Cup turrets 602 are removable housings for empty plastic cup storage. As shown in this example, turrets 602 are long cylinders, for example, made of metal. These turrets 602 snap onto secured bracket hanging plate 603, so that they are easily removed for refilling with additional empty cups. A removable cup turret lid 601 fits atop each turret 602. Since turret 602 is removable, the bottom of the turret has a retractable base plate 604, a cup turret lower cover, to hold the cups in place during refill and prior to snapping the turret 602 back on hanging plate 603. Below turrets 602, another bracket 605, a dual cup dropper holder bracket, is secured to main chassis cabinet right panel 1001 for the purpose of holding the adjustable plastic cup dispenser 608. In one example, cup dispenser 608 is a Componenti Series 674 automatic dispenser of plastic cups, and it includes a manual adjuster for variable cup sizes from 70 mm-100 mm. Cup dispenser 608 is controllable from a controller or microprocessor, electromechanically marshaling a cup from the reservoir of cups in the turret 602 so a single empty cup may be dropped into a cup chute 609. Device 608 works by "splitting" the stacked cup lid edges from one-another. Chute 609 provides a slide, engineered for an empty cup to properly drop from the cup dispenser 608 into the positioned rotating cup holder 772. Cup dropper micro switches 607 detect the cup "splitting" to assist in operation of the dispenser 608 in order to release one cup 710 at a time. A standoff bracket 606 is secured to the main chassis cabinet right panel 1001 for the purpose of arranging and positioning chute 609 in the required location.

In one example, microcontroller or processor 612 is secured to main chassis cabinet right panel 1001 in a distal location that does not require frequent access. Wires running to and fro processor 612 are not shown, for clarity.

FIG. 12A is a side view of the interior of right side panel 1001 of vending machine assembly 1, as viewed looking into the interior of vending machine assembly 1 from the front, showing placement of empty cup delivery system 600 components. This figure shows the relative positioning of system 600 as attached to the interior of right side panel 1001. For example, bracket hanging plate 603 is affixed to the interior of right side panel 1001. Dual cup dropper holder bracket 605 is affixed to the interior of right side panel 1001, beneath bracket 603. Beneath bracket 605, standoff bracket 606 is affixed to the interior of right side panel 1001. Removable cup turrets 602 snap onto bracket 603. Positioning chute 609 is affixed to standoff bracket 606.

FIG. 12B is a detail view of FIG. 11 facing view of the interior of right side panel 1001 of vending machine assembly 1, showing placement of empty cup delivery system 600 components. Removable cup turrets 602 snap onto bracket 603. Cup dispenser 608 is arranged and positioned beneath the cup turrets 602 and above chute 609.

FIG. 12C is a 3-D view of field removable components of empty cup delivery system 600, namely, cup turret 602, and cup turret hanging plate 604 in closed position. In this example, cup turret hanging plate 604 is in a closed position when turret 602 is removed from the bracket 603. This prevents any remaining cups in the reservoir of the turret from falling out while the turret is being serviced for refill.

FIG. 12D is a 3-D view of field removable components of empty cup delivery system 600, namely, cup turret 602, and cup turret hanging plate 604 in an open position. When cup turret is replaced back on bracket 603, the cup turret hanging plate 604 is swung into an open position, enabling the stack of cups to drop to the cup dispenser 608 units for processor-controlled single cup dispensing to the positioned rotating cup holder 772.

FIG. 12E is a 3-D view of dual cup dropper holder bracket 605, showing attachment of cup dispenser mechanism 608.

FIG. 13 is a front view of vending machine assembly 1 with front door assembly 100 removed, revealing interior assemblies and components positioned and arranged inside the housing of vending machine assembly 1, including cup loading rail guide system 700. With removal of the front (or customer) vertical plane of components and systems, the middle and back planes are revealed. As can be seen from this view, when the front door is open, it is relatively easy to access the empty cup delivery system 600 for servicing. Also, the dry goods are kept separate and may be serviced independently from the wet goods of the smoothie dispensers. The inner mount plate 701 of the rail guide system 700 shields the front door assembly 100 from the wet goods of the smoothie blender assembly 800 in the back plane—except for the inner mount plate portal 704, which enables transport of the liquid filled beverage from the back plane, through the middle plane of the rail guide system 700, to the customer plane of the front door assembly 100. Main chassis back panel 1002 is visible from the perspective of this front view. In the example of this particular front view, the rotating cup holder is shown with a received cup, rotated beneath empty cup delivery system 600. A bottom portion of blender sliding shelf assembly 900 is shown, appearing underneath the bottom of the inner mount plate 701 of the rail guide system 700. A top portion of smoothie blender assemblies 800 is shown, appearing above the top of the inner mount plate 701 of the rail guide system 700. FIG. 14A is a 3-D perspective view of the front-facing side of cup loading rail guide system 700, with rotating cup holder 772 in an upper right position (when viewed from front of vending machine assembly 1, looking in) for receiving a cup from empty cup delivery system 600, demonstrating operation in a first "A" or "zero" position. Cup 709 and front cup turret 602 are removed to show position. The rotating cup holder will actually be retracted behind inner mount wall to permit movement to a lower right "B" position rather than extended as shown (empty cup acquisition). Cup holder in position "A" will hold no cup as this is in a preloading position.

Some of the subsystems of cup loading rail guide system 700 become visible in this example. An upper horizontal rail 702 spans across the upper edge of inner mount plate 701 of the rail guide system 700. In one example, upper horizontal rail 702 is a V-Slot rail, in one example, with dimensions of 20×20×500 mm. A lower horizontal rail 703 spans across the lower edge of inner mount plate 701 of the rail guide system 700. In one example, lower horizontal rail 703 is a V-Slot rail, in one example, with dimensions of 20×20×500 mm. In one example, a horizontal GT belt 708 spans across lower rail 703 to horizontally move the vertical rail that holds the rotating cup holder 772. In one example, GT belt 708 is 1120 mm. In one example, belt 708 is powered by stepper motor 737 to enable the horizontal movement. Incidentally, rail guide system 700 is attached to the main chassis cabinet left panel 1003 by a vertical hinge or hinges 711. In one example, hinge 711 is a piano-hinge type.

In one example, front door assembly 100 and inner mount plate 701 are positioned and arranged to swing in opposite directions from each other, such as by placing the vertical hinges on opposite sides of the main chassis cabinet 1000.

FIG. 14B is a 3-D perspective view of the interior side of cup loading rail guide system 700, shown by swinging open assembly 700 and revealing inner components, with rotating cup holder 772 in a first position A. With an opened inner mount plate 701, the Front 3D perspective view of chassis cabinet shows the rear view of the rail guide assembly in the upper right "zero" or "A" position. Inner mount plate 701 has been swung to an open position showing rear of plate with assembly 700. Rotating cup holder will actually be retracted to permit movement rather than extended as shown. Exposed is lower drive system subassembly 740. In one example, lower drive system subassembly 740 includes, as will be illustrated in following Figures, a rail guide corner end bracket 741, a lower smooth idler pulley wheel 742, a lower horizontal right bottom cast corner bracket 743, solid V Wheels 744, 745, 746, 747, a bottom wheel carriage plate 748, and a lower stepper motor mount plate 749.

FIG. 15A is a 3-D perspective view of the front-facing side of cup loading rail guide system 700, with rotating cup holder 772 in a lower right position (when viewed from front of vending machine assembly 1, looking in) for receiving a cup from empty cup delivery system 600, demonstrating operation in a second position B.

FIG. 15B is a 3-D perspective view of the interior side of cup loading rail guide system 700, shown by swinging open assembly 700 and revealing inner components, with rotating cup holder 772 in a second position B. Inner mount plate 701 has been swung to an open position showing rear of rail guide assembly 700. Rotating cup holder 772 retrieves a cup from cup dropper assembly 600 when in this position, when the rail guide assembly 700 is in the closed position. This perspective shows that rotating cup holder 772 is attached to vertical rail 707 (illustrated in FIG. 17). Vertical rail 707 moves rotating cup holder horizontally across horizontal rails 702 and 703. With assembly 700 swung open, the inner subsystems (e.g., smoothie blender assembly 800 and blender sliding shelf assembly 900) are easily accessible for cleaning, servicing and replenishment. When rail guide assembly 700 is returned to the closed position, this second position B of rotating cup holder 772 returns to under cup chute 609 (as seen in FIG. 11) for receiving an empty cup from adjustable cup dispenser 608 (as seen in FIG. 11).

FIG. 16 is a 3-D perspective view of the front-facing side of cup loading rail guide system 700, closed position, with inner mount plate 701 removed for clarity, with rotating cup holder 772 placing cup 710 in an upper lateral position for receiving beverage from an upper smoothie blender 801 (as detailed in FIG. 26) of smoothie blender assembly 800, demonstrating operation in a third position C. Several smoothie dispensing problems are reduced or eliminated by having the rail guide assembly 700 and rotating cup holder 772 cooperatively operate with the smoothie blender nozzle subassembly 802 (see FIG. 26). By bringing the cup to the smoothie machine, instead of running a tube or line from the smoothie machine to a cup sitting in a customer portal, there is no wasted product remaining in the tube after dispensing. Otherwise, somehow, that tube or line would need to be kept refrigerated or some mechanism would be needed to drain and clean the tube or line when that flavor is idle or otherwise not being dispensed. Further, such a tube or line would need to have a relatively large inside diameter, to be able to transport the slurry through the tube or line without some sort of pressure assist. Also, having a set of six tubes or lines will be messy and also expose the dry sections of the vending machine to liquids and splatter. By bringing the cup to the blender, the entire smoothie product is contained in the sterile smoothie reservoir and proper temperature and slurry mixing maintained. There is little to no stranded or abandoned product that is subject to melt and/or fall out of the proper slurry consistency. The chance for contamination, spoiling, and slime is greatly reduced. Further, dispensing malfunctions are isolated to each blender as well as any associated escape of product that would otherwise deposit into unwanted and hard-to-clean areas.

FIG. 17 is a 3-D perspective view of the front-facing side of cup loading rail guide system 700, closed position, with inner mount plate 701 removed for clarity, with rotating cup holder 772 placing cup 710 in an lower lateral position for receiving beverage from a lower smoothie blender 801 (as detailed in FIG. 26) of smoothie blender assembly 800, demonstrating operation in a an alternate third position C. In this perspective, another advantage of the cooperative system is revealed. Space in a vending machine of expected size is limited. It is a challenge to meet the restricted space limitations with the consumer demand for a variety of smoothie flavors. This is seen by the success of smoothie stores that require human order taking and hand dispensing of smoothie product. One option is to have the smoothie reservoirs narrow but tall, in order to get six or more reservoirs arranged horizontally across the available vending machine space. Since the smoothie slurry consistency is maintained by rotation of the product, like a cement mixer, a tall but narrow width smoothie dispenser would not be practical. There is advantage to having the smoothie product in a mixer having at least some width. To provide an adequate selection of smoothie product, in one example, the smoothie mixers are positioned and arranged horizontally and vertically within the vending machine compartment. In one example, this is accomplished by attaching rotating cup holder 772 to vertical rail 707. With motive power provided through belt 709, rotating cup holder 772 moves cup holder vertically between the smoothie blenders that are positioned and arranged at different vertical levels. Vertical rail 707 moves rotating cup holder 772 horizontally across horizontal rails 702 and 703, to locate the cup 710 at one of the horizontal positions of the positioned and arranged smoothie blenders.

FIG. 18A is a 3-D perspective view of the front-facing side of cup loading rail guide system 700, closed position, with rotating cup holder 772 and cup 710 positioned at inner mount plate portal 704 of inner mount plate 701, demonstrating operation in a fourth position D. After a cup 710 has been positioned to receive smoothie product from one or more of the smoothie blenders, rail guide system 700 rotates and moves rotating cup holder 772 (containing filled cup 710) to a location directly behind inner mount plate portal 704. Inner mount plate portal 704 provides the opening for a customer to see and retrieve their dispensed product that is in cup 710. Thus, the liquid slurry product is transported from the back vertical plane or section of the vending machine, through the middle vertical plane or section of the vending machine (represented by rail guide system 700), to the front vertical plane or section of the vending machine (the "dry" section) for further dispensing of dry product additive and/or dispensing of the finished cup of product to the customer.

FIG. 18B is a 3-D perspective view of the interior side of cup loading rail guide system 700, swung open, with rotating cup holder 772 and cup 710 positioned at inner mount plate portal 704 of inner mount plate 701, demonstrating operation in a fourth position D. This perspective provides a clearer view of the assemblies of cooperative components that achieve product delivery to portal 704. From this perspective, several motive devices are visible. In one example, these motive devices, processor controlled and with feedback sensors, achieve the proper positioning of cup 710 through the stages of empty cup retrieval, cup filling, through filled cup delivery. Several structural features are used to achieve a required level of cooperation and commercial reliability. In one example, the vertical rail 707, carrying rotating cup holder 772, rides and is motivated by both an upper drive system subassembly 720, riding on upper horizontal rail 702, and a lower drive system subassembly 740, riding on lower horizontal rail 703. In one example, the movements of upper drive system subassembly 720 and lower drive system subassembly 740 are cooperatively controlled to ensure smooth and accurate horizontal movement and positioning of vertical rail 707. In this example, binding of vertical rail 707 is reduced.

FIG. 19 is a 3-D perspective illustration of an example of the vending machine assembly of the present disclosure, with front door assembly shown in an open position, revealing cup 710 in a final position E, after rotation through portal 704 and release from rotating cup holder 772. In this illustration, cup holder 772 is already returned to second position "B", under cup dropper assembly 600. In this illustration, rotating cup holder 772 is already returned to second position B, underneath cup dropper assembly 600. Cup holder 772 from cup dropper assembly 600 has already received a second cup 710.

Now that a smoothie-filled cup has been delivered by rail guide assembly 700, including rotating cup holder 772, through portal 704 to the front vertical plane or space of the vending machine (the front door assembly 100), the filled cup is ready for delivery to the customer and/or adding of dry product from supplement assembly 200 to the cup. The customer access door assembly 500 is also illustrated, preventing customer access to the cup until the product dispensing is finished and the product-filled cup is ready for delivery to the customer.

FIG. 20 shows a front facing view detailing upper drive system subassembly 720, the upper portion of front-facing side of cup loading rail guide system 700. This illustration begins to show a detailed example of the balanced cooperating drive assembly to provide accurate and reliable positioning of the cup and provide smooth movement of the cup, to reduce jarring of the slurry product being carried by the cup. A portion of the blender assemblies 800 are shown behind the rail guide system 700 and its inner mount plate 701. For orientation, shown is inner mount plate 701, which is attached by hinge to the vending machine housing by way of inner mount plate bracket 711. In one example, a mount bracket spring loaded pull knob 712 is a spring loaded release device for detachment of the inner mount plate 701 for servicing and access.

Solid V Wheel Uppers 728, 729, 730, 731 form a four-point contact with upper horizontal V-slot rail 702 and includes shims and bearings to create a smooth ride along the rail. Visible from this FIG. 20 perspective is the top wheel carriage plate 732 for the upper front. Top wheel carriage plate 732 provides added support to accommodate inner mount plate 701. In order to provide an easy tension adjustment for the belt, an upper plate 734 for the smooth idler pulley 735 enables tension adjustment. In one example, idler pulley 735 is a smooth pulley, for the upper vertical section, that includes the wheel, spacers, and ball bearing. Its purpose is to enable a rapid rail glide. In a like manner, an upper horizontal right top smooth idler pulley wheel 724 includes the wheel, spacers, and ball bearing, again, to enable a rapid rail glide. In a like manner, an upper right bottom smooth idler pulley wheel 725 includes the wheel, spacers, and ball bearing, again, to enable a rapid rail glide.

In one example, belt 708 is a GT belt of 1120 mm size. Belt 708 enables horizontal movement and is powered by stepper motor 737 and is positioned and arranged by the use of pulleys. In one example, stepper motor 737, used to drive horizontal movement, is a NEMA 17 stepper motor. An upper stepper motor mount plate 738 is used to attach stepper motor 737 to the sub-assembly.

In one example, as illustrated, the motors are positioned and arranged on center vertical rail 707. This arrangement and positioning offers several advantages for the smooth, rapid, and reliable movement and positioning of the cup holder. It was discovered, however, that this non-standard positioning of the motors introduces increased precision requirements on the frame created by the vertical and horizontal rail guides. To provide sufficient rigidity and squaring of the rail guides, a cast corner bracket 736 for the upper left is provided. In one example, bracket 736 is an aluminum cast corner bracket. It is used to connect two linear rails together for "square" 90-degree connection. A rail guide corner end bracket 721 for the upper section is also provided. Bracket 721 provides added rigidity and strength due to non-standard motor positions.

To provide positioning feedback to the processor, an upper drive subassembly roller micro switch 722 is provided. Plate 726 provides the mount plate for mounting micro switch 722.

FIG. 21A is an interior facing view detailing upper drive system subassembly 720, the upper portion of interior side of cup loading rail guide system 700.

From this perspective, the rail guide frame is visible. In one example, the rail guide frame is a squared rectangle made up of a top horizontal rail 702 and vertical rails 705 &

706 (bottom horizontal rail 703 is illustrated in FIG. 23A). Attached to the frame at the horizontal rails is a horizontally moveable vertical rail 707. Rail 707 carries the cup holder. In this perspective, belt 708 is shown on pulley 724. Pulley 724 is positioned at the corner of the frame. Belt 709 is shown on pulley 735. Pulley 735 is positioned on the horizontally moveable vertical rail 707. Switch 722, attached to mount plate 726, is positioned on vertical rail 705. Switch 722 provides a means for informing the processor that the vertical rail 705 has reached the end of the frame. Switch 727 is positioned on movable vertical frame 707. Switch 727 provides a means for informing the processor that the cup holder has reached maximum top vertical position. Motor 737 is positioned at the top of vertical rail 706. Motor 737 is mounted on mount plate 738. Motor 737 serves to provide the motive force to belt 708 for horizontal movement of moveable vertical rail 707.

FIG. 21B is an interior facing exploded view detailing the components of upper drive system subassembly 720, the upper portion of front-facing side of cup loading rail guide system 700. The exploded perspective reveals the positioning and arrangement of the upper idler pulley plate 734. Plate 734 is the mount for the upper smooth idler pulley 735. Its purpose is to allow for easy tension adjustment of the belt 709. Upper pulley 739 drives movement of horizontal belt 708. It is attached to motor 737. In one example, upper pulley 739 is a GT2 Belt Timing Pulley. In one example, the pulley contains teeth to prevent belt slippage.

FIG. 22 shows a front facing view detailing lower drive system subassembly 740, the lower portion of front-facing side of cup loading rail guide system 700.

For orientation, inner mount plate 701 is shown attached to inner mount plate bracket 711. Horizontally moveable vertical rail 707 (illustrated in FIG. 21B) rides on the lower horizontal rail by using four solid V wheels 744, 745, 746, 747. A bottom wheel carriage plate 748 attaches these wheels. Hanging on the bottom of vertical rail 707 is a lower stepper motor mount plate 749, which receives attachment of a lower stepper motor 751. Stepper motor 751 provides the vertical movement force to move the cup holder up and down on rail 707. This is accomplished by attaching a pulley 750 to motor 751. In one example, pulley 750 is a GT2 timing belt pulley. In one example, pulley 750 has teeth to prevent belt slippage. Belt 709 (illustrated in FIG. 21B) is driven by pulley 750.

Long horizontal belt 708 wraps around the two horizontal rails 702 & 703 and vertical rail 705 by pulleys 724 & 725 (illustrated in FIG. 21B) & 742 & 755 (located at the bottom of vertical rail 705) & 753 (located at the bottom of vertical rail 706). Belt 708 is driven by motor 737 and pulley 739, which are located at the top of vertical rail 706 (illustrated in FIG. 21B). In one example, idler pulley wheel 742 is a smooth pulley. In one example, idler pulley wheel 753 is a smooth pulley.

Corner end brackets 741 and 754 secure the frame. In one example, triangular corner bracket 752 is located in the lower left corner. In one example, bracket 752 is made of cast aluminum. A corresponding bracket 743 (not illustrated in this perspective) is located in the lower right corner.

FIG. 23A is an interior facing view detailing lower drive system subassembly 740, the lower portion of rear-facing side of cup loading rail guide system 700. From this perspective, the positioning and arrangement of the components of the lower portion of movable vertical rail 707 are more visible.

For orientation, the bottom horizontal rail guide 703 and vertical rail guides 705 & 706 are shown as mounted on inner mount plate 701. Two of the four lower solid V wheels 746 & 747 are visible from this perspective. These wheels are attached to bottom wheel carriage plate 748. Also attached at the bottom of moveable vertical rail 707 is a lower stepper motor mount plate 749. Lower stepper motor 751 (for vertical movement of the cup holder along rail 707) is attached to mount plate 749.

In one example, triangular corner bracket 752 is located in the lower right corner (in this perspective view). In one example, bracket 752 is made of cast aluminum. A corresponding bracket 743 is located in the lower left corner. These corner brackets are used to secure a rigid 90-degree connection of the horizontal rail to the two vertical rails, maintaining square between these components of the frame.

Rail guide corner end brackets 741 & 754 secure the vertical rails to the lower horizontal rail, providing added rigidity and strength to the rail guide frame.

Smooth idler pulley wheel 742 carries belt 708 for horizontal movement of moveable vertical rail 707. Power for movement of belt 708 comes from motor 737 (illustrated in FIG. 21B). In one example, pulley 742 includes the pulley wheel, spacers, and ball bearing for rapid rail glide. Belt 709 runs along moveable vertical rail 707, which enables vertical movement of the cup holder. Motor 751 provides power for movement of belt 709. In one example, motor 751 is attached at the bottom of moveable vertical rail 707.

FIG. 23B is an interior facing exploded view detailing the components of lower drive system subassembly 740, the lower portion of rear-facing side of cup loading rail guide system 700.

FIG. 24A is a slight 3-D perspective view of cup holder assembly 760. Cup holder assembly 760 rides vertically up and down movable vertical rail guide 707. Cup holder assembly 760 rides on the moveable vertical rail by using four solid V wheels 761, 762, 763, 764. In one example, wheels 761, 762, 763, 764 include shims and bearings for smooth ride on rail 707. In one example, rail 707 is a V-slot rail. In one example, rail 707 is dimensioned to be 20×20× 1500 mm. Wheels 761, 762, 763, 764 are mounted on a gantry plate 765. Gantry plate 765 serves at the platform for the rest of the cup holder assembly to ride on rail 707. In one example, gantry plate 765 is dimensioned to be approximately 20 mm by 20 mm. A cup holder support bracket 767 attaches to mount plate 765. A stepper gear box 769 attaches to support bracket 767. In one example, gear box 769 has a gear reduction ratio of 14:1, significantly slowing down the rotation from a motor and significantly increasing the torque from the motor. A stepper motor 770 attaches to the gear box 769, providing the rotational motive force required to rotate the cup holder through its required rotational positions. A roller micro switch 766 detects maximum rotational travel of the cup holder and sends that information back to the processor/controller. Attached to the gear box 769 is an angled bracket 768 for the rotating cup holder.

Attached to the angled bracket and cantilevering to the cup holder is a load cell 771 (weight sensor) to measure proper fill level. In one example, load cell 771 measures the fill level and sends information about the fill level back to the processor/controller. The processor/controller has the option to use that information to turn on or off the smoothie dispensers, move and or rotate the cup holder, and/or move to the next processing sequence.

A U-shaped cup holder 772 is attached to the cantilevered load cell 771, enabling cup holder 772 to rotationally pivot. In one example, cup holder 772 is structurally shaped to grasp or hold a cup and is also structurally shaped to enable receipt of a single cup from adjustable cup dispenser 608. In one example, cup holder 772 is structurally shaped to operate in coordination with cup dispenser 608. In one example, the cooperating coordination is between cup holder 772 and a Componenti Series 674 cup dispenser 608, or its functional equivalent.

FIG. 24B is a slight 3-D perspective exploded view detailing the components of cup holder assembly 760.

FIG. 25 is a side view of cup holder assembly 760 with travel in the region of lower drive system subassembly 740. Cup holder assembly 760 is described and shown in FIGS. 24A and 24B. Lower drive system subassembly 740 is described and shown in FIGS. 23A and 23B. From this perspective of FIG. 25, the face of the rail guide corner end bracket 741 is more clearly illustrated. Also, the positioning and arrangement of pulleys 742, 755, 747, and 750 is revealed.

FIG. 26 is a 3-D perspective view of interior assemblies when viewed from an elevated right position, exposed by removing door 100, sides and top of housing 1000, and rail guide system 700. Smoothie blender assembly 800 and blender sliding shelf assembly 900 are revealed. The tight space requirements for a transitory vending machine that is sized for standard commercial deployment are addressed in the positioning and arrangement of the components of the blender assembly. In one example, this space requirement is met by having two or more (preferably three) smoothie blenders 801 share a common compressor and motor arrangement. In one example, smoothie blender 801 is a multi-gallon polycarbonate container. In the example, as illustrated, three reservoirs are created with three compartments of multi-gallon polycarbonate containers. Each smoothie blender compartment 801 has a smoothie blender nozzle subassembly 802 (detailed in FIG. 28B) attached for the purpose of dispensing smoothie beverage from the reservoir to a cup. In one example, three blender compartments 801 share a common motor-compressor unit 803. Motor-compressor units 803 provide the rotational power to keep mixing the smoothie beverage to maintain the slurry consistency. Motor-compressor units 803 also provide the refrigeration needed to maintain the appropriate slurry consistency and temperature. In one example, motor-compressor unit 803 uses a DC-powered motor. In one example, the three blender compartments 801 rest on top of one motor-compressor unit 803. In one example, the set of three blender compartments and one motor compressor unit is placed on a slidable shelf, in one example, blender sliding shelf assembly 900.

In one example, two sets of three blenders and one motor-compressor are positioned and arranged vertically to each other. This utilizes the space below the top blender set. In one example, it should be noted, that rail guide system 700 enables a cup to access the lower set of blenders, which may be below the level that a filled beverage cup is dispensed to a customer. In this example, a pump is not required to pump the slurry beverage from the lower set of blenders to the level of the point of dispensing to the customer. In this way, additional complexity, additional components to clean, additional failure causes, are all eliminated. Thus, in one example, the blenders are positioned and arranged to dispense slurry beverage into a cup below the level of dispensing to a customer.

Turning now to the smoothie sliding shelf assembly 900, in one example the upper assembly for the top set of blenders is attached to a chassis cabinet shelf 1004. The lower assembly 900 for the lower set of blenders is attached to the chassis cabinet floor panel 1006. One example of smoothie sliding shelf assembly 900 is shown in FIG. 29B and exploded detail in FIG. 30. One purpose of sliding shelf assembly 900 is to enable pulling out of each set of blender assemblies 800 for refill and for servicing. In one example, sliding shelf assembly is balanced and structurally configured to prevent tip-over of the vending machine even if a completely filled top blender assembly is fully pulled out on its sliding shelf assembly 900.

From this perspective, certain components of sliding shelf assembly 900 are visible. A slider holder 903 is attached to chassis shelf 1004 (or floor panel 1006) on each side of the shelf assembly 900. Holder bracket 903 prevents lateral movement of shelves 901 and 902. A blender drip tray 905 is attached to the front of shelf assembly 900. Tray 905 is to capture drip from smoothie nozzle 802. In one example, an upper sliding shelf assembly 902 serves the upper blender assembly and a lower sliding shelf assembly serves the lower blender assembly.

In one example, a spring plunger stopper 906 is placed in front of blender drip trays 905. The purpose of the spring plunger stopper is to act as a stop to prevent extension or detachment of shelving trays 901 until desired to pull out.

In one example, the positioning and arrangement of exhaust fans 1007 on chassis back panel 1002 is shown.

FIG. 27A is a 3-D perspective view of housing 1000 when viewed from a left position, with door 100 removed for clarity and rail guide system 700 swung open, showing upper smoothie blender assembly 800 and upper sliding shelving assembly 900 pulled out for servicing. From this perspective, the positioning and arrangement of rail guide system 700 and door assembly 100, in cooperation with sliding shelf 900, enables easy field access to the blender assemblies 800 for refill, cleaning, and field servicing. In one example, shelving 900 is balanced to prevent tipping of housing 1000 due to the top-heavy weight and cantilevering of the upper blender assembly 800.

FIG. 27B is a 3-D perspective view of housing 1000 when viewed from a left position, with door 100 removed for clarity and rail guide system 700 swung open, showing both upper and lower smoothie blender assemblies 800 and upper and lower sliding shelving assemblies 900 pulled out for servicing.

FIG. 28A shows a frontal slight 3-D perspective view of smoothie blender assembly 800 and arrangement and positioning of smoothie blender nozzle subassemblies 802. In this example, three blender compartments 801 are shown arranged side-by-side and are attached to the top of a motor-compressor unit 803. Each of the blender nozzle subassemblies 802 incorporates a processor-controlled actuator to control the dispensing of the slurry beverage.

FIG. 28B is a 3-D perspective view of smoothie blender nozzle subassembly 802. In one example, nozzle subassembly 802 includes a linear actuator assembly 804 and a specially structured frame 805 designed to replicate the leverage force of a pull arm that would otherwise manually open the spigot of the blender reservoir 801. In operation, in one example, a processor-controller signals or otherwise sends power to the linear actuator, for extending the piston of the actuator. The piston-actuator, being connected to the structured frame 805, causes the structured frame to pivot or otherwise rotate outward and downward from the body of the spigot of the blender reservoir 801. This causes the spigot to unblock, releasing smoothie slurry out the spigot and into a cup below. The cup below had been previously positioned at the desired location by the processor-controlled rail guide system 700.

FIG. 29A shows a side view from the right of housing 1000 showing both upper and lower smoothie blender assemblies 800 and upper and lower sliding shelving assemblies 900 pulled out for servicing. This perspective is viewed from right side panel 1001. From this perspective side view, the arrangement of blenders 801 on top of motor-compressors 803 is readily visible. Blender nozzle subassemblies 802 are shown attached to the front of blenders 801.

FIG. 29B shows a 3-D perspective view of upper and lower sliding shelving assemblies 900 when viewed from an elevated right position, exposed by removing door 100, sides and top of housing 1000, and the other assemblies. In this perspective, the arrangement of the components of shelving assemblies 900 can be more easily seen. In this example, the lower shelving assembly 900 is shown in the extended position, revealing an inner sliding tray 901 telescoping outward from an outer sliding tray 902. A drip tray 905 is attached across the front of the inner sliding tray 901. The tray rails of inner tray 901 are received by outer tray 902. Slider holders 903, which are attached to the chassis housing, in turn, receive the tray rails of outer tray 902. In one example, the positioning and arrangement of exhaust fans 1007 on chassis back panel 1002 is shown.

FIG. 30 shows a 3-D perspective exploded view detailing the components of sliding shelving assembly 900. In this example, shelving assembly 900 is shown exploded, revealing an inner sliding tray 901 telescoping outward from an outer sliding tray 902. Telescopic rail slides 904 enable full extension of shelves 901 and 902. A drip tray 905 is attached across the front of the inner sliding tray 901. The tray rails of inner tray 901 are received by outer tray 902 by way of telescopic rail slides 904. Slider holders 903, which are attached to the chassis housing, in turn, receive the tray rails of outer tray 902. A spring plunger stopper knob 906 is attached to the front of tray 901, configured to be received by the shelf or floor of the chassis housing, is to prevent extension or detachment of the sliding shelf assembly 900.

FIG. 31A shows a 3-D perspective view of housing 1000 when viewed from a front-left position, showing arrangement and configuration on housing frame components. From this perspective, a fixed half-shelf 1004 serves as a platform for the upper smoothie blenders 801, motor 803, and shelving assembly 900. In this example, illustrated are the housing components: main chassis cabinet right panel 1001, main chassis cabinet back panel 1002, main chassis cabinet left panel 1003, main chassis cabinet floor panel 1006, and main chassis cabinet top panel 1008. In one example, exhaust fans 1007 are placed on main chassis cabinet back panel 1002.

FIG. 31B shows a 3-D perspective view of housing 1000 when viewed from a back-left position, showing positioning and arrangement of exhaust fans 1007. In one example, exhaust fans 1007 are placed on main chassis cabinet back panel 1002. In one example, two exhaust fans 1007 are disposed at an upper position on back panel 1002, one near one edge of panel 1002 and one placed about two-thirds the width of back panel 1002. In one example, another two fans 1007 are disposed at a lower portion of back panel 1002 (in one example, slightly above the location of lower motor-compressor 803), one near one edge of panel 1002 and one placed about two-thirds the width of back panel 1002.

FIG. 32 shows a schematic block schematic diagram of an example of the electrical and signal connections between the various components of the vending machine. In this example, a microcontroller or processor 612 manages the electrical and signal communications between the various subsystems of the vending machine. In one example, the controller or processor is a cooperating set of controllers or processors. In one example, the controller or processor(s) include electronic components to provide sufficient electrical voltage and amperage to power the actuators and motors. Generally, microcontroller 612 communicates and empowers the subsystems of the front door assembly 100, the inner door assembly 700 (the cup retrieval rail guide system), the side cup dispenser assemblies 600 (empty cup dispenser assembly), and the inner chassis blenders 800 (smoothie blender assembly).

With regard to the subsystems of the front door assembly 100, in one example, controller 612 manages two-way communication with touch screen 102 to communicate with the customer and acquire order selection. Controller 612 manages two-way communication with payment processors 105 and 106. In one example, controller 612 drives the motors 202 of the dry-goods supplement subsystem 200. In one example, not illustrated, controller 612 receives information from sensors of the supplement subsystem 200 to signal whether a fault or empty condition exists. In one example, controller 612 drives the motor 302 of the straw dispensing subsystem 300. In one example, not illustrated, controller 612 receives information from sensors of the straw dispensing subsystem 300 to signal whether a fault or empty condition exists. In one example, controller 612 communicates with the cup access door assembly 500 to drive stepper motor 506 to open and close the cup access door 505. In one example, controller 612 receives information from a sensor, in one example, cup infrared sensor 501, to assess the fill level of the cup. In one example, controller 612 receives information from a sensor, in one example, roller micro switch 510, to manage positioning of the sliding clear acrylic access door panel 502.

With regard to the inner door assembly 700 (the cup retrieval rail guide system), in one example, controller 612 drives the horizontal motors 737, vertical motor 751, and cup rotation motor 770. In one example, controller 612 receives information from sensors to determine vertical and horizontal travel positions of the cup holder assembly 760, in one example, a horizontal micro switch 727 for horizontal travel and a vertical micro switch 722 for vertical travel. Likewise, in one example, controller 612 receives information from a sensor to determine the rotation position of cup holder assembly 760, in one example, a cup holder roller micro switch 766. In one example, controller 612 receives information from a cup load sensor, in one example, cup load sensor 771.

With regard to the side cup dispenser assemblies 600 (empty cup dispenser assembly), in one example, controller 612 sends a signal or otherwise powers a cup dispenser, in one example, an adjustable plastic cup dispenser 608, in one example, a Componenti Series 674 automatic cup dispenser with manual adjuster for variable cup sizes.

With regard to the inner chassis blenders 800 (smoothie blender assembly), in one example, controller 612 sends a signal or otherwise powers the smoothie machine motors 803, and actuator valves 804 of the smoothie blender nozzle subassemblies 802, and heat exhaust fans 1007. In one example, controller 612 receives information from a sensor to determine if beverage product is available from the blenders 801. In one example, controller 612 receives information from a sensor to determine temperature or an overheat condition. In one example, controller 612 receives information from a sensor to determine if nozzle malfunction is occurring. In one example, controller 612 receives information from temperature sensors associated with the smoothie blenders 801 to insure that beverage of improper temperature is not sold or otherwise dispensed.

One Example of Rail Guide System 700—Detail.

Below is one example of rail guide system 700, with additional details on structural features, arrangement and positioning, and composition.

In one example, inner mount plate 701 is a large hinged metal plate to attach the rail guide system. The inner mount plate bracket 711 is a hinge attached to inner mount plate 701 on the left interior side of the vending machine for swinging the inner mount plate for accessibility to the smoothie blender assembly 800 and other hard-to-reach components behind it.

In one example, upper horizontal V-slot linear rail 702 is a rigid anodized aluminum linear member with a smooth v-shaped groove to allow for belt drive linear movement. Linear rail 702 is positioned above the inner mount plate 701 and is the uppermost of the track rails that frame the inner mount plate 701. The linear rail frame provides a more rigid and precise rail movement.

In one example, lower horizontal V-slot linear rail 703 is a rigid anodized aluminum linear member with a smooth v-shaped groove to allow for belt drive linear movement. Linear rail 703 is positioned below the inner mount plate 701 and is the lowermost of the track rails that frame the inner mount plate 701. The linear rail frame provides a more rigid and precise rail movement.

In one example, inner mount plate portal 704 is a rectangular opening within the inner mount plate 701 that provides access for the cup holder assembly 760 to deliver smoothie-filled cups from the blender assembly 800 to the customer delivery door 107.

In one example, right vertical V-slot linear rail 705 is a rigid anodized aluminum linear member with a smooth v-shaped groove to allow for belt drive linear movement. Linear rail 705 is positioned on the right edge of the inner mount plate 701 and is the right edge of the track rails that frame the inner mount plate 701. The linear rail frame provides a more rigid and precise rail movement.

In one example, left vertical V-slot linear rail 706 is a rigid anodized aluminum linear member with a smooth v-shaped groove to allow for belt drive linear movement. Linear rail 706 is positioned on the left edge of the inner mount plate 701 and is the left edge of the track rails that frame the inner mount plate 701. The linear rail frame provides a more rigid and precise rail movement.

In one example, center vertical V-slot linear rail 707 is a rigid anodized aluminum linear member with a smooth v-shaped groove to allow for belt drive linear movement. Linear rail 707 is positioned between the left and right vertical rail tracks of the inner mount plate 701 and is the track rail that oscillates left or right through a belt-operated drive system 720, 740, 760. The linear rail frame provides a more rigid and precise rail movement.

In one example, horizontal GT timing belt 708 with inner teeth of the belt wraps over the outer teeth of the pulley to enable minimal slippage for horizontal movement powered by stepper motor 737 and the use of multiple pulleys.

In one example, vertical GT timing belt 709 with inner teeth of the belt wraps over the outer teeth of the pulley to enable minimal slippage for vertical movement powered by stepper motor 751 and the use of multiple pulleys.

Cup 710 is a cup for the dispensing of smoothies.

In one example, inner mount plate bracket 711 is a custom-made hinged metal bracket attached to the inner mount plate 701 and the main chassis cabinet left panel 1003. In one example, bracket 711 includes a piano hinge. The inner mount plate bracket 711 enables the inner mount plate to be swung open for access to the blender assembly 800 and other hard-to-reach components in the interior of the main chassis cabinet 1000.

One Example of Upper Drive Subassembly 720—Detail.

Below is one example of upper drive subassembly 720, with additional details on structural features, arrangement and positioning, and composition.

In one example, upper rail guide corner end bracket 721 is a custom-made metal bracket to provide added rigidity to the upper right smooth idler pulley wheels (724, 725) and linear rails 702 & 705. The bracket 721 reinforces the upper right corner to minimize flexibility associated with torque from stepper motor 737 placed on smooth idler pulley wheels 724 & 725 as they act as rotating guides for the movement of the horizontal belt 708.

In one example, upper drive subassembly roller micro switch #1 722 operated by motor 737 controls the horizontal belt positioning. Upper right cast corner bracket 723 is an aluminum cast corner bracket used to connect the two linear rails 702 and 705 together at a 90-degree connection. Bracket 723 reinforces the strength of the upper right corner intersection comprised of the upper horizontal v-slot rail 702 and right vertical rail 705, to minimize rail flexure or breakage during movement of horizontal belt 708.

In one example, upper horizontal right top smooth idler pulley wheel 724 is comprised of a plastic sleeve, two bearings, nylon spacer, plastic bushing, and screw. The plastic sleeve has channel lips for belt containment. Pulley wheel 724 is mounted to the rail guide corner end bracket 721 with a nylon spacer, shim and nut. The mounted idler pulley wheel will roll smoothly when horizontal belt 708 wraps around it.

In one example, upper horizontal right bottom smooth idler pulley wheel 725 is comprised of a plastic sleeve, two bearings, nylon spacer, plastic bushing, and screw. The plastic sleeve has channel lips for belt containment. Pulley wheel 725 is mounted below and diagonally to the right of pulley 724, to the rail guide corner end bracket 721 with a nylon spacer, shim and nut. The mounted idler pulley wheel will roll smoothly when belt 708 wraps around it.

In one example, micro switch mount plate 726 is a custom-made metal bracket welded to the upper right of the inner mount plate 701 for the purpose of attaching the upper drive subassembly roller micro switch #1 722. The micro switch mount plate is positioned several inches below the right edge of the inner mount plate 701 to prevent the micro switch from interfering with the belt movement of the overlying upper drive system assembly 720.

In one example, upper drive subassembly roller micro switch #2 727 (see FIG. 21B), cooperating with motor 737, controls the horizontal belt positioning of vertical rail 707.

In one example, solid V wheel upper #1 728 includes a plastic wheel, two ball bearings, two shims, and a nylon lock nut designed with a smooth center and a v-shaped outer edge to center the ride on the v-slot linear rail track.

In one example, solid V wheel upper #2 729 includes a plastic wheel, two ball bearings, two shims, and a nylon lock nut designed with a smooth center and a v-shaped outer edge to center the ride on the v-slot linear rail track.

In one example, solid V wheel upper #3 730 includes a plastic wheel, two ball bearings, two shims, and a nylon lock nut designed with a smooth center and a v-shaped outer edge to center the ride on the v-slot linear rail track.

In one example, solid V wheel upper #4 731 includes a plastic wheel, two ball bearings, two shims, and a nylon lock nut designed with a smooth center and a v-shaped outer edge to center the ride on the v-slot linear rail track.

In one example, top wheel carriage plate upper front 732 is a custom-made metal bracket, which is mated to top wheel carriage plate upper rear 733. This assembly provides a frame for the mounting of solid V wheels 728, 729, 730, 731 and idler pulley plate upper 734 and upper vertical smooth idler pulley wheel 735 and upper drive assembly roller micro switch 727. The frame and the associated components provide for horizontal (lateral) movement of the center vertical linear rail 707 across the horizontal rails.

In one example, upper idler pulley plate 734 is a slotted anodized aluminum plate mounted to the upper portion of the center vertical v-slot rail 707. The upper vertical idler pulley wheel 735 is mounted to the upper idler pulley plate 734, which serves as an upper guide for the vertical belt 709. The upper idler pulley plate 734 can be adjusted to tension the vertical belt 709.

In one example, upper vertical smooth idler pulley wheel 735 is comprised of a plastic sleeve, two bearings, nylon spacer, plastic bushing, and screw. The plastic sleeve has channel lips for belt containment. Pulley wheel 735 is mounted to the upper idler pulley plate 734 with a nylon spacer, shim and nut. The mounted idler pulley wheel will roll smoothly when vertical belt 709 wraps around it. The pulley wheel 735 serves to enable the loop in the vertical belt 709 for up and down movement along the center vertical v-slot linear rail 707.

In one example, upper left cast corner bracket 736 is an aluminum cast corner bracket used to connect the two linear rails 702 and 706 together at a 90-degree connection. Bracket 736 reinforces the strength of the upper left corner intersection comprised of the horizontal rail 702 and left vertical rail 706 to minimize rail flexure or breakage during belt movement.

In one example, upper horizontal stepper motor 737 is a 2-phase stepper motor located on the upper left of the inner mount plate 701 and attached by four screws to the custom-made upper stepper motor mount plate 738. Through the use of the timing-belt pulley 739 attached to the shaft of the stepper motor 739, the motor 739 can rotate the horizontal belt 708 to provide rapid and consistent left-right movement of the cup holder assembly 760.

In one example, upper stepper motor mount plate 738 is a custom-made bracket to provide a mount for both the upper horizontal stepper motor 737 and the upper horizontal v-slot rail 702. Mount plate 738 provides needed support and rigidity to the upper left portion of the upper drive system subassembly 720.

In one example, upper timing-belt pulley 739 is attached to the driveshaft of the upper horizontal stepper motor 737. Timing-belt pulley 739 contains teeth to prevent belt slippage from the applied torque of the motor 737. In one example, timing-belt pulley 739 is made of aluminum alloy. In one example timing-belt pulley 739 is comprised of two flanges and a multi-tooth hub to keep the horizontal belt 708 in tension and alignment.

One Example of Lower Drive Subassembly 740—Detail.

Below is one example of lower drive subassembly 740, with additional details on structural features, arrangement and positioning, and composition.

In one example, lower right rail guide corner end bracket 741 is a custom-made metal bracket to provide added rigidity to the lower right smooth idler pulley wheels (742, 755) and linear rails 703 & 705. Bracket 741 reinforces the lower right corner to minimize flexibility associated with the stepper motor 737 torque on the smooth idler pulley wheels 742 & 775 as they act as rotating guides for the movement of the horizontal belt 708.

In one example, lower horizontal right bottom smooth idler pulley wheel 742 is comprised of a plastic sleeve, two bearings, nylon spacer, plastic bushing, and screw. The plastic sleeve has channel lips for belt containment. Pulley wheel 742 is mounted to the lower right corner end bracket 741 with a nylon spacer, shim and nut. The mounted idler pulley wheel will roll smoothly when belt 708 wraps around it.

In one example, lower right cast corner end bracket 743 is an aluminum cast corner bracket used to connect the two linear rails 703 and 705 together at a 90-degree connection. Bracket 743 reinforces the strength of the lower right corner intersection comprised of the lower horizontal rail 703 and right vertical rail 705 to minimize rail flexure or breakage during movement of horizontal belt 708.

Solid V wheel lower #1 744 includes the plastic wheel, two ball bearings, two shims, and a nylon lock nut designed with a smooth center and a v-shaped outer edge to center the ride on the lower horizontal v-slot linear rail track 703.

Solid V wheel lower #2 745 includes the plastic wheel, two ball bearings, two shims, and a nylon lock nut designed with a smooth center and a v-shaped outer edge to center the ride on the lower horizontal v-slot linear rail track 703.

Solid V wheel lower #3 746 includes the plastic wheel, two ball bearings, two shims, and a nylon lock nut designed with a smooth center and a v-shaped outer edge to center the ride on the lower horizontal v-slot linear rail track 703.

Solid V wheel lower #4 747 includes the plastic wheel, two ball bearings, two shims, and a nylon lock nut designed with a smooth center and a v-shaped outer edge to center the ride on the lower horizontal v-slot linear rail track 703.

In one example, bottom rear wheel carriage plate 748 is a custom-made metal bracket that serves as a frame for the mounting of the four solid V-wheels 744, 745, 746, 747 and is also mounted to the lower portion of the center vertical v-slot rail 707. Carriage plate 748 and the four V-slot wheels are then able to glide in a horizontal motion on the lower horizontal v-slot rail 703 through the power generated by the upper horizontal stepper motor 737, and simultaneously serves to horizontally move the center vertical v-slot rail 707 laterally across the frame.

In one example, lower stepper mount plate 749 is a standard flat anodized aluminum motor mount plate for the vertical stepper motor 751 and attaches to the lower portion of the center vertical v-slot rail 707. It serves as a mount for the lower vertical stepper motor 751. Lower stepper mount plate 749 has multiple slots to enable easy adjustment to the of the attachment to the center vertical v-slot rail 707, as this provides for proper tension of the vertical belt 709 which is powered by the combination of the vertical stepper motor 751 and lower vertical belt timing pulley 750.

In one example, lower vertical timing-belt pulley 750 is attached to the driveshaft of the vertical stepper motor 751. The timing-belt pulley 750 contains teeth to prevent belt slippage from the applied torque of the motor 751. In one example, timing-belt pulley 750 is made of aluminum alloy. In one example, timing-belt pulley 750 is comprised of two flanges and a multi-tooth hub to keep the vertical belt 709 in tension and alignment.

In one example, lower vertical stepper motor 751 is a 2-phase stepper motor located below the inner mount plate 701 and attached by four screws to the lower stepper motor mount plate 749. Through the use of the lower timing-belt pulley 750 attached to the shaft of the stepper motor 751, motor 751 can rotate vertical belt 709 to provide rapid and consistent up-down movement of the cup holder assembly 760.

In one example, lower left cast corner bracket 752 is an aluminum cast corner bracket used to connect the two linear rails 703 & 706 together at a 90-degree connection. The bracket 752 reinforces the strength of the lower left corner intersection comprised of the lower horizontal rail 703 and left vertical rail 706, to minimize rail flexure or breakage during belt movement.

In one example, lower horizontal left bottom smooth idler pulley wheel 753 is comprised of a plastic sleeve, two bearings, nylon spacer, plastic bushing, and screw. The plastic sleeve has channel lips for belt containment. Pulley wheel 753 is mounted to the lower left corner end bracket 754 with a nylon spacer, shim and nut. The mounted Idler pulley wheel will roll smoothly when horizontal belt 708 wraps around it.

In one example, lower right rail guide corner end bracket 754 is a custom-made metal bracket to provide added rigidity to the lower left smooth idler pulley wheel 753 and linear rails 703 and 706. The bracket 754 reinforces the lower left corner to minimize flexibility associated with torque from stepper motor 737 that is put on smooth idler pulley wheel 753. Smooth idler pulley wheel 753 acts as a rotating guide for the movement of the horizontal belt 708.

In one example, lower horizontal right top smooth idler pulley wheel 755 is comprised of a plastic sleeve, two bearings, nylon spacer, plastic bushing, and screw. The plastic sleeve has channel lips for belt containment. Pulley wheel 755 is mounted to the lower right corner end bracket 741 with a nylon spacer, shim and nut. The mounted Idler pulley wheel will roll smoothly when belt 708 wraps around it.

One Example of Cup Holder Assembly 760—Detail.

Below is one example of cup holder assembly 760, with additional details on structural features, arrangement and positioning, and composition.

Center vertical solid V wheel #1 761 includes a plastic wheel, two ball bearings, two shims, and a nylon lock nut designed with a smooth center and a v-shaped outer edge to center the ride on the center vertical v-slot linear rail track 707. It is mounted to a v-slot gantry plate 765.

Center vertical solid V wheel #2 762 includes a plastic wheel, two ball bearings, two shims, and a nylon lock nut designed with a smooth center and a v-shaped outer edge to center the ride on the center vertical v-slot linear rail track 707. It is mounted to a v-slot gantry plate 765.

Center vertical solid V wheel #3 763 includes a plastic wheel, two ball bearings, two shims, and a nylon lock nut designed with a smooth center and a v-shaped outer edge to center the ride on the center vertical v-slot linear rail track 707. It is mounted to a v-slot gantry plate 765.

Center vertical solid V wheel #4 764 includes a plastic wheel, two ball bearings, two shims, and a nylon lock nut designed with a smooth center and a v-shaped outer edge to center the ride on the center vertical v-slot linear rail track 707. It is mounted to a v-slot gantry plate 765.

In one example, V-slot gantry plate 765 is a high-tensile aluminum plate that secures the four center vertical solid V wheels (761, 762, 763, 764) that glides up-down on the center vertical v-slot linear rail track 707. The plate is mounted to the cup holder support bracket 767.

The cup holder roller micro switch 727, cooperating with stepper motor 737, controls the horizontal belt positioning of vertical rail 707 and its cup holder assembly. In one example, cup holder roller micro switch 766, cooperating with stepper motor 770, controls the rotational positioning of the cup holder assembly.

In one example, the cup holder support bracket 767 is a custom-made metal bracket that serves as a mount for four components of the cup holder assembly 760: (1) the V slot gantry plate 765, (2) the cup holder roller micro switch 766, (3) the stepper gearbox 769 and stepper motor 770 positioned below, and (4) the rotating cup holder bracket 768 located above.

In one example, the rotating cup holder bracket 768 is an L-shaped bracket mounted to the cup holder support bracket 767 below and to the cup load cell 771 (weight sensor) and rotating cup holder 772. The rotating cup holder bracket 768 is positioned over the shaft of the stepper gearbox 769 that rotates the cup holder 772. The bracket 768 serves to provide support and rigidity to the weight of the extended cup holder 772, load cell 771, cup 710 and smoothie contents.

In one example, the stepper gearbox with planetary gears 769 converts the power from the adjoining stepper motor 770 to rotate the rotating cup holder through a single shaft.

In one example, the stepper motor 770 is a 2-phase stepper motor adjoined to the stepper gearbox 769 and both are mounted to the cup holder bracket 767. The power generated by the motor 770 enables for the rotation of the cup holder to move the cup into a desired position through the assistance of the roller micro switch 766 and the controller 612.

In one example, the cup load cell (weight sensor) 771 is attached to the rotating cup holder bracket 768 and rotating cup holder 772. It serves as weight-measuring device to determine the weight of the smoothie filled cup contents. In one example, insufficient cup volumes are therefore identified to the vending machine controller 612.

Operation.

FIG. 33 is a flowchart 3300 of an example of the electromechanical operation of the vending machine. In one example of operation, a customer approaches the vending machine and uses the touch screen to input their smoothie selection 3301. Their selection is used by the controller or processor to coordinate the dispensing of the proper beverage and delivery to the customer. In one example, multiple flavor combinations can be selected, meaning that the beverage will be retrieved from two or more beverage reservoirs.

Continuing with an example operation, the customer has the option of selecting the supplement from the touch screen 3303. This information is also made available to the controller or processor. As can be envisioned, a multitude of beverage and supplement combinations are available to the customer. This is particularly helpful for a partially frozen beverage, where some beverage reservoirs or supplement bins may be depleted. Unlike an icee-type machine, which manually dispenses one or two flavors, the self-serve vending machine of the present invention necessitates a broad range of food-choice options that are now demanded of the modern, health-conscious consumer. Each customer is a unique individual—with particular proteins and particular fruits and vegetables that are acceptable to meet their specific nutritional intake plan. Expensive manual preparation and delivery, at sparse or inconvenient store locations, is currently the typical option that they have. Of course, a customer may choose to not have any dry food supplement added to their beverage 3304.

As the controller/processor, in collaboration with the touch screen, can now determine the price for the custom-designed beverage, the bill payor or cashless payment terminal is activated by the controller to receive funds for the purchase of the beverage 3305. In one example, the touch screen communicates with the payment terminal, in one example, through a separate processor.

Once payment is accepted, the controller or processor goes into action to marshal the retrieval and delivery of the beverage food product. With the cup arm positioned beneath the cup turret, the controller or processor notifies cup dropper delivery system motor & micro-controller to release a single empty cup 3307. This does not occur if the cup turrets are empty of cups 3306. In one example, if the cup turrets are empty of cups, the micro controller prevents the selection of beverage and collection of payment. In one example, the controller or processor reports the empty or error cup status so the vendor knows which vending machines need manual attention.

Once a cup is successfully captured by the cup dropper apparatus, the controller notifies the cup rail guide assembly cup arm to grab the cup from cup dropper apparatus by activating vertical motor 751 & micro-controller 727, step 3309. This is accomplished, in one example, by moving cup arm 760 from an upper right "zero" position to a lower left "cup loading" position.

The controller or processor notifies the cup holder assembly rail guide to rotate to gather a cup from the cup dropper apparatus by activating rotation motor 770 and gearbox 769 and micro-controller 766, step 3311. Cup holder 772 is extended to retrieve cup 710.

Step 3313: The controller or processor activates cup holder assembly 760 with an empty cup 710 on the rail guide to a proper position below nozzle 802 of the customer-selected smoothie flavor blender 801. This is accomplished by using the balanced lateral belt and pulley systems 720 and balanced vertical belt and pulley systems 740.

Step 3315: The controller or processor controls the accusation of special actuator 804 to release the semi-frozen suspension smoothie into the cup 710. Step 3316: This operation is subject to a monitored sensor that monitors for improper fill level or if the blender fill level is inadequate. In one example, the controller or processor reports the improper fill level or inadequate blender fill level status so the vendor knows which vending machines need manual attention.

Step 3317: On successful fill of the cup with beverage, the controller or processor notifies cup rail guide 700 to the move cup 710 to the customer cup access door assembly 500 shelf.

Step 3319: The cup is now in a position to receive any of the dry food supplements that the customer has ordered. The controller or processor had prepositioned the customer cup access door assembly to accommodate an empty cup by the vertical belt and pulley driven rail guide assembly 500 with motor 506. The customer cup access door remains closed.

Step 3321: The controller or processor initiates the supplement assembly 200, selecting proper motor 202, micro-controller and auger 204 to withdraw from the customer-chosen canister 201 the desired dry supplement and drops down to the cup. The cup is still positioned on the shelf of customer access door 500.

Step 3322: Alternatively, step 3321 is bypassed if the customer does not select a supplement.

Step 3323: The controller or processor communicates with infrared sensor 501 that is on the customer cup access assembly 500, to indicate proper fill level with or without supplement added to cup 710.

Step 3324: If the infrared sensor 501 detects improper fill level, the process may be aborted and the customer payment refunded. In one example, the controller or processor reports the improper fill status so the vendor knows which vending machines need manual attention.

Step 3325: With proper fill level, the controller or processor activates the cup access door assembly 500 with motor 506 and micro-controller to lower door 502 for the customer to retrieve the beverage filled cup.

Step 3327: Since a straw is usually desired to go with a smoothie type beverage, the controller or processor activates motor 302 of straw dispenser assembly 300 to release a straw to the straw portal in the front door portal 103. The modern healthy smoothie customer is typically very environmentally conscious. Separate straw dispensers can leave a mess of straws scattered about. The target customers will appreciate receiving a clean straw that is electro-mechanically vended to them. Also, since there is no control over the environment surrounding the vending machine, it is important to have the straw reservoir and dispensing physically incorporated and controlled within the footprint of the vending machine.

Step 3328: Of course, if the straw supply in straw hopper is depleted, then no straw is dispensed. In one example, the controller or processor reports the status of the straw reservoir so the vendor knows which vending machines need manual attention.

Step 3329: The customer has the option of retrieving a cup lid from cup lid manual dispenser 400, in front door portal 104.

Step 3330: Of course, no lids are dispensed if cup lids in storage are depleted. In one example, the controller or processor reports the status of the lid reservoir so the vendor knows which vending machines need manual attention.

In one example, the controller or processor reports to the vendor any of the various error or depletion statuses that prevent a sale of the beverage and/or supplement. This enables the vendor to know which vending machines need manual attention. In one example, a test payment or charge reversal is sent through the payment system to communicate the error or depletion status.

In one example, the controller or processor is a cooperating set of controllers or processors.

FIG. 34 shows a flowchart 3400 of an example of the vending process. In one example the vending process includes:

Step 3401: Ordering a smoothie from one or a combination of up to six flavors, in one example, using a touch screen interface;

Step 3403: Optionally ordering a dry supplement from up to four possible types, in one example, added using a touch screen user interface;

Step 3405: Activating a bill payer or cashless payment terminal by a controller or processor;

Step 3407: Notifying a cup dropper delivery system to release an empty cup, in one example, notifying by a controller or processor;

Step 3409: Notifying a cup rail guide system to grab a cup from the cup dropper apparatus, in one example, notifying by a controller or processor;

Step 3411: Positioning the empty cup below a special nozzle of the smoothie blender containing the ordered flavor; in one example, positioning by moving the cup with the cup rail guide system; in one example, activating the moving by the rail guide system by a controller or processor;

Step 3413: Actuating the special nozzle to release smoothie food product into the cup; in one example, actuating the nozzle by the controller or processor;

Step 3415: Monitoring a sensor to determine proper or improper fill level of the food product into the cup; in one example, monitoring the sensor by a controller or processor; in one example, determining by the monitoring controller or processor; in one example, the sensor is a weight sensor; in one example, the sensor is located on the cup holder;

Step 3417: if proper fill is determined, Notifying the cup rail guide system to move the filled cup to the customer access door; in one example, the notifying is by a controller or processor; in one example, the moving is directed by a controller or processor;

Step 3418: if proper fill is not determined, if sensor has detected improper fill, no action is sent to the rail guide system to move the cup to the customer access door and process terminates;

Step 3419: if supplement has been selected, Initiating selected supplement motors to dispense and drop dry supplement down to the cup located at the customer access door; in one example, initiating the dispensing by a controller or processor;

Step 3421: Opening the cup delivery door; in one example, opening the delivery door by a controller or processor;

Step 3423: Dispensing a straw from a straw dispenser, releasing the straw to a straw portal in the front door; in one example, dispensing directed by a controller or processor; and Step 3425: providing a retrievable cup lid to the customer from the front door.

In one example, the controller or processor is a cooperating set of controllers or processors.

CONCLUSION

Although the present invention is described herein with reference to a specific preferred embodiment(s), many modifications and variations therein will readily occur to those with ordinary skill in the art. Accordingly, all such variations and modifications are included within the intended scope of the present invention as defined by the reference numerals used.

From the description contained herein, the features of any of the examples, especially as set forth in the claims, can be combined with each other in any meaningful manner to form further examples and/or embodiments.

The foregoing description is presented for purposes of illustration and description, and is not intended to limit the invention to the forms disclosed herein. Consequently, variations and modifications commensurate with the above teachings and the teaching of the relevant art are within the spirit of the invention. Such variations will readily suggest themselves to those skilled in the relevant structural or mechanical art. Further, the embodiments described are also intended to enable others skilled in the art to utilize the invention and such or other embodiments and with various modifications required by the particular applications or uses of the invention.

What is claimed is:

1. A smoothie vending machine having a plurality of smoothie dispensing tanks comprising:
    a housing;
    an electro-mechanically actuated dispensing nozzle attached to each smoothie dispensing tank;
    a means for retrieving an empty cup and moving the cup to each selected dispensing nozzle;
    a means for delivering beverage from the dispensing tank to the empty cup;
    a means for transferring a filled cup from the cup retrieving and moving means;
    a receiving shelf to receive the filled cup;
    a means for dropping dry food product into the filled cup;
    an access door to open when the filled cup is ready to vend to a customer;
    a mounting plate vertically disposed on the housing;
    wherein the mounting plate is vertically hinged;
    wherein the mounting plate is swingable outward from the housing;
    wherein the mounting plate is positioned and arranged between a front door of the smoothie vending machine and the smoothie dispensing tanks contained in the smoothie vending machine;
    wherein the mounting plate is positioned and arranged to swing open to enable access to the smoothie dispensing tanks and a plurality of blender DC motors for refilling and maintenance; and
    wherein the cup retrieving and moving means are disposed on the mounting plate.

2. The smoothie vending machine of claim 1, further comprising:
    extendable shelving for holding the smoothie dispensing tanks; and
    wherein the mounting plate is hinged to swing open to enable the smoothie dispensing tanks and the extendable shelving to be fully extended from a chassis cabinet of the housing.

3. The smoothie vending machine of claim 1, wherein a linear rail guide system is attached to the mounting plate.

4. The smoothie vending machine of claim 3, wherein a hole is disposed on the mounting plate to provide access from a door on a front of the smoothie vending machine to a filled cup that is positioned behind the mounting plate by the linear rail guide system.

* * * * *